United States Patent [19]

Nakabayashi et al.

[11] Patent Number: 5,600,827
[45] Date of Patent: Feb. 4, 1997

[54] DATA MANAGEMENT, DISPLAY, AND RETRIVAL SYSTEM FOR A HIERARCHICAL COLLECTION

[75] Inventors: Kaoru Nakabayashi; Akira Mochida, both of Suwa, Japan

[73] Assignee: Seiko Epson Corporation, Tokyo, Japan

[21] Appl. No.: 245,280

[22] Filed: May 18, 1994

[30] Foreign Application Priority Data

May 18, 1993 [JP] Japan .................................. 5-116123

[51] Int. Cl.$^6$ .................................................. G06F 17/30
[52] U.S. Cl. ........................ 395/602; 364/DIG. 1; 364/282.1; 364/283.3; 364/283.2; 364/282.3
[58] Field of Search ............................................. 395/600

[56] References Cited

U.S. PATENT DOCUMENTS

| | | | |
|---|---|---|---|
| 4,486,857 | 12/1984 | Heckel | 395/100 |
| 4,736,308 | 4/1988 | Heckel | 395/144 |
| 4,805,134 | 2/1989 | Calo et al. | 395/600 |
| 4,814,972 | 3/1989 | Winter et al. | 395/200.09 |
| 5,206,949 | 4/1993 | Cochran et al. | 395/600 |
| 5,228,123 | 7/1993 | Heckel | 395/100 |
| 5,297,249 | 3/1994 | Bernstein et al. | 395/156 |
| 5,428,731 | 6/1995 | Powers, III | 395/154 |

FOREIGN PATENT DOCUMENTS 2-151921  11/1990  Japan .
4-350768   4/1992  Japan .

*Primary Examiner*—Wayne Amsbury
*Attorney, Agent, or Firm*—Hickman Beyer & Weaver

[57] ABSTRACT

The present invention provides a data management system realizing simple, clear, and easily understandable display and operation. The data management system is applicable, for example, to management of name cards. In management of name cards, name card data (101) includes a plurality of name card records (100). A card summary record (110, 112) prepared as title data includes a card ID and part of item data included in each name record (100). Each summarized card data (111, 113) includes a plurality of card summary records (110, 112) collected according to a predetermined condition, and is placed into a certain card box (120, 121). Each card box has a characteristic name such as 'business' or 'private'. Visually hierarchical display of data in the form of a card box list, a target list including a plurality of target data, and individual name card data helps the user clearly understand the whole data display and data retrieval. This allows quick access to a desired name card. The target list is data having a fixed length and used on a memory, thereby realizing high-speed data retrieval and display. The system of the invention further includes a data maintenance mechanism and an auto-dialing mechanism.

35 Claims, 40 Drawing Sheets

Fig. 3

| 160 | NAME CARD RECORD | |
|---|---|---|
| 170 | CARD ID | 33 |
| 180 | BASIC DATA<br>COMP. NAME 1<br>COMP. NAME 2<br>DIV.<br>POSIT.<br>NAME 1<br>NAME 2<br>ZIP<br>ADD.<br>BLDG.<br>PHONE 1<br>PHONE 2<br>FAX<br>NET<br>RES. 1<br>RES. 2<br>RES. 3 | ABC COMPANY<br><br>HEAD OFFICE<br>SALES MANAGER<br>James SMITH<br><br>10015<br>YYY, ZZZ CITY<br>WWW<br>212-999-1111(DIRECT)<br>×××-YYY-ZZZZ(PILOT)<br>AAA-BBB-××××(FAX)<br>id××××××× |

| 190 | MARK DATA | G | H | I | J | K | 1 | 2 | 3 | A | B | C | * | + |
|---|---|---|---|---|---|---|---|---|---|---|---|---|---|---|
| | | ○ | | ○ | | | | ○ | | ○ | | ○ | | |

| 200 | LINK DATA<br>IMAGE 1<br>IMAGE 2<br>FILE 1<br>INTRODUCED BY | FILE NAME : ×××××××.IM1<br>FILE NAME : ×××××××.IM2<br>FILE NAME : ×××××××.CS1<br>CARD ID : 51 |
|---|---|---|
| 210 | REMARKED DATA<br>DATE<br>    OF MEETING<br>PLACE<br>REASON<br>SPECIAL INF.<br>OTHER INF. | <br><br>4.1, '93 (Thur)<br>HIS OFFICE<br>PRE-ARRANGEMENT<br>NEXT MEETING AT THE END OF Apr.<br>ALUMNUS (IN 1950) |
| 220 | USE RECORD<br>DATA<br>NUMBER OF<br>  USE RECORDS<br>USE REC. 1<br>USE REC. 2<br>USE REC. 3 | <br><br><br>3<br>4.5, '93 (Mon): MAILED MATERIAL<br>4.9, '93 (Fri): RECEIVED PHONE CALL<br>4.13, '93 (Tue): SENT FAX |

Fig. 4

| 230 | NAME CARD RECORD | |
|---|---|---|
| 240 | CARD ID | 33 |
| 250 | BASIC DATA<br>DIV.<br>POSIT.<br>NAME 1<br>NAME 2<br>PHONE 1<br>PHONE 2<br>FAX<br>NET | HEAD OFFICE<br>SALES MANAGER<br>James SMITH<br><br>212-999-1111 (DIRECT)<br><br><br>idxxxxxx |
| 260 | MARK DATA | |
| 270 | LINK DATA<br>COMPANY DATA | ·<br>COMPANY ID : 5 |
|  | IMAGE 1 | FILE NAME |
| 280 | REMARKED DATA<br>DATE | 4.1, '93 (Thur) |
| 290 | USE RECORD DATA | : |

| 300 | | |
|---|---|---|
| 310 | COMPANY DATA RECORD | |
|  | COMPANY ID | 5 |
| 320 | COMPANY DATA<br>NAME 1<br>NAME 2<br>ZIP<br>ADD.<br>BLDG.<br>PHONE 1<br>PHONE 2<br>FAX | ABC COMPANY<br><br>10015<br>YYY, ZZZ CITY<br>WWW<br>212-999-1111 (DIRECT)<br><br>AAA-888-xxxx |
| 330 | ATTRIBUTE DATA<br>NAME FONT<br>MAP<br>A/C<br>CAP<br>EMPLOYEES | *ABC* COMPANY<br>FILE NAME<br>CHECKING A/C, PPP BANK, QQQ BRANCH<br>$xOOMIL.<br>xOO |

Fig. 24

My Base 4.20, 1993 (Tue) 18:12:30

| COMMON USE | 1/11 | | NAME CARD DATA | MARK[ ] |
|---|---|---|---|---|
| RRR PRESS | ANDREWS | | COMP. NAME 1 | RRR PRESS |
| E | EEE DESIG | BENNETT | COMP. NAME 2 | |
| K | KKK SALES | BLAKE | DIV. | EDITORIAL DIV. |
| K | KKK SALES | DENTON | POSIT. | JOURNALIST |
| L | LLL INDUS | EDWARDS | NAME 1 | Charles ANDREWS |
| O | OOO TRADE | GATES | NAME 2 | |
| Q | QQQ INDUS | GLOVER | PHONE 1 | |
| Q | QQQ INDUS | HANCOCK | PHONE 2 | |
| Q | QQQ INDUS | IRWIN | FAX | |
| Q | QQQ INDUS | JONES | DATE OF MEETING | 10.30, '92 (Fri) |
| R | RRR MACHI | LOGAN | PLACE | |
| | | | REASON | |
| | | | SPECIAL INF. | |
| | | | OTHER INF. | |
| | | | USE RECORD DATA | |

968
969

SELECT TITLE.
SELECT: ↑ ↓ CARD BOX LIST: ↓ NAME CARD DATA: → EXTENSION ON: TAB

[1] [2] [3] [4] [5] [6 SEARCH] [7] [8 EDIT] [9 SORT] [0 DIAL]

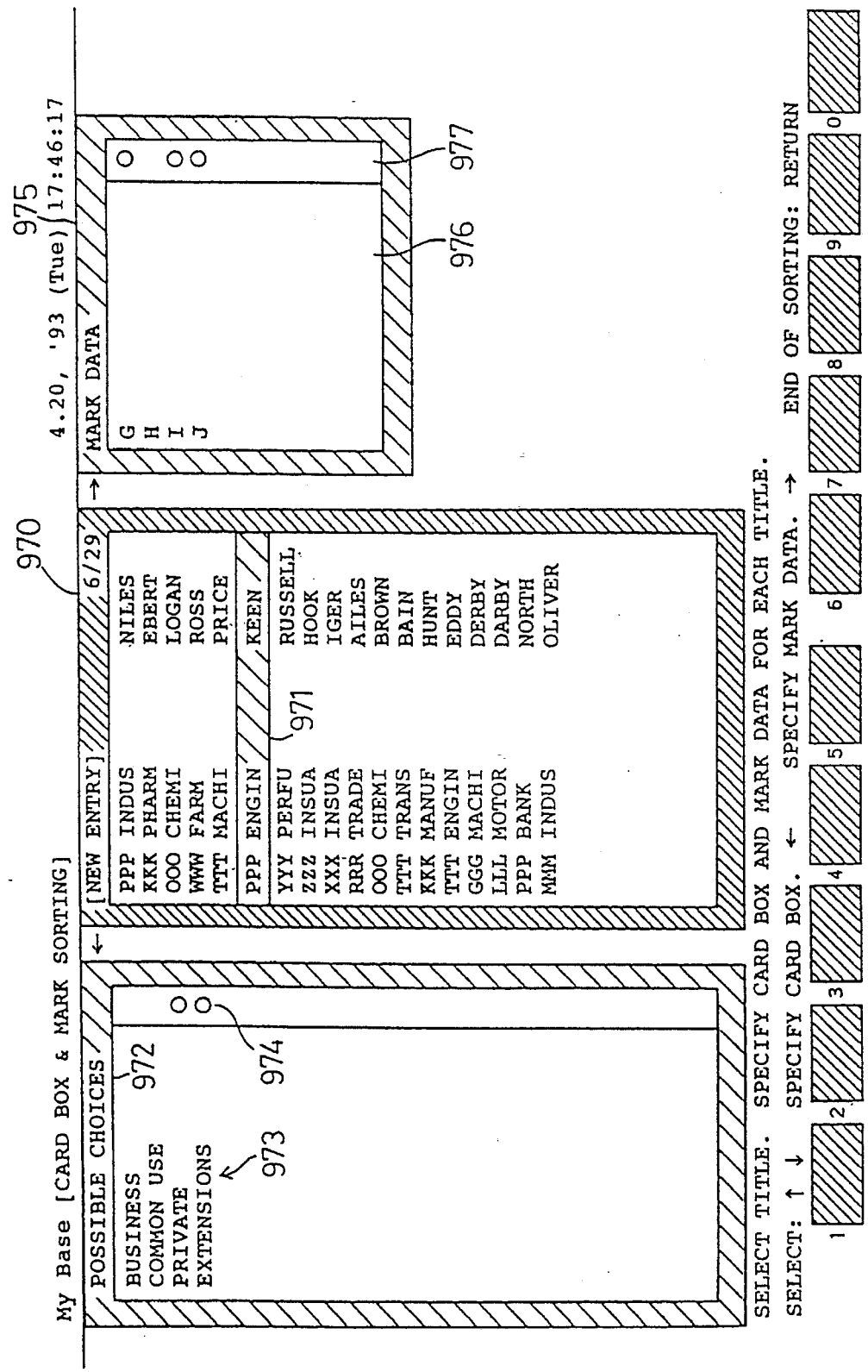

Fig. 28

My Base [CARD BOX QUICK SORTING]   4.20, 1993 (Tue) 17:47:03

[NEW ENTRY]   14/29   MARK [ ]

| | | | | NAME CARD DATA | |
|---|---|---|---|---|---|
| PPP INDUS | NILES | | | COMP. NAME 1 | TTT ENGINEERING |
| KKK PHARM | EBERT | | | COMP. NAME 2 | |
| OOO CHEMI | LOGAN | | | DIV. | R&D DIV. |
| WWW FARM | ROSS | | | POSIT. | SENIOR RESEARCHER |
| TTT MACHI | PRICE | | | NAME 1 | Collier EDDY |
| PPP ENGIN | KEEN | | | NAME 2 | |
| YYY PERFU | RUSSELL | | | PHONE 1 | |
| ZZZ INSUA | HOOK | | | PHONE 2 | |
| XXX INSUA | IGER | | | FAX | |
| RRR TRADE | AILES | | | DATE OF MEETING | 10.30 '92 (Fri) |
| OOO CHEMI | BROWN | | | PLACE | |
| TTT TRANS | BAIN | | | REASON | |
| KKK MANUF | HUNT | | | SPECIAL INF. | |
| TTT ENGIN | EDDY | | | OTHER INF. | |
| GGG MACHI | DERBY | | | USE RECORDS | |
| LLL MOTOR | DARBY | | | | |
| PPP BANK | NORTH | | | | |
| MMM INDUS | OLIVER | | | | |

[RETRIEVE 5 CARDS]

RETRIEVE ON FOR QUICK SORTING.
SELECT: ↑ ↓   RETRIEVE ON/OFF: SPACE   SETTLE: RETURN   CANCEL: ESC

1 ALL ON   2 ALL OFF   3 SEARCH   4 REVERSE   5
   992         993        994         995

Fig. 31

My Base                                    5.9,1993 (Sun) 13:46:05

| COMMON USE | 9/12 | ↓ | NAME CARD DATA | MARK [G ] |
|---|---|---|---|---|
| E | EEE DESIG | BENNETT | COMP. NAME 1 | QQQ INDUSTRIES Inc., |
| K | KKK SALES | BLAKE | COMP. NAME 2 |  |
| K | KKK SALES | DENTON | DIV. | DESIGN DIV., PQR OFFICE |
| L | LLL INDUS | EDWARDS | POSIT. | ENGINEER |
| O | OOO TRADE | GATES | NAME 1 | Michael IRWIN |
| Q | QQQ INDUS | GLOVER | NAME 2 |  |
| Q | QQQ INDUS | HANCOCK | PHONE 1 | 01-888-4444 |
| Q | QQQ INDUS | IRWIN | PHONE 2 |  |
| Q | QQQ INDUS | JONES | FAX |  |
| R | RRR MACHI | LOGAN | DATE OF MEETING | 2.5 '93 (Fri) |
| R | RRR PRESS | ANDREWS | PLACE | QQQ INDUSTRIES |
| S | SSS MANUF | MORGAN | REASON | PRESENTATION OF NEW PRODUCT |
|  |  |  | SPECIAL INF. |  |
|  |  |  | OTHER INF. |  |
|  |  |  | USE RECORDS | 3.10 '93 (Wed): SENT MATERIAL |
|  |  |  |  | 3.22 '93 (Mon): PHONED |
|  |  |  |  | 3.30 '93 (Tue): SENT MATERIAL |
|  |  |  |  |        (Thur): PHONED |

USE RECORD
EDIT MODE: ADDITION          —— 1020
CONTENTS:                    —— 1021
CHECK: COMPLETE              —— 1022
DATE: 4.1, '93 (Thur)        —— 1023

SPECIFY USE RECORD. (DATE: CTRL+/SHIFT+  FOR CHANGE IN YEAR OR MONTH)
UP, DOWN: ↑ ↓  OTHER CHOICES & CHANGE DATE: ← →  EXECUTE: RETURN  CANCEL: ESC

1 LIST  2  3 PAST DATA  4  5  6  7  8  9  0

Fig. 32

My Base                                              5.9, 1993 (Sun) 13:34:54

| COMMON USE | 9/12 | NAME CARD DATA | | LIST OF USE RECORD CONTENTS 1024 |
|---|---|---|---|---|
| E | EEE DESIG | BENNETT | COMP. NAME 1 | QQQ INDUS | RECEIVED CALL |
| K | KKK SALES | BLAKE | COMP. NAME 2 | | PHONED |
| K | KKK SALES | DENTON | DIV. | DESIGN DI | WAIT FOR CONTACT |
| L | LLL INDUS | EDWARDS | POSIT. | ENGINEER | FAX                        1025 |
| O | OOO TRADE | GATES | NAME 1 | Michael I | SENT MATERIAL |
| Q | QQQ INDUS | GLOVER | NAME 2 | | MEETING |
| Q | QQQ INDUS | HANCOCK | PHONE 1 | 01-888-44 | CONTACT |
| Q | QQQ INDUS | IRWIN | PHONE 2 | | OK |
| Q | QQQ INDUS | JONES | FAX | | CONFERENCE |
| R | RRR MACHI | LOGAN | DATE OF MEETING | 2.5 '93 ( | VISIT |
| R | RRR PRESS | ANDREWS | PLACE | QQQ INDUS | COME |
| S | SSS MANUF | MORGAN | REASON | PRESENTAT | PLAYED GOLF |
| | | | SPECIAL INF. | | PARTY |
| | | | OTHER INF. | | |
| | | | USE RECORDS | 3.7 '93 | |
| | | | | 3.10 '93 | |
| | | | | 3.22 '93 | |
| | | | | 3.30 '93 | |

USE RECORD
EDIT MODE: ADDITION
CONTENTS: PHONED
CHECK: INCOMPLETE (*)
DATE: 4.1, '93 (Thur)

SELECT CONTENTS.
SELECT: ↑ ↓   SETTLE: RETURN   CANCEL: ESC 1  2  3  4  5  6 CHANGE  7  8  9  0

Fig. 33

My Base                                         5.9, 1993 (Sun) 13:35:24

| COMMON USE | | 9/12 | | NAME CARD DATA | MARK [G  J |
|---|---|---|---|---|---|
| E | EEE DESIG | BENNETT | | COMP. NAME 1 | QQQ INDUSTRIES Inc., |
| K | KKK SALES | BLAKE | | COMP. NAME 2 | |
| K | KKK SALES | DENTON | | DIV. | DESIGN DIV., PQR OFFICE |
| L | LLL INDUS | EDWARDS | | POSIT. | ENGINEER |
| O | OOO TRADE | GATES | | NAME 1 | Michael IRWIN |
| Q | QQQ INDUS | GLOVER | | NAME 2 | |
| Q | QQQ INDUS | HANCOCK | | PHONE 1 | 01-888-4444 |
| Q | QQQ INDUS | IRWIN | | PHONE 2 | |
| Q | QQQ INDUS | JONES | | FAX | |
| R | RRR MACHI | LOGAN | | DATE OF MEETING | 2.5 '93 (Fri) |
| R | RRR PRESS | ANDREWS | | PLACE | QQQ INDUSTRIES |
| S | SSS MANUF | MORGAN | | REASON | PRESENTATION OF NEW PRODUCT |
| | | | | SPECIAL INF. | |
| | | | | OTHER INF. | |
| | | | | USE RECORDS | 3.10 '93 (Wed): SENT MATERIAL |
| | | | | | 3.22 '93 (Mon): PHONED |
| | | | | | 3.30 '93 (Tue): SENT MATERIAL |
| | | | | | 4.1, '93 (Thur): PHONED |

1030
1031
1032

UP, DOWN: ← ↓    TARGET LIST: ←    WORKERS LIST: ↑    EXTENSION ON: TAB

| 1 | 2 | 3 | 4 | 5 | 6 USE RECORD | 7 REMARKED | 8 IMAGE | 9 PRINT | 0 DIAL |

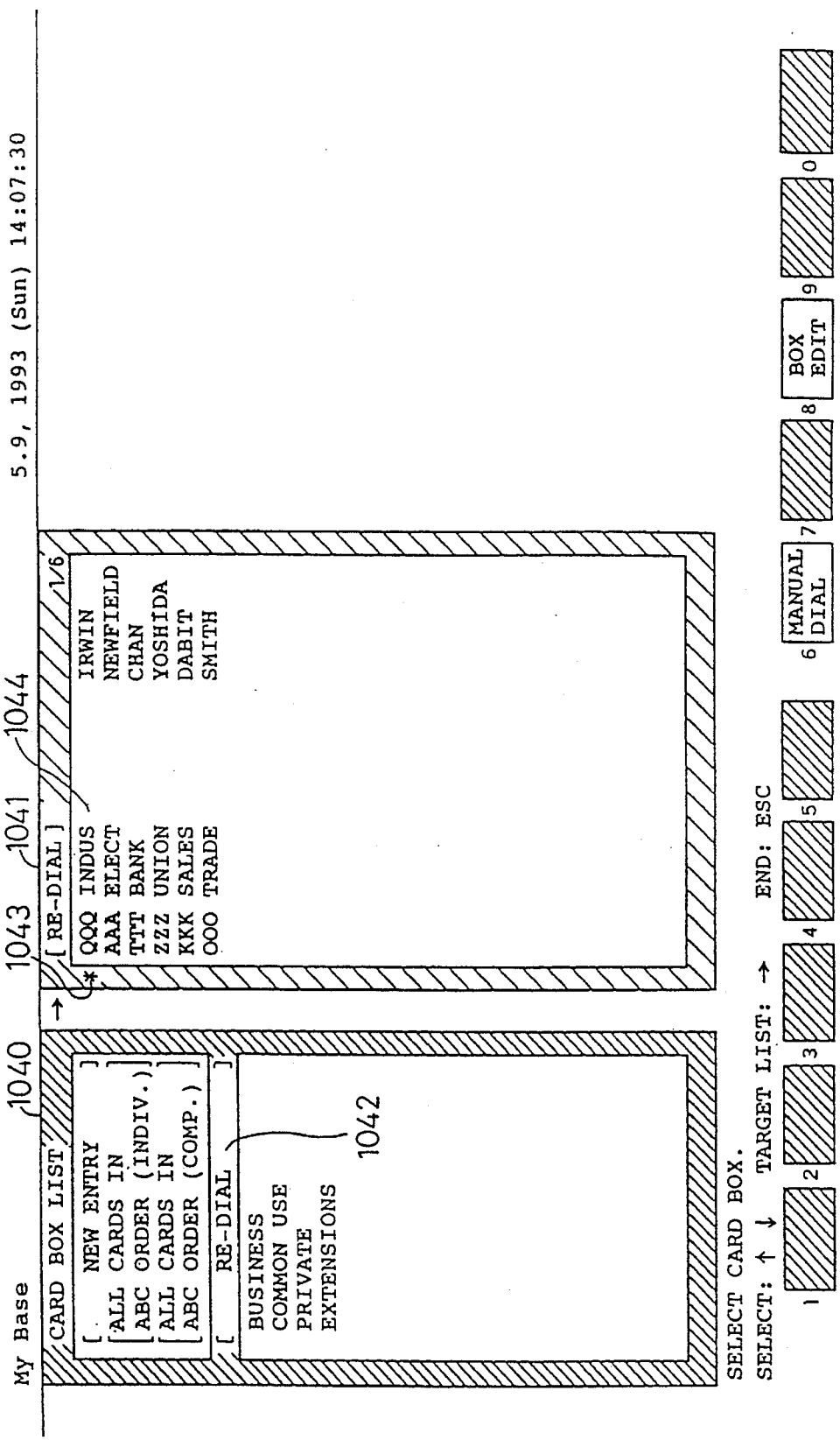

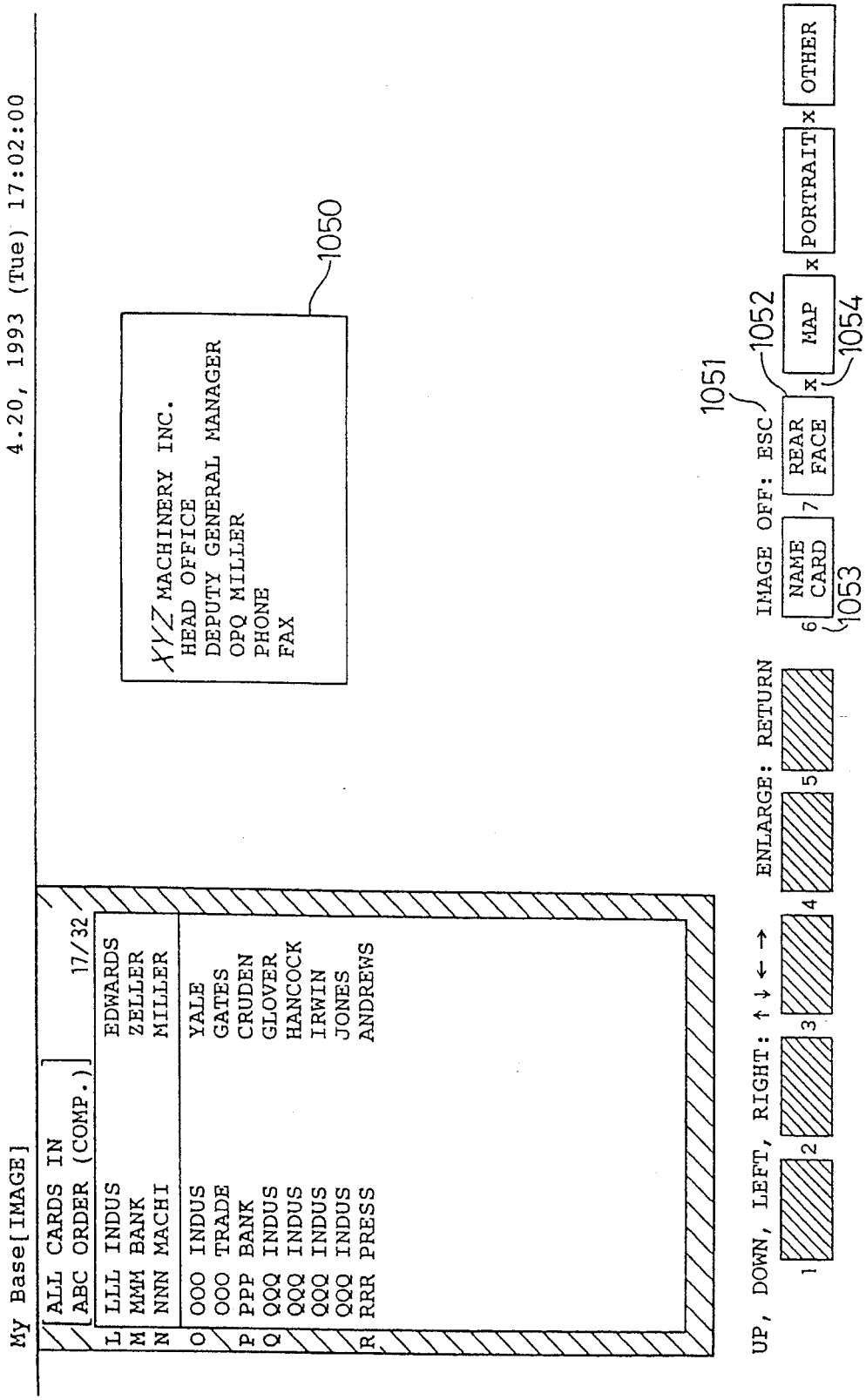

DATA MANAGEMENT, DISPLAY, AND RETRIVAL SYSTEM FOR A HIERARCHICAL COLLECTION

This application claims the priority of Japanese application Seial No. 5-116123 filed May 18, 1993 which is incorporated herein by reference in its entirety.

BACKGROUND OF THE INVENTION

1. Field of the Invention

The present invention relates to a data management system, and more specifically to a data management system for managing various data according to a simple manner. The data management system is, for example, applicable to management of name cards. When a telephone number is processed as data, the data management system may be combined with an automatic dialing function so as to allow various data processing as well as data management.

2. Description of the Related Art

Known data management system include a relational data base and a card-type data base. The relational data base is suitable for management of complicated data structures whereas the card-type data base is preferably used for managing data having a relatively simple structure as information specified in a card. An application of such data management systems is a name card management system. Name cards include information required for individuals especially related to business, and the name card management system allows smooth proceeding of business by effectively managing the name cards. Proposed name card management systems include a card-type data base system having predetermined items such as an individual name, a company name, and a section fixed for management of name cards, and an electric card filing system as disclosed in JAPANESE PATENT LAYING OPEN GAZETTE No. 4-350768.

The electric cord filing system disclosed in JAPANESE PATENT No. 4-356768 has a complicated specification to realize multiple functions, thus being difficult for beginners or unexperienced users. Such electric filing systems do not consider daily use of data by individuals. The former name card management system, on the other hand, has fixed items, which often do not meet individual needs of the user. A system for processing a name card as an image has further disadvantages regarding with a hardware specification such as non-effective retrieval of name cards and slow access to and display of a desired image. Development of a novel data management system simply and effectively operated even by unexperienced end users has thereby been highly required.

SUMMARY OF THE INVENTION

The object of the present invention is accordingly to provide a novel data management system having excellent usability and being operated simply and effectively even by an unexperienced user.

The present invention is directed to a first data management system for managing a plurality of data sets where each data set includes a plurality of items. The first data management system includes data summary generating means for extracting an item data element including at least part of the plurality of items out of the each data set in order to generate and store a data summary, the data summary including the item data element as well as relational information representing a relation of the item data element to the each data set, group display means for displaying a plurality of groups and respective group names given to the plurality of groups in such a manner as to allow selection of a desired group, the plurality of data sets being sorted according to the plurality of groups, sorting means for allocating the each data set to at least one of the plurality of groups, representative data display means for, when the desired group is selected out of the plurality of groups, displaying a representative data list, which includes a plurality of the item data elements corresponding to specific data sets belonging to the desired group, in such a manner as to allow selection of a desired item data element, and original data display means for, when the desired item data element is selected, displaying an original data set corresponding to the desired item data element based on the relational information for the desired item data element.

The first data management system manages a plurality of data sets classified into a plurality of groups. A representative data list includes a plurality of item data elements where each item data element corresponds to an original data set. When a desired item data element is selected among the representative data list, an original data set corresponding to the desired item data element is displayed immediately. The data management system has a function of data management in a plurality of groups, thus allowing flexible and simple operation.

The data management system may further include mark specification means for giving a specific mark, which is selected out of plural marks previously defined, to a predetermined item included in a certain data set, and tentative writing means for tentatively writing specific data into the predetermined item based on a relation between the specific mark and other data included in the certain data set.

This structure of giving a specific mark and tentatively rewriting data based on the specific mark is especially useful for management of data which are frequently used.

The invention is also related to a second data management system for managing a plurality of data sets where each data set includes a plurality of item data elements. The second data management system includes item data folding means for, when a space required for displaying a specific block of item data elements included in a data set exceeds a predetermined space defined for the specific block of item data elements, folding part of the item data elements in the specific block and displaying non-folded item data elements included in the data set, cursor display means for displaying a cursor in one of item data elements of a displayed data set, determination means for, when a movement of the cursor in a predetermined direction is instructed, determining whether folded item data elements exist in the predetermined direction in the displayed data set, and cursor movement means for, when existence of folded item data elements is determined by the determination means, successively displaying the folded item data elements, and moving the cursor to an item data element next to the specific block after display of all the folded item data elements is completed.

In the second data management system of the invention, when a space required for displaying a specific block of item data elements included in a data set exceeds a predetermined space defined for the specific block of item data elements, part of the item data elements in the specific block is folded. When a movement of the cursor in a predetermined direction where folded item data elements exist is instructed while the cursor is in the specific block, the folded item data elements are successively displayed. The cursor is then moved to an item data element next to the specific block after display of all the folded item data elements is completed. This structure allows required data to be effectively displayed in a limited space by simple movement of the cursor.

The invention is also directed to a third data management system for managing a plurality of data sets where each data set includes a plurality of items. The third data management system includes sequence modification means for modifying a sequence of the plurality of data sets according to a certain item included in each data set, and priority order specification means for, when the plurality of data sets include data representing a predetermined arrangement, activating the sequence modification means to modify the sequence of data sets successively according to specific items related to the predetermined arrangement in a certain priority order corresponding to the predetermined arrangement.

The third data management system allows a number of data to be sorted in a predetermined priority order, for example, in an order of positions.

The invention is further directed to a fourth data management system for managing a plurality of data sets where each data set includes a plurality of items. The fourth data management system includes data summary generating means for extracting an item data element regarding with at least part of the plurality of items out of the each data set in order to generate and store a data summary, the data summary comprising the item data element as well as relational information representing a relation of the item data element to the each data set, group display means for displaying a plurality of groups and respective group names given to the plurality of groups in such a manner as to allow selection of a desired group, the plurality of data sets being sorted according to the plurality of groups, sorting means for allocating the each data set to at least one of the plurality of groups, representative data display means for, when the desired group is selected out of the plurality of groups, displaying a representative data list, which includes a plurality of the item data elements corresponding to specific data sets belonging to the desired group, in such a manner as to allow selection of a desired item data element, and registration instructing means for referring to the representative data list in order to select at least one of the plurality of groups for registering the each data set.

In this structure, each data set is allocated to a corresponding group by simply referring to a representative data list instead of displaying the whole data set. This reduces the labor and time required for classification and registration of each data set in a corresponding group.

According to another aspect, a fifth data management system for managing a plurality of data sets where each data set regards with a plurality of items and includes at least a name data element and a telephone number data element, includes data registration means for registering a new data set. The data registration means includes first means for identifying information attached to a telephone number data element included in the new data set, and second means for changing an item for storing the telephone number data element according to the information identified by the first means.

In this data management system, each telephone number is registered to a certain item according to information attached to the telephone number, for example, 'direct-in', 'extension', 'night', or 'facsimile'. This allows effective registration of telephone numbers.

The invention is further directed to a sixth data management system for managing a plurality of data sets where each data set includes a plurality of items at least including a name and a telephone number. The sixth data management system includes data summary generating means for extracting an item data element regarding with at least part of the plurality of items out of the each data set in order to generate and store a data summary, the data summary comprising the item data element as well as relational information representing a relation of the item data element to the each data set, group display means for displaying a plurality of groups and respective group names given to the plurality of groups in such a manner as to allow selection of a desired group, the plurality of data sets being sorted according to the plurality of groups, sorting means for allocating the each data set to at least one of the plurality of groups, representative data display means for, when the desired group is selected out of the plurality of groups, displaying a representative data list, which includes a plurality of the item data elements corresponding to specific data sets belonging to the desired group, in such a manner as to allow selection of a desired item data element, automatic dialing means for, when an automatic dialing is instructed while the desired item data element is selected, automatically dialing a telephone number included in a certain data set corresponding to the desired item data element, and original data display means for, when the automatic dialing is implemented, displaying the certain data set corresponding to the desired item data element based on the relational information for the desired item data element.

In this data management system, when an automatic dialing is instructed while a desired item data element is selected, a telephone number included in a certain data set corresponding to the desired item data element is automatically dialed. At the moment, the certain data set including the telephone number is displayed for reference. While only the representative data list is referred for automatic dialing, the whole data set is displayed for reference when a person having the telephone number answers the phone.

According to still another aspect of the invention, a seventh data management system for managing a plurality of data sets where each data set includes a plurality of items includes data summary generating means for extracting an item data element regarding with at least part of the plurality of items out of the each data set in order to generate and store a data summary, the data summary comprising the item data element as well as relational information representing a relation of the item data element to the each data set, group display means for displaying a plurality of groups and respective group names given to the plurality of groups in such a manner as to allow selection of a desired group, the plurality of data sets being sorted according to the plurality of groups, sorting means for allocating the each data set to at least one of the plurality of groups, representative data display means for, when the desired group is selected out of the plurality of groups, displaying a representative data list, which includes a plurality of the item data elements corresponding to specific data sets belonging to the desired group, in such a manner as to allow selection of a desired item data element, and use record data recording means for, when a certain data set corresponding to the desired item data element in used, recording data representing a use record as part of the certain data set.

A use record represents useful information as part of data. In actual data management, recently-used data is often used again.

The invention is further related to an eighth data management system including reading means for reading a document, which characters are printed on according to a predetermined format, as a document image, character extraction means for individually extracting specific areas corresponding to the characters from the document image, character recognizing means for recognizing an image segment included in each the specific area as a character, item data recognizing means for measuring a distance between specific areas next to each other, and for, when the distance is greater than a mean distance by a predetermined value, determining a space corresponding to the distance as a border between two divisions of item data and recognizing specific data existing in each the division as an item data element, and data management means for managing a plurality of item data elements recognized by the item data recognizing means as a data set.

In this data management system, while at least part of data are input by reading a document, a border between divisions of item data is determined according to a measured distance, and data existing in each division is recognized as an item data element. This allows data specified in the document to be automatically input as item data elements.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows an exemplified display of a name card record;

FIG. 4 shows another example of a name card record and a company data record;

FIG. 24 shows an example of preferential display;

FIG. 25 shows a card box list, a target list, and a mark data list where the target list is currently selected;

FIG. 28 shows a quick sorting process where a plurality of titles are selected;

FIG. 31 shows a process of specifying a use record;

FIG. 32 shows a list of use records displayed on the screen in the process of specifying a use record;

FIG. 33 shows name card data including a use record for a scheduled or non-completed matter;

FIG. 34 shows a card box list where 'RE-DIAL' is selected;

FIG. 35 shows an exemplified screen displaying linked image data;

DESCRIPTION OF THE PREFERRED EMBODIMENT

Figure 1:
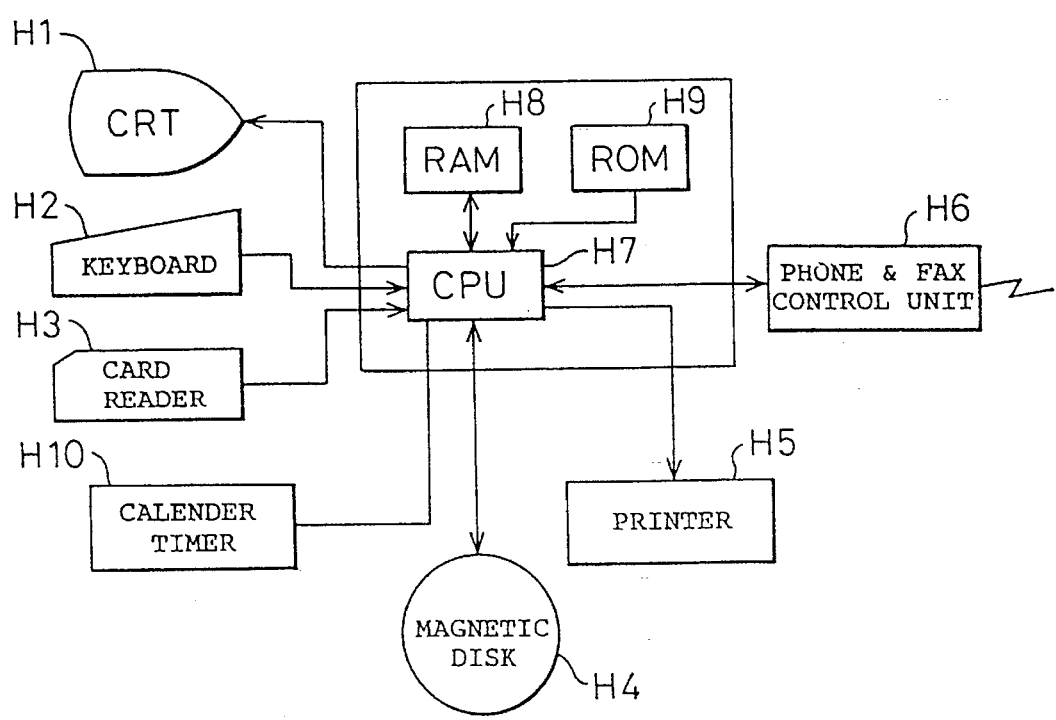
FIG. 1 is a block diagram showing a typical hardware structure of a data management system according to the invention.

FIG. 1 is a block diagram showing a typical hardware structure of a data management system according to the invention. The data management system is realized by a conventional personal computer, which includes a CRT H1 for display, a keyboard H2 for data input, a card reader H3 for reading name cards or other information as visual images, a magnetic disk H4 for storing data, a printer H5 for printing, a telephone & facsimile (PHONE & FAX) control unit H6 to be connected to a telephone circuit including an external pay phone circuit for automatic dialing and facsimile transmission, a CPU H7, a RAM H8, and a ROM H9 which constitute a main body of the computer, and a calendar timer H10 for time counting.

The data management system may further include a scanner device for inputting a color image, a pointing device such as a mouse, and an external bulk storage device such as a magneto-optical disk though none of such devices are shown in FIG. 1.

Figure 2:
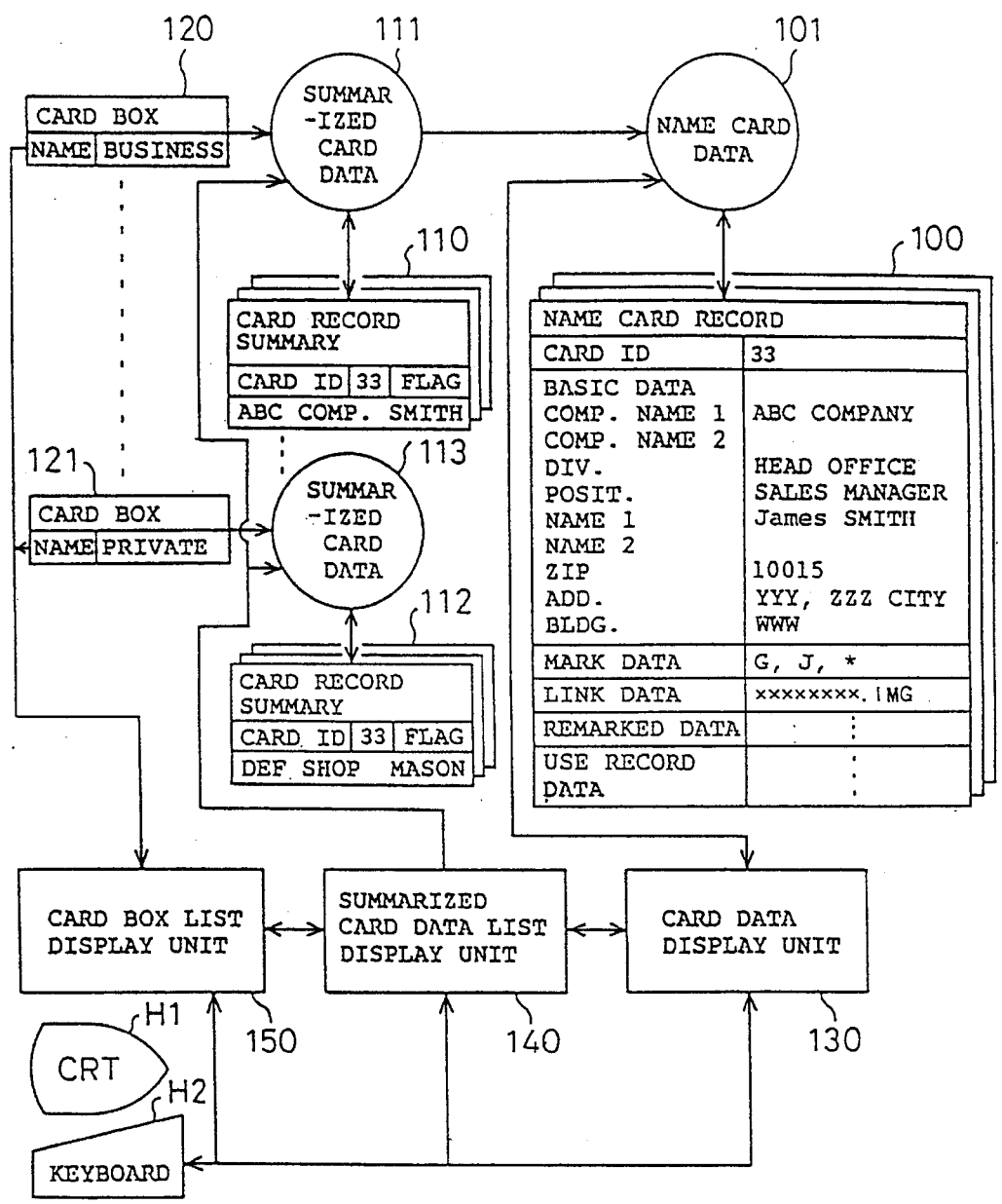
FIG. 2 is a functional block diagram showing a name card management system as a first embodiment according to the invention.

This hardware structure is applied to all the embodiments described herein. Description of each preferred embodiment is based on a block diagram mainly illustrating functions realized on this hardware structure. FIG. 2 is a functional block diagram showing a name card management system as a first embodiment according to the invention. The name card management system of the first embodiment shown in FIG. 2 has a plurality of virtual card boxes which correspond to a plurality of groups used for data classification. Each virtual card box has a name specified by a user. The user classifies name cards into the plurality of virtual card boxes or groups according to his requirements so as to allow visual and hierarchical management of a large number of name cards. This system realizes quick, easy, and accurate classification, retrieval, and display. Experiments of personal data management have taught that keyword retrieval for all data or name cards stored is generally not required but that only part of data (name cards) are used commonly. It is thereby practical to select and classify data or name cards used commonly or at least occasionally into a plurality of groups, that is, a plurality of virtual card boxes. Data regarding with each name card is then retrieved and read out according to a list of keywords such as company names and personal names. The system of the embodiment first selects a group or virtual card box, and then selects required data out of a list of keywords including representative data like company names and personal names. Such selection out of a hierarchical list realizes practical and effective data management.

Each element of the name card management system shown in FIG. 2 is described in detail. A name card record 100 includes various data representing information of each name card.

FIG. 3 shows an exemplified display of a name card record 160. The name card record 160 representing a set of data obtained from a name card includes a variety of data written in lines. Items of the data are listed in a left column of the record 160 whereas contents of the data are shown in a right column of the record 160. A card ID 170 shows an ID number of the record 160. Basic data 180 represent basic items and contents generally included in a name card: for example, COMP. NAME 1: AAA Company. Mark data 190 represent conditions of specified marks: for example, the symbol 'G' (season's greeting) is ON (shown by open circles). Link data 200 includes pointers for other data, such as image data, other document files, and other name card records. The pointer may be a file name for external files or a card ID or another equivalent ID for internal data.

FIG. 35 shows an example of linked image data. In this example set under a mode for display of a linked image, function keys F6 through F10 correspond to a menu bar including names of readable images. For example, a click of a title box 'Name Card' 1051 assigned to a function key F6 displays a linked image representing a front face of a name card. A click of another title box 'Rear Face' 1052 assigned to a function key F7 displays a linked image representing a rear face of the name card. Five images are attributable to each person. The title box 'Name Card' 1051 on the function key F6 currently clicked is distinguished from the other title boxes in the menu bar, for example, shown in a different color.

FIG. 35 shows image data 1050 linked to the title box 'Name Card' 1051 assigned to the function key F6. When link data exists for a specific image, both a function key number and a corresponding title box are displayed on the screen as '6' 'Name Card' 1053. When no link data exists for a specific image, on the other hand, it is preferable to display the non-existence distinctively. For example, a title box without a function key number is displayed on the screen as 'x' 'Map' 1054. Alternatively, title boxes of function keys where link data exist are distinguished from those where no link data exists by painting in different colors.

Remarked data 210 includes information specifically written by the user; for example, date, place, and reason of the meeting. Use record data 220 includes a plurality of use records. Each use record consists of information including use of the name card record, and generally includes date and reason of access to the person of the name card. The use record may be prepared by the user or automatically created by the system. In the example of FIG. 3, the use record data 220 also includes the number of use records. This is especially useful when name card records having no use record data are retrieved for deleting action.

FIG. 4 shows another example of a name card record and a company data record. In this example, part of the basic data regarding with the company included in the name card record shown in FIG. 3 is shown as a separate company data record 300. In many cases, it is required to manage name cards of a plurality of workers in the same company. The common company data included in each individual name card record thereby unnecessarily increases the whole data volume. Each name card record does not have the common company data in its basic data, but includes a company ID 310 in link data 270 as a pointer to company information. The company data record 300 includes the company ID 310, common company data 320, and attribute data 330. The attribute data may include a character font of the company name taken from the name card, a file name where a company map image is stored, and other information such as a bank account of the company. This method of separating the common company data as a company data record and giving only the company ID in each name card record effectively saves the whole data volume and labor required for change of the company name or address.

The data record structure may be determined according to the requirements. When name card records are utilized by a plurality of users through a local area network (LAN), for example, individual data such as remarked data and mark data are separated from common data for all the members in the network such as company data. In such a case, the common data record is placed in a network server while the individual data record is placed in each computer terminal. Separate management of individual data and common data is advantageous for common use of name card data in the whole company or a specific division. This saves the disk volume, simplifies data maintenance, and enhances safety and protection of private or confidential data.

The name card record 100 shown in FIG. 3 has items of NAME 2 and COMP. NAME 2 as well as NAME 1 and COMP. NAME 1 where a nickname or an abbreviation may be input as a retrieval keyword.

Now referring back to FIG. 2 showing the structure of the name card management system, name card data 101 includes a plurality of name card records 100 as shown in FIGS. 3 and 4. A card record summary 110 is made based on the name card record 100 and placed on the RAM H8. The card record summary 110 includes a flag showing a condition of the summary 110, a card ID representing the corresponding name card record 100, and part of basic data included in the name card record 100. In this example shown in FIG. 2, basic data in the card record summary 110 includes the family name of an individual and the first nine letters of a company name, and are used as keyword data. Access to the card record summaries 110 on the RAM H8 is significantly quicker than that to the name card records 100 on the magnetic disk H4. The speed of data selection out of a number of records is also drastically enhanced since the data volume of each card record summary 110 is remarkably smaller than that of the original name card record 100. Creation of such card record summaries 110 improves the speed of various processes without the name card records 100; for example, display of a list of the card record summaries 110 and check for duplicates of the same name card.

When the name card management system of the invention is realized as an application program working on the computer, simultaneous use of another application program may be required for enhanced functions. The smaller data volume on the RAM H8 preferably allows a plurality of application programs to be used simultaneously with a limited volume of the main memory.

Summarized card data 111 shown in FIG. 2 includes a plurality of the card record summaries 110. The name card management system of the embodiment has a plurality of summarized card data corresponding to one name card data 101. Another set of card record summaries 112 and summarized card data 113 shown in FIG. 2 have the same structures as the card record summaries 110 and the summarized card data 111. Each summarized card data 111 (113) includes a plurality of files of card record summaries 110 (112), which are used on the RAM H8. When re-sorting according to a specific condition is instructed for card record summaries included in a card box, the contents of the files are sorted out after each registration of a new card record summary. The results of sorting are stored on the magnetic disk H4 for back-up after each re-sorting or use of a card record summary. Although the card record summary includes the card ID, the flag, and basic data as the company name and the family name in the example of FIG. 2, each record summary may include only the card ID. In the latter case, data required for display are read out of the name card record 100 in the name card data 101.

The summarized card data 111 (113) is similar to a card box where actual name cards are stored, with the exception of some fundamental differences. Such differences include that included data have substantial consistency and that one name card can be placed into a plurality of card boxes. Each summarized card data 111 (113) corresponds to a card box 120 (121) having a program for giving a specific name to the summarized card data and a region for storing the specific name. Each card box 120 (121) has a name specified by the user for effective data management; for example, 'PRIVATE' or 'RE-DIAL'.

The card box is used for specifying an order in a card record summary list or setting a maximum number of card record summaries included as well as giving the specific name. One card record summary may be duplicated in a plurality of card boxes, that is, a plurality of summarized card data. A card box list display unit 150 is a block for displaying a list of names of card boxes whereas a summarized card data list display unit 140 is a block for displaying a list of contents of each card box, that is, part of card record summaries such as individual names and company names. In the description hereinafter, a summarized card data list is referred to as a target list, and each card record summary displayed in the target list is referred to as a title. A name card data display unit 130 is a block for displaying part or all of each name card record.

Figure 16:
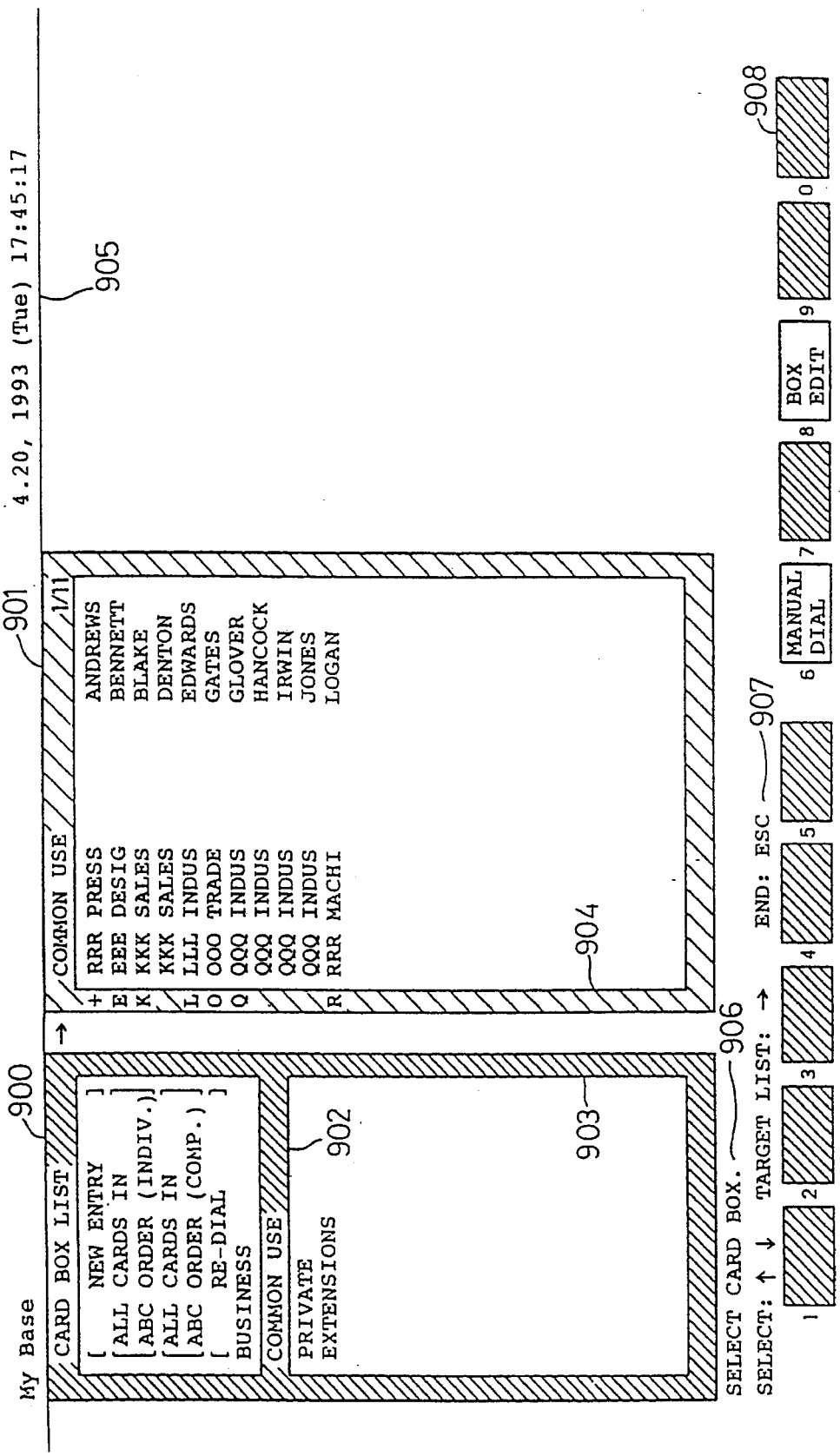
FIG. 16 shows an exemplified screen displaying a card box list.

FIG. 16 shows an example of a card box list and a target list displayed on the CRT H1. A card box list 900 showing names of card boxes is displayed on the left part of the screen by the card box list display unit 150. Names of the existing card boxes are shown under the title of 'CARD BOX LIST'. In the card box list 900, names in the brackets represent card boxes initially set in the system whereas names without the brackets represent card boxes specified by the user. A reversal display cursor 902 shows a name of a card box currently selected, and is moved upward or downward by operating up and down cursor keys on the keyboard H2. In this example, a user-specified card box 'COMMON USE' is selected out of the card box list 900, and contents of the card box 'COMMON USE' 901 are shown as a target list on the right part of the screen. A frame 903 of a list currently active is shown in a dark color whereas a frame 904 of a list currently inactive is shown in a light color. In the drawing of FIG. 16 and the subsequent drawings, the dark color and the light color are respectively shown by filling and hatching. When a plurality of lists are displayed simultaneously on the screen as in the above case, the frame of a list currently active is made prominent. The screen also has a title line 905 on its uppermost, which includes a function name, a date, and a time. There is a message line 906 on the bottom of the screen, which gives an instruction currently required. It should be noted that drawings of screen displays such as FIG. 16 including the date and time on the title line 905 are only illustrative and not restrictive nor consistent in any sense.

In the example of FIG. 16, a reference line 907 for displaying key operations currently usable is given immediately below the message line 906. Under the reference line 907, there is a function key line 908 for displaying function names allocated to the function keys on the keyboard H2. A press of a function key activates the corresponding function. Function keys without function names have no functions allocated.

Figure 17:
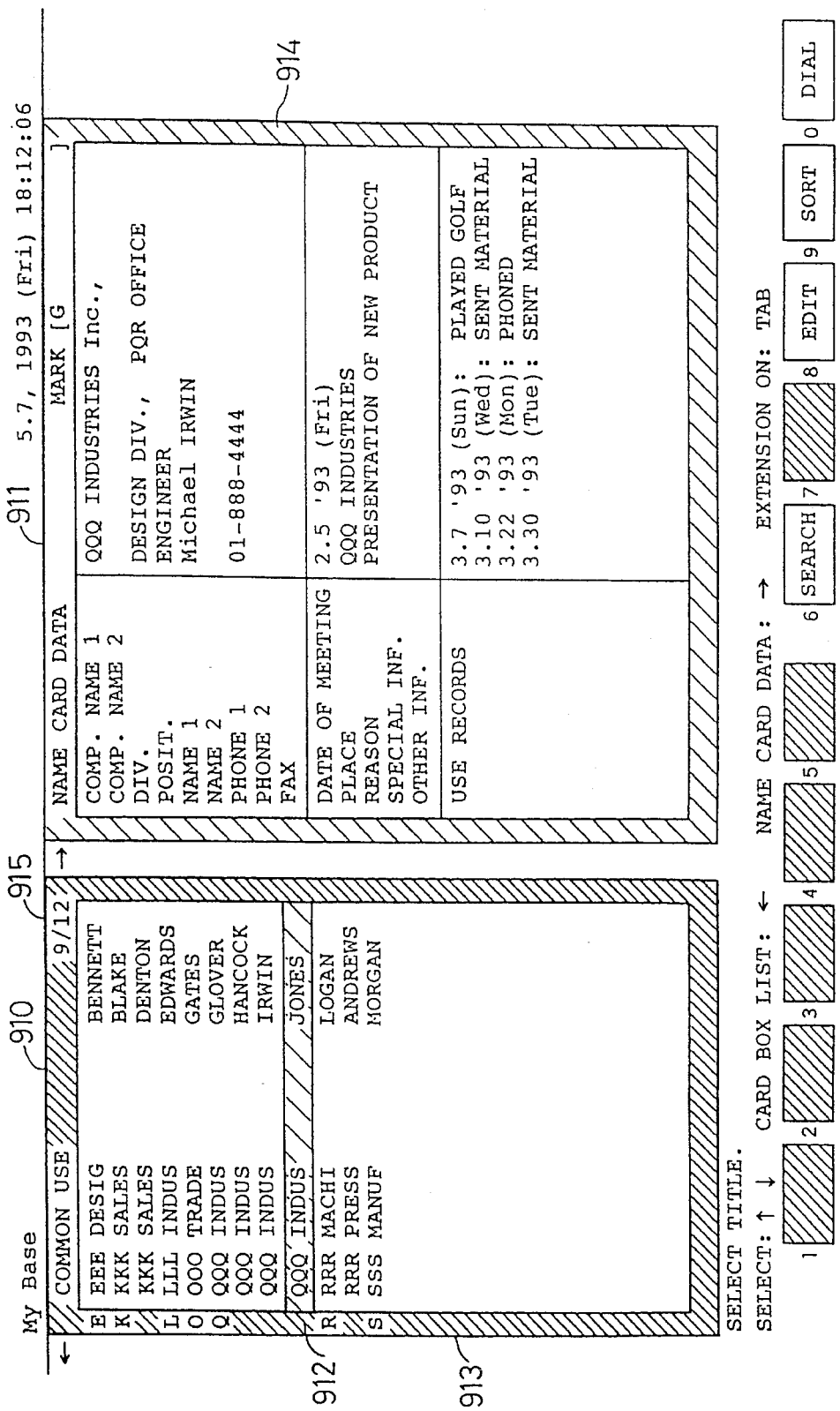
FIG. 17 shows an exemplified screen displaying a summarized card data list.

A display by the summarized card data list display unit 140 is described briefly hereafter. When the rightward cursor key is pressed on the keyboard H2 under the conditions of FIG. 16, that is, under selection of the card box 'COMMON USE', the summarized card data list display unit 140 is activated to change a screen display showing a target list 910 and name card data 911 as shown in FIG. 17. In the example of FIG. 17, the target list 910 is under active conditions. A cursor 912 reversely displays a title currently selected in the target list 910, and is moved upward or downward by operating up and down cursor keys on the keyboard H2. The target list 910 shows company names and family names while the name card data 911 shows a name card record 100 regarding with a target individual currently selected in the target list 910. In the example of FIG. 17, the cursor is placed on a title 'QQQ INDUS IRWIN' in the target list 910, which is displayed reversely to show selection. The corresponding name card data 911 shows a name card record 100 regarding with the target individual.

A counter 915 representing an ordinal number assigned to the currently selected title out of all data included in the card box is shown on the right upper corner in a frame 913 of the target list 910. As described previously, the frame 913 of the target list 910 currently active with the cursor is displayed in a dark color while a frame 914 of name card data currently inactive is displayed in a light color. First letters of titles are shown in a left end of the frame 913 of the target list 910. When consecutive titles have an identical first letter, the first letter is shown for only the first of the consecutive titles.

Figure 18:
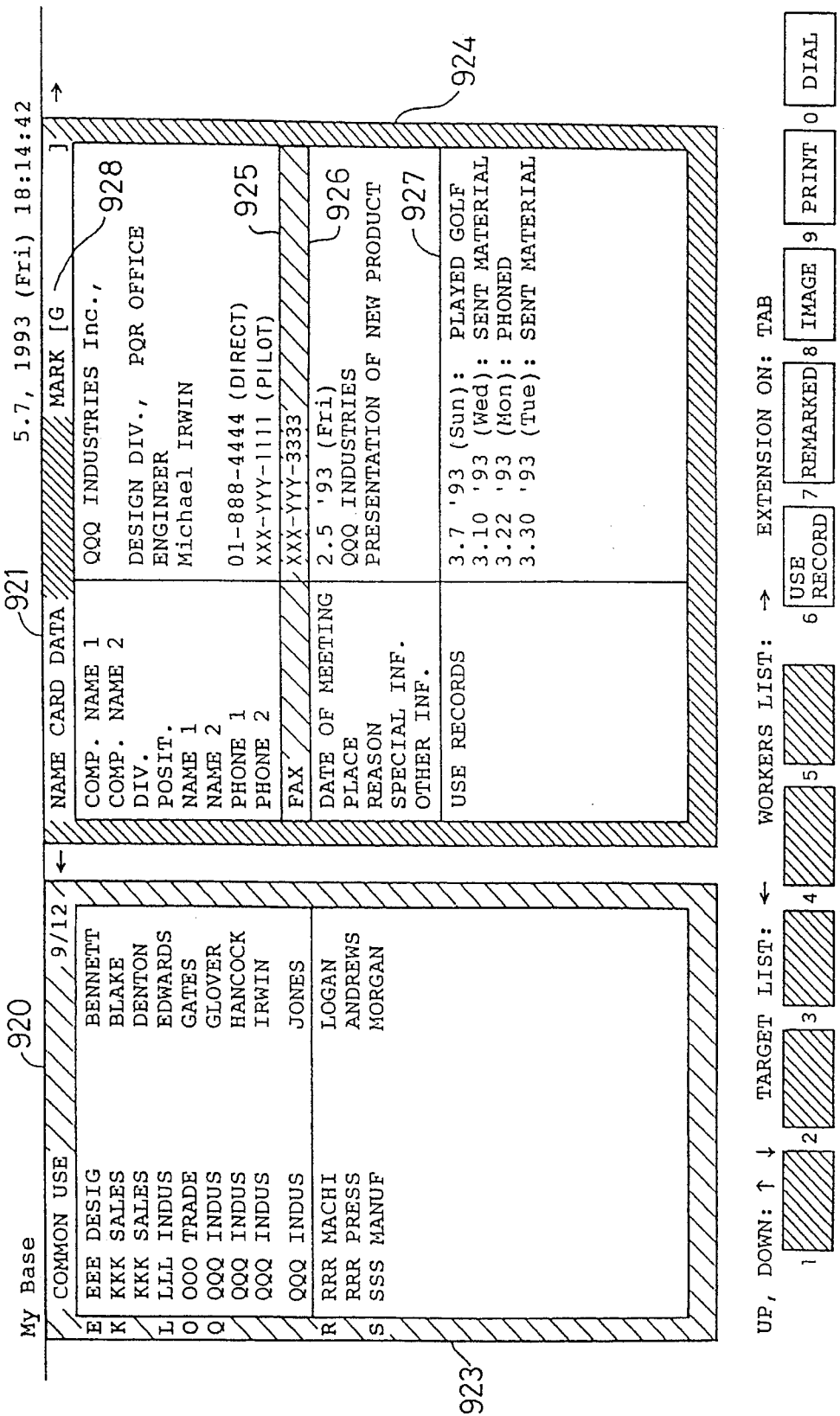
FIG. 18 shows an exemplified screen displaying name card data.

A display by the name card data display unit 130 is described briefly hereafter. When the rightward cursor key is pressed on the keyboard H2 under the conditions of FIG. 17, that is, under selection of a specific title in the target list, the name card data display unit 130 is activated to change the screen display for prominently showing name card data 921 as shown in FIG. 18. The name card data 921 is identical with the name card data 911 of FIG. 17 except that a frame 924 is displayed in a dark color. In the same manner, a target list 920 of FIG. 18 is identical with the target list 910 of FIG. 17 except that a frame 923 is displayed in a light color and a title selected and reversely displayed in FIG. 17 is underlined in FIG. 18. In the example of FIG. 18, a cursor 925 is placed in the name card data 921 to reversely show an item of basic data. The cursor 925 is moved upward or downward by operating up and down cursor keys on the keyboard H2. When the leftward cursor key on the keyboard H2 is pressed under the condition of FIG. 18, the screen display is returned to the condition of FIG. 17. When the leftward cursor key is further pressed under the condition of FIG. 17, the screen display is returned to the condition of FIG. 16.

Figure 19:
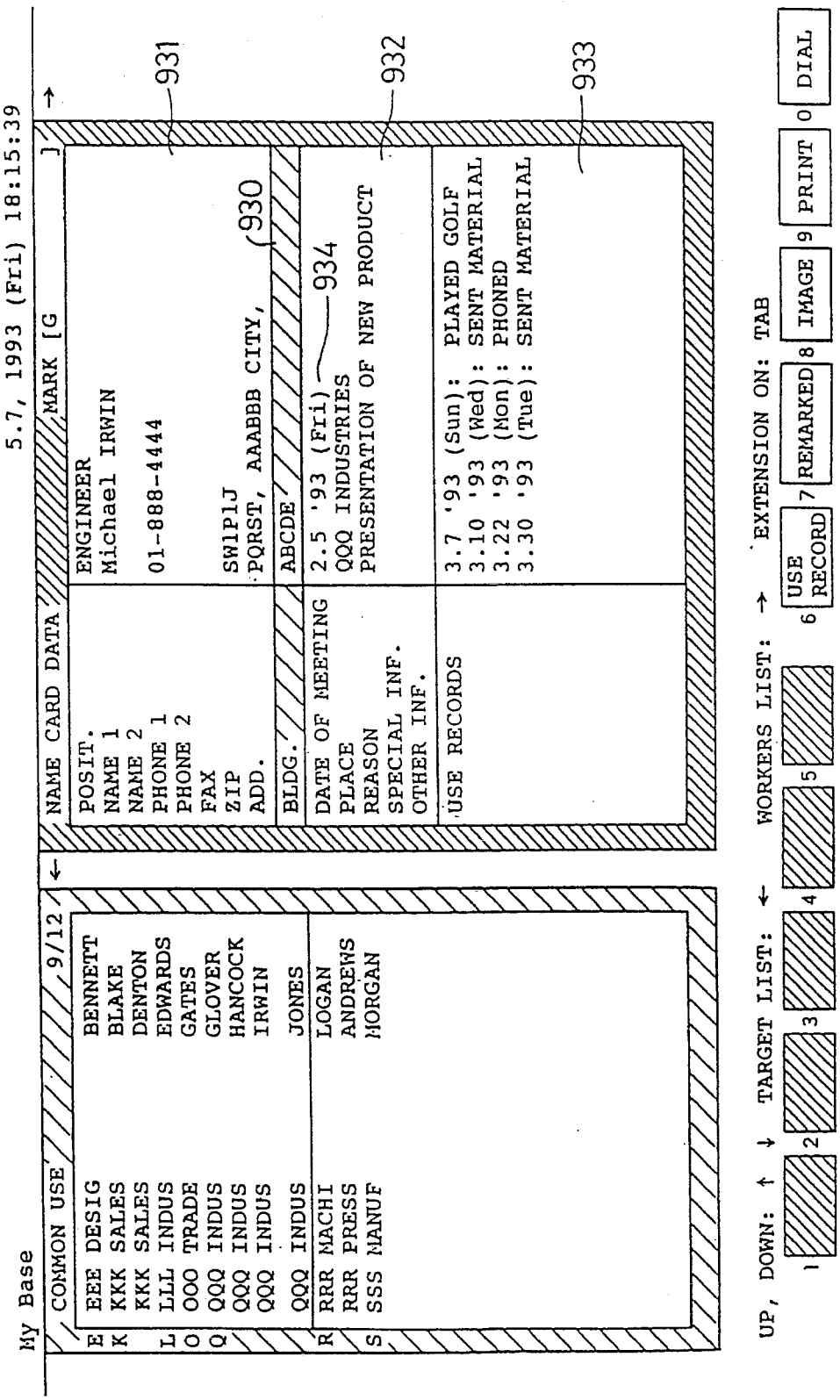
FIG. 19 shows an exemplified screen displaying name card data under conditions of folding scroll.

Referring to FIG. 19, folding scroll, an additional function of the name card data display unit 130 is described. In the example of FIG. 19, name card data includes basic data 931, remarked data 932, and use record data 933 shown in three separate display areas. Solid lines 926 and 927 of FIG. 18 define borders of the three separate display areas. Areas allocated to the remarked data 932 and the use record data 933 are sufficient to display all the data included. The basic data 931 are, however, not displayed completely because of a limited number of display lines, and items in the basic data 931 rarely referred to, for example, zip code (ZIP), address (ADD.), and building name (BLDG.), are thereby folded down. When the down cursor key on the keyboard H2 is pressed while a reversal display cursor 930 (925) is on the lowermost position of the display area allocated to the basic data 931 as shown in FIG. 18, the screen is scrolled down to successively display the zip code, the address, and the building name. When the down cursor key is further pressed after the reversal display cursor 930 reaches the final item of the basic data 931, that is, the building name, the reversal display cursor 930 moves to the display area allocated to the remarked data 932. In the example of FIG. 19, a first item 'DATE OF MEETING' 934 of the remarked data 932 is selected and reversely displayed. Scrolling up and down the screen through operation of the up and down cursor keys enhances the usability and saves the number of display lines.

In the name card management system of the embodiment, the screen display is naturally and quickly changed between different hierarchies, that is, the card box, the target list, and the name card data, through operation of the up, down, rightward, and leftward cursor keys on the keyboard H2. A variety of functions are realized by operating function keys F6 through F10 existing on the right half of the keyboard H2 as clearly seen in FIGS. 16 through 18. The up, down, rightward, and leftward cursor keys as well as the return key are also positioned in the right half of the keyboard H2. Most functions required are accordingly realized by operating the above ten keys in the right half of the keyboard, which gives ergonomic effects. This structure allows single-handed key operation useful for both handicapped people and healthy people, for example, one hand for holding a handset and the other hand for data access or input. The name card management system may be permanently stored in a memory to be accessible during execution of another program. The user can call out the name card management system while making a phone call or answering the phone.

The PHONE & FAX control unit H6 shown in FIG. 1 executes the following functions:

(1) checking the conditions of the telephone circuit and automatically activating the name card management system when receiving a call;

(2) automatically activating a display screen showing a card box list and other required information when receiving a call;

(3) having means for searching for a telephone number of an individual who is making a phone call through a digital network, automatically retrieving name card data corresponding to the telephone number, and displaying the corresponding name card data; and (4) executing speech recognition when receiving a call from a certain individual through an outside line, automatically answering the phone with a recorded message, and automatically distributing the telephone number of the individual and received data to extensions specified by the individual. Character recognition is executed for facsimile transmission from the outside line. The PHONE & FAX control unit H6 may automatically activate computers or name card management systems connected to the extensions specified by the individual, and automatically display new data entry or input data by the individual.

Figure 5A:
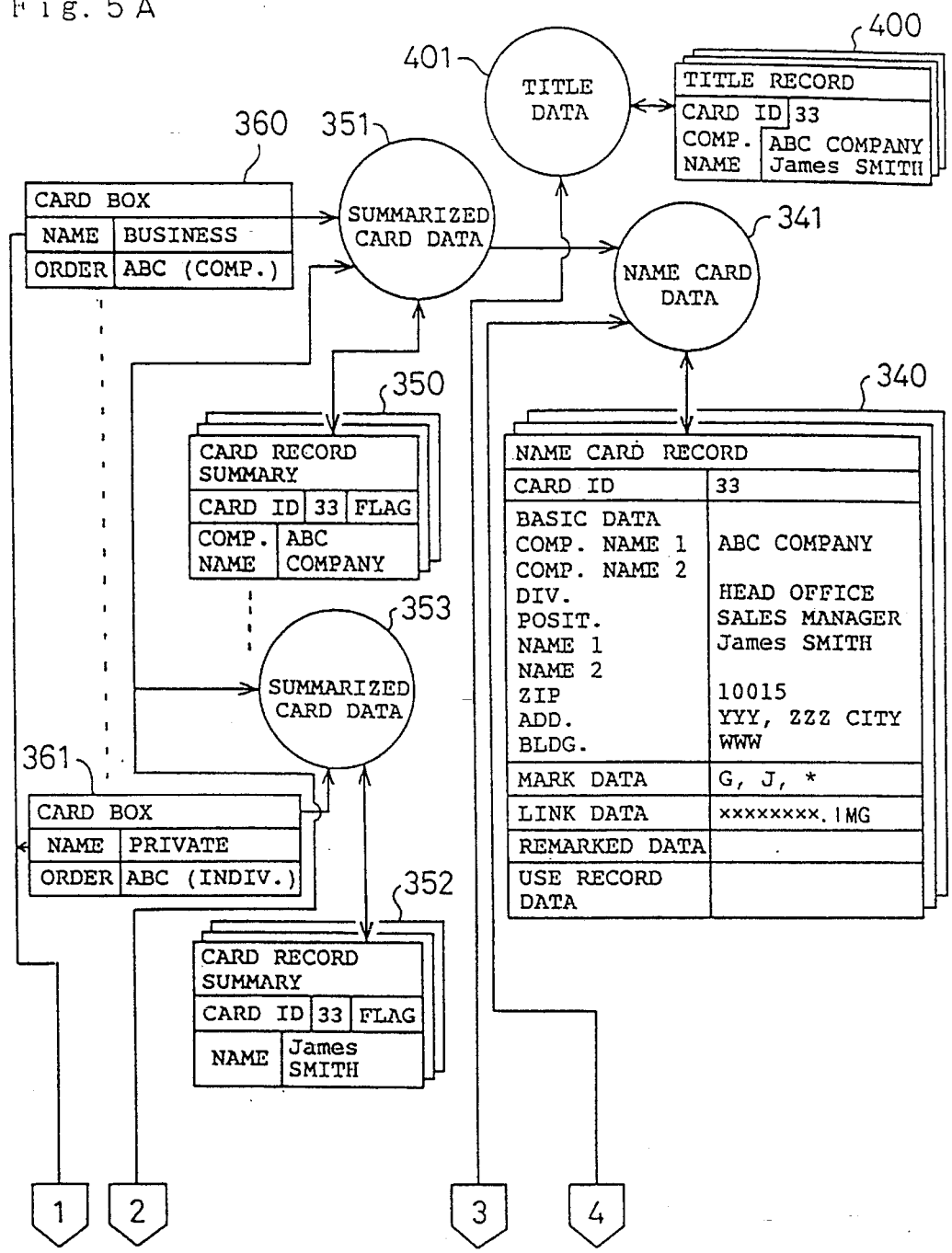
FIG. 5A and FIG. 5B are functional block diagrams showing another name card management system as a second embodiment of the invention.
Figure 5B:
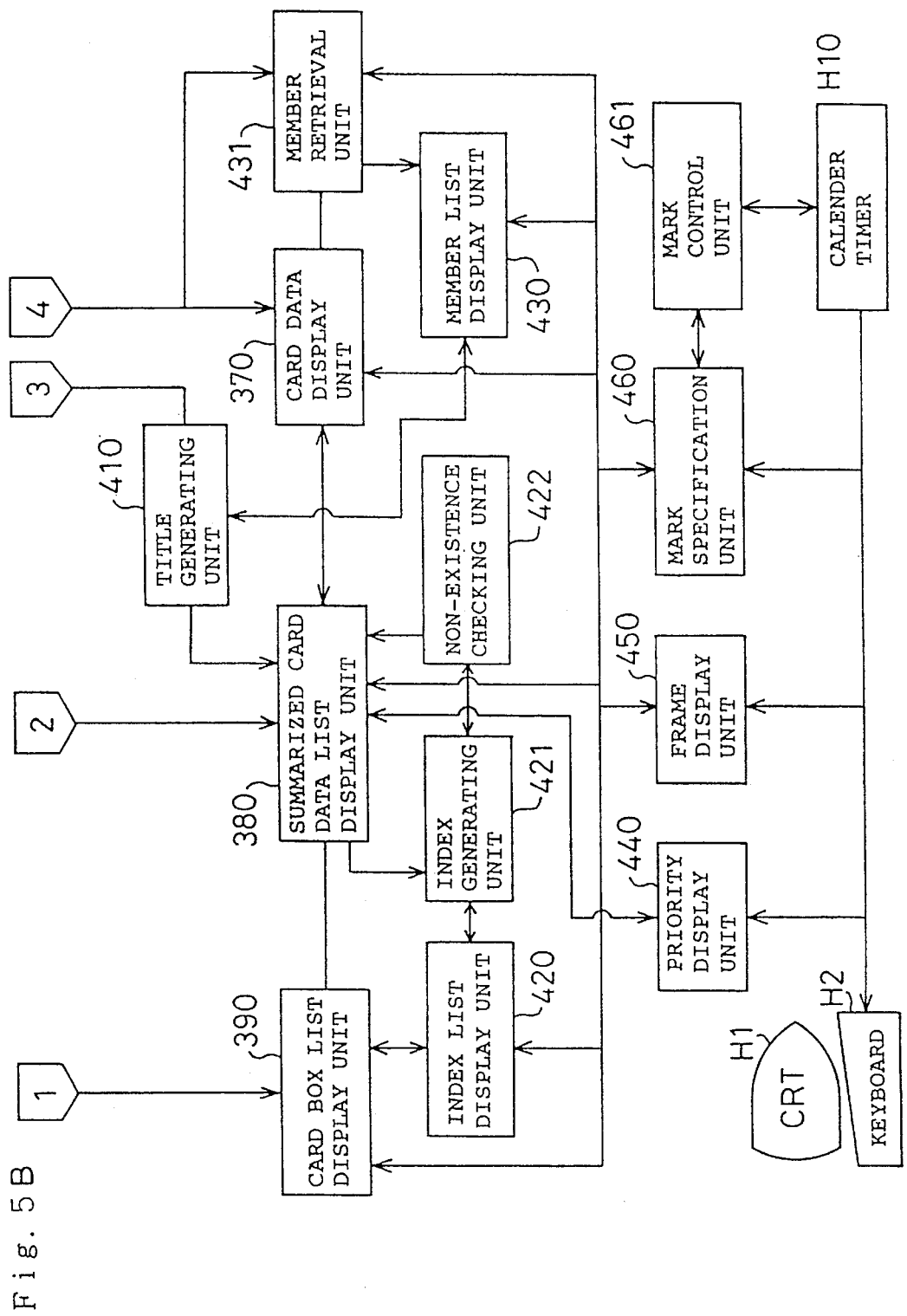

A second embodiment according to the invention is described hereafter. FIG. 5A and FIG. 5B are functional block diagrams schematically showing a name card management system of the second embodiment. Unlike the name card management system of the first embodiment shown in FIG. 2, the name card management system of the second embodiment shown in FIG. 5A and FIG. 5B include a card record summary 350 without extracted basic data, but uses title records 400, title data 401, and a title generating unit 410 for displaying extracted basic data according to the requirements. The structure of the second embodiment realizes additional functions other than display of the summarized card data list 910 (FIG. 17) as part of the card record summaries 110 (FIG. 2).

Figure 6:
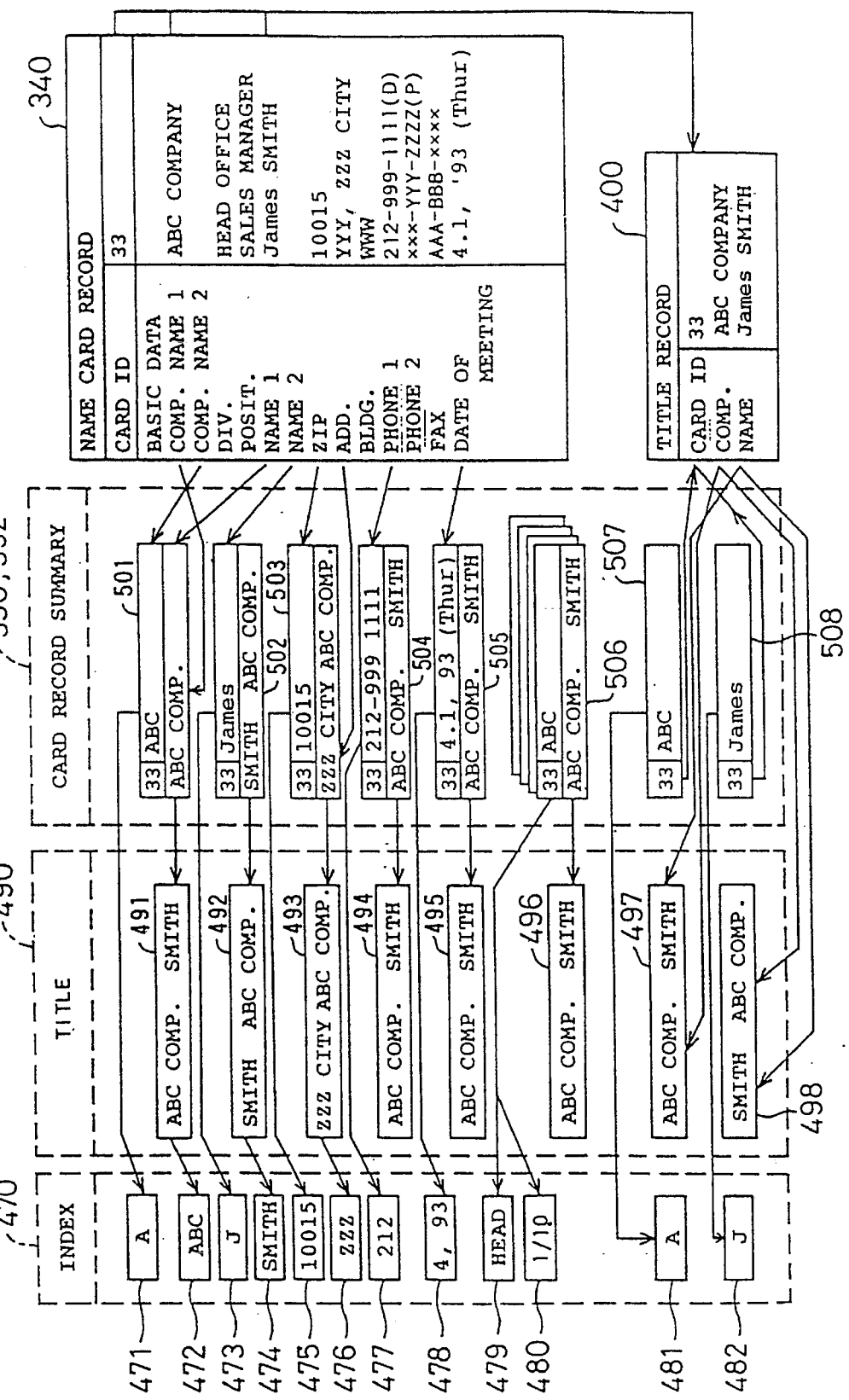
FIG. 6 illustrates card record summaries, summarized card data, and various indexes.

Operation of the title generating unit 410 is explained according to FIG. 6. Each title record 400 processed by the title generating unit 410 includes character data regarding with a card ID, a company name, and an individual name.

These character data are default setting and changeable according to the requirements. Each card record summary 350 (352) may have an arbitrary structure. In FIG. 6, examples of card record summaries 501 through 508 are illustrated. A card record summary 507 includes a card ID and a company name whereas another card record summary 508 includes a card ID and a family name. In the second embodiment, these card record summaries are not used directly, but the title generating unit 410 creates titles using title records 400. The title generating unit 410 retrieves a title record 400 according to card IDs included in the card record summaries 507 and 508 so as to obtain title data, COMP. NAME: 'ABC COMPANY' and NAME: 'SMITH'. The format of a title may be, for example, sixteen letter spaces for the company name and six letter spaces for the family name. A title 497 having the company name first or a title 498 having the individual name first is then generated according to the specific format based on the title data previously obtained. The order of displaying data in each title 497 or 498 is determined corresponding to the display order of the corresponding card box.

In the name card management system of the second embodiment, a summarized card data list display unit 380 displays a target list (card record summary list) using titles generated by the title generating unit 410.

In the name card management system of the second embodiment, each card box 360 (361) is used for specifying an order of display in a card record summary list as well as giving a specific name to the card box. A different display order may be specified for each card box: for example, an alphabetical order of company names for the card box 360 and an alphabetical order of individual names for the card box 361. Each card record summary 350 (352) includes data corresponding to the specified display order, and is used as a key index for determining an order of display or used for making various indexes described later.

The card record summaries 501 through 508 are prepared according to characters of the corresponding card boxes. For example, the first card record summary 501 is prepared according to a card box where data are sorted and stored in the alphabetical order of company names. The second card record summary 502 corresponds to a card box where data are sorted and stored in the alphabetical order of individual names. When a certain name card record fulfills conditions of an existing card box, a card record summary corresponding to the certain name card record is prepared according to the conditions of the existing card box. When a certain name card record, on the contrary, does not fulfill conditions of any existing card box, no card record summary is prepared. A name card record 340 of FIG. 6 having the address of 'ZZZ CITY' can not belong to, for example, a card box where all name card records having the address of 'ABC CITY'. In such a case, a card record summary 503 can not be prepared corresponding to the name card record 340. Each card record summary is set to have irreducible minimum items as default values, but may be set automatically to include other items according to the volume of the RAM H8 or specified on a menu screen by the user.

Other functions which the name card management system of the second embodiment possess are described hereafter. A member retrieval unit 431 is a block for retrieving all name card records fulfilling a certain condition which name card data currently displayed has. For example, when the company name is the certain condition for activating the member retrieval unit 431, people working for the same company as that of the name card data currently displayed are retrieved. A member list display unit 430 then receives results of the retrieval, and displays a list of workers of the same company.

Figure 20:
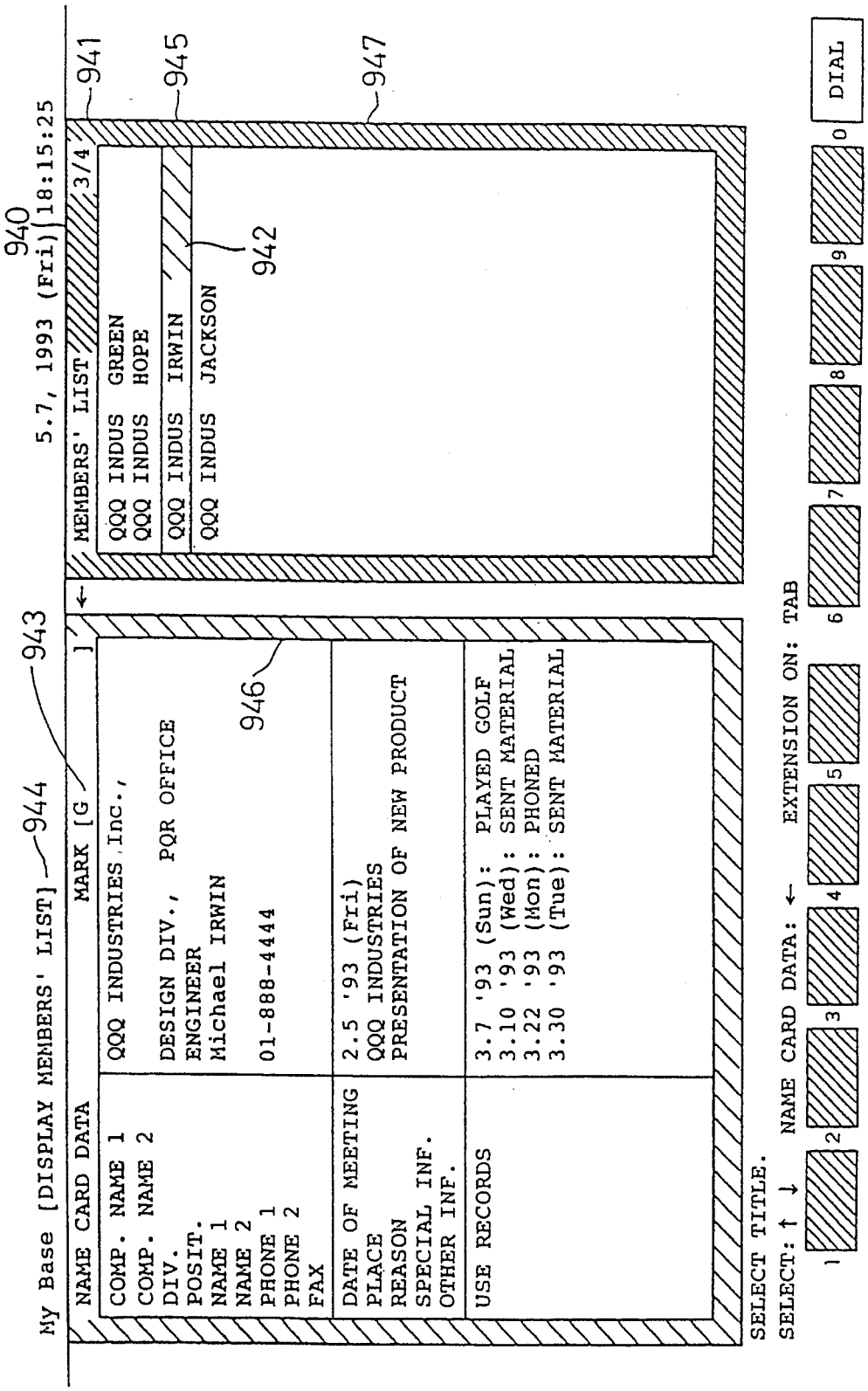
FIG. 20 shows an exemplified screen displaying a members' list.

FIG. 20 shows an exemplified list of people working for the same company displayed by the member list display unit 430. A list including titles fulfilling the condition of the company name is displayed in the right column of the screen as shown in FIG. 20 by operating the rightward cursor key under the conditions of FIG. 19, that is, under display of name card data. Even when retrieval by the member retrieval unit 431 gives the result that the very person whose name card data are currently displayed is the only member fulfilling the certain condition, the member list display unit 430 displays a list including only one person whose name card data are currently displayed. While the member list display unit 430 is displaying a list of members fulfilling the certain condition, a currently active function 944 is displayed on the title line 905. In the example of FIG. 20, name card data 943 representing detailed information of an individual is shown in the left part of the screen. Since the name card data 943 is not selected at the moment, a frame 946 of the name card data 943 is displayed in a light color. A frame 947 of a member's list 940 currently selected is, on the other hand, displayed in a dark color. A counter 941 representing an ordinal number assigned to a currently selected member out of the number of all members included in the list 940 is shown on the right upper corner of the members' list 940.

While the members' list is displayed on the screen, a cursor 942 is positioned on a title 945 regarding with an individual whose name card data are currently displayed. The title 945 is reversely displayed as default setting. As the title currently selected is changed through operation of the up and down cursor keys, the display 943 of name card data is also changed corresponding to the title. When the leftward cursor key is pressed under the conditions of FIG. 20, the whole image on the screen is not changed, but the frame 946 of the display 943 is changed to the dark color. A further press of the leftward cursor key returns the screen to the condition of FIG. 19. In this case, the screen shows name card data of the individual selected prior to the retrieval and display of the members' list, irrespective of the member currently selected among the members' list 940.

As described above, the name card management system of the second embodiment easily makes a list of members fulfilling a certain condition which a target individual possesses, for example, working for the same company. This allows effective use of card boxes. Use of a card box including information related to only a limited number of individuals (key persons) is far more convenient than use of a card box including information regarding with all individuals, and allows members having a certain condition identical with that of a target key person to be retrieved according to a simple process as described above. There are various demands of users, for example, immediate access to information regarding with people who are in charge of a certain project or sales of a certain new product, members of a specific meeting, or an introducer of a certain individual. The system of the second embodiment meets such demands by keyword retrieval.

An index generating unit 421 is described now by referring again to FIG. 5B. The index generating unit 421 generates indexes as shown in FIG. 6 based on titles displayed by the summarized card data list display unit 380 or data obtained from the card record summary 350 (352). Numerals 471 through 482 denote examples of indexes. Each index should correspond to relevant titles which are less than the number of all titles or card record summaries included in the corresponding card box. These indexes are used for reducing the number of titles to be searched and skipping non-relevant titles in a target list. Compared with simple selection of a desired title out of all titles sorted in the alphabetical order of individual names through operation of the up and down cursor keys, application of an index such as 'ABC' or 'Smith' significantly reduces the number of titles to be searched.

The type of the index is determined according to the contents of the card record summaries and requirements of the user. In the example of FIG. 6, various card record summaries 501 through 508 are prepared from one name card record 340 according to the characters of the card boxes. Arrows in FIG. 6 denote information to be referred to. Titles 491 through 498 or indexes 471 through 482 are generated based on these card record summaries. The first letter of the company name or the individual name extracted from the card record summary 350 (352) may be used as an index: for example, 471, 473, 481, and 482. The first block of each title 490 may be used as an index: for example, 472, 474, and 476. Other examples of indexes determined according to the card record summary 350 (352) include a zip code as 475, an area code as 477, and a date of registration as 478. The index may represent an approximate position of the corresponding card record summary in a target list, like a head portion, a middle portion, or a last portion (479 in FIG. 6). The approximate position of the corresponding card record summary in the target list may be shown as numerical data, like 1/10 of the target list or 2/5 of the target list (480 in FIG. 6).

Figure 21:
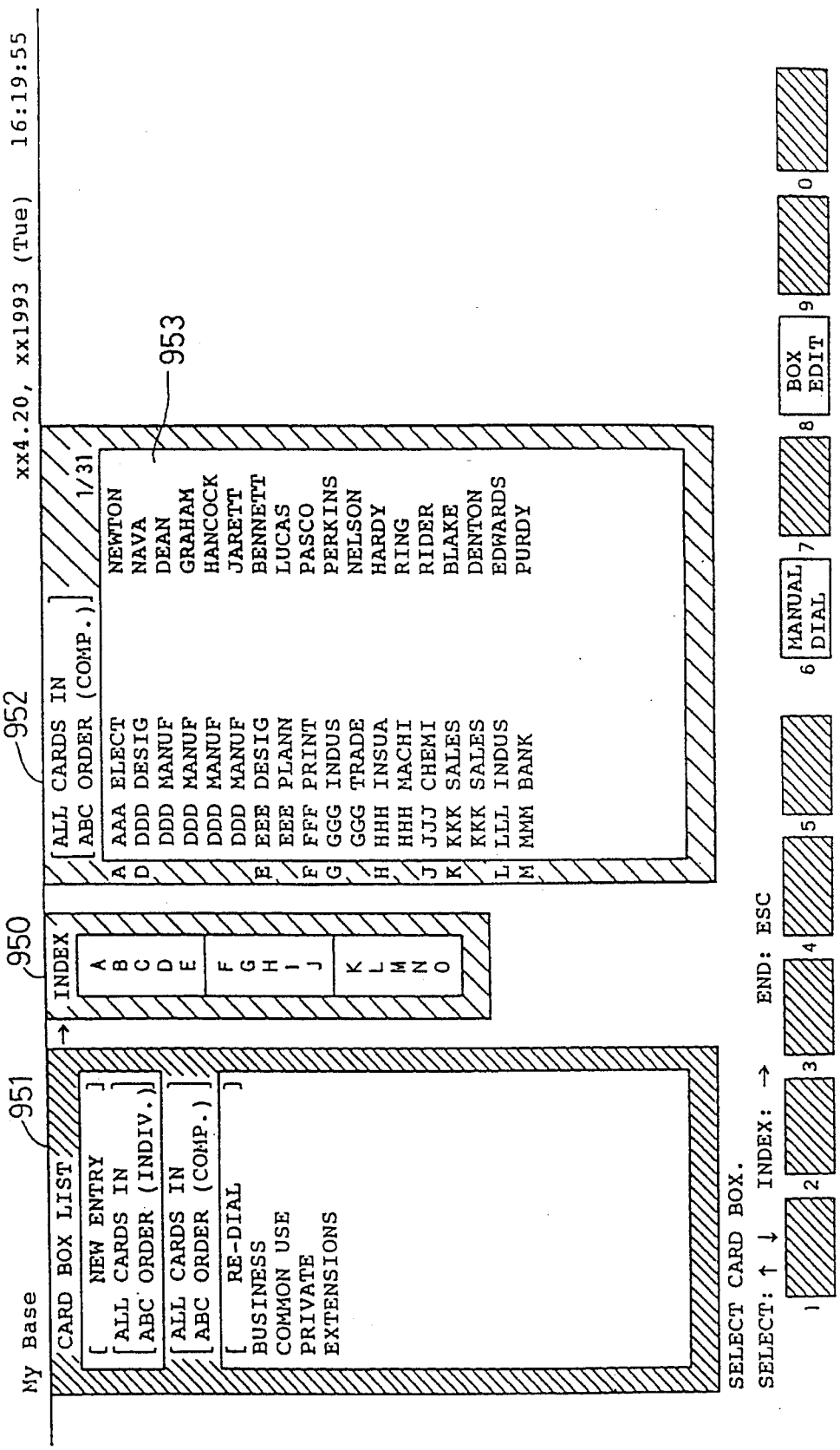
FIG. 21 shows an exemplified screen displaying a card box list, an index list, and a target list.
Figure 22:
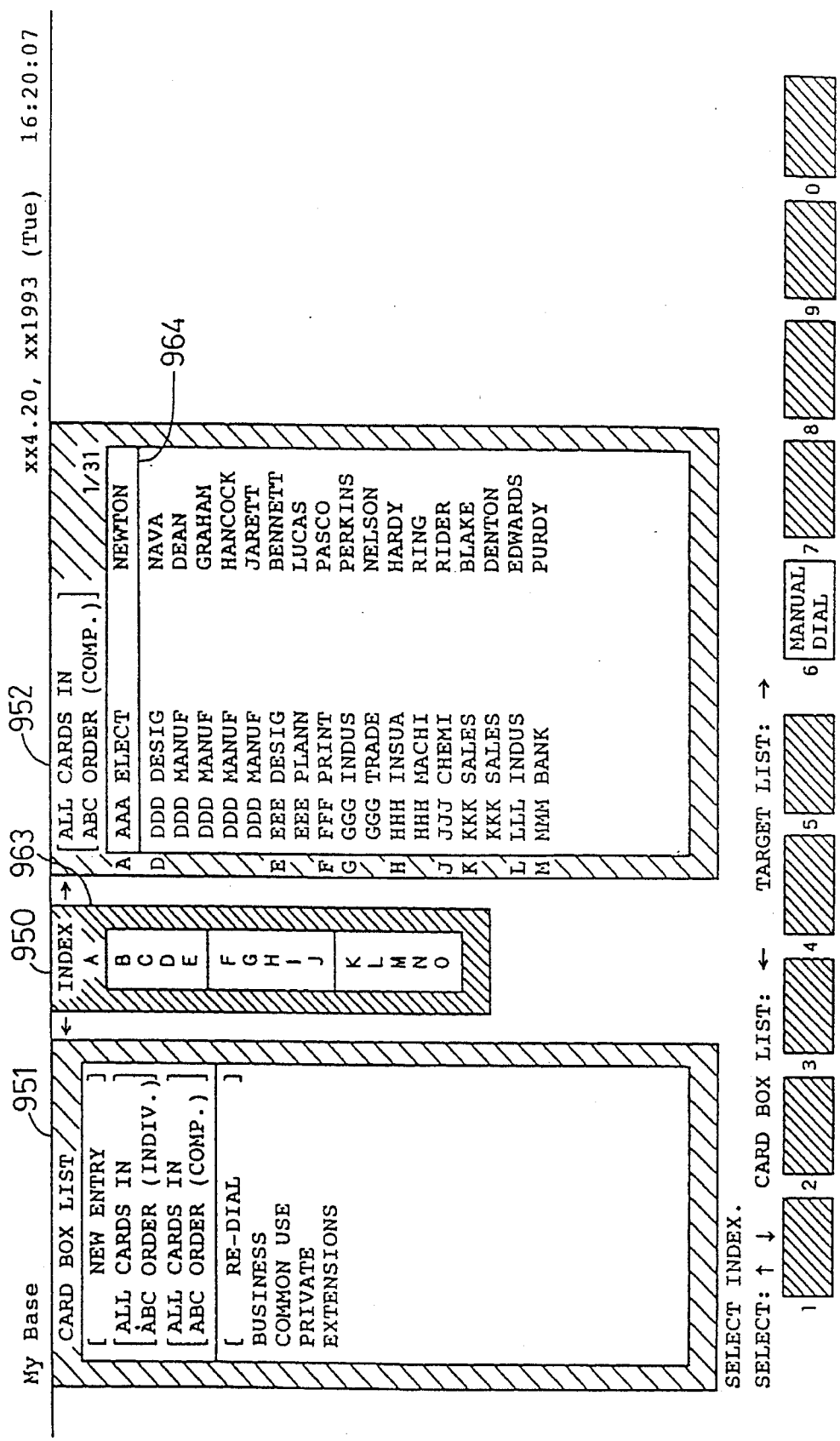
FIG. 22 shows an exemplified screen where the cursor is moved to the index list.

An index list display unit 420 of FIG. 5B displays a list of indexes while a card box list display unit 390 displays a list of card boxes and the summarized card data list display unit 380 displays the contents of a selected card box as a target list. FIGS. 21 and 22 show examples of such display.

In FIGS. 21 and 22, an index list 950 is shown between a list of card boxes 951 and a target list 952 when a card box of 'ALL CARDS IN ABC ORDER (COMP.)' is selected. In this example, the index list 950 in the alphabetical order is generated for the card box 'ALL CARDS IN ABC ORDER (COMP.)' including all name card records. Application of such an index list effectively shortens the access time to a target individual whose company name is known to the user. Each title 953 in the target list 952 is shown according to the format of 'company name, individual name'.

In the drawing of FIG. 22, a reversal display cursor 963 is moved to the index list 950. When the rightward cursor key is pressed under the conditions of FIG. 22, the cursor is jumped to a certain title in the target list 952 corresponding to an index currently selected. When at least one title corresponding to the selected index (in this example, an alphabet) exists in the target list 952, the cursor is automatically moved to the first of the corresponding titles. When no title in the target list 952 corresponds to the selected index, however, the cursor is jumped to a title having an index subsequent to the selected index. When the rightward cursor key is pressed while the cursor is at the index 'K', for example, the cursor is jumped to a title 'KLM PRINT HOLDER' in the target list 952. In another example, when the rightward cursor key is pressed while the cursor is at the index 'L', the cursor is jumped to a title 'MMM DESIG FENWICK' in the target list 952 since no titles corresponding to the index 'L' exist. The title in the target list 952 where the cursor is jumped is clearly shown, for example, by an underline 964 as shown in FIG. 22.

When the leftward cursor key is pressed under the conditions of FIG. 22, the screen display returns to the state of FIG. 21. The reversal display cursor 963 showing a current choice of the index list 950 is moved upward or downward through operation of the up and down cursor keys. When the up or down cursor key is operated while a 'SHIFT' key on the keyboard H2 is depressed, the index list 950 is scrolled up or down by one page. An additional function for jumping the cursor to the head of the index list 950 may be allocated to another key. In the example of FIG. 22, the index list 950 shows indexes (that is, alphabets) in a column style, and has a keyline for each five letters; for example, between 'E' and 'F' or between 'J' and 'K'. These keylines effectively shorten the time required for selection of a certain alphabet (index), and clearly show the position of the certain alphabet. In the example of FIGS. 21 and 22, the cursor is moved between the card box list 951, the index list 950, and the target list 951 only by pressing the leftward or rightward cursor key. Such structure helps the user quickly understand the system and enhances the usability of the system.

The system of the second embodiment is further provided with a non-existence checking unit 422 as shown in FIG. 5B. The non-existence checking unit 422 is a block for checking for existence of card record summaries or titles corresponding to a selected index. When no titles exist corresponding to a certain index 966, the certain index 966 is made inconspicuous by giving a predetermined design effect as shown in FIG. 23.

Figure 23:
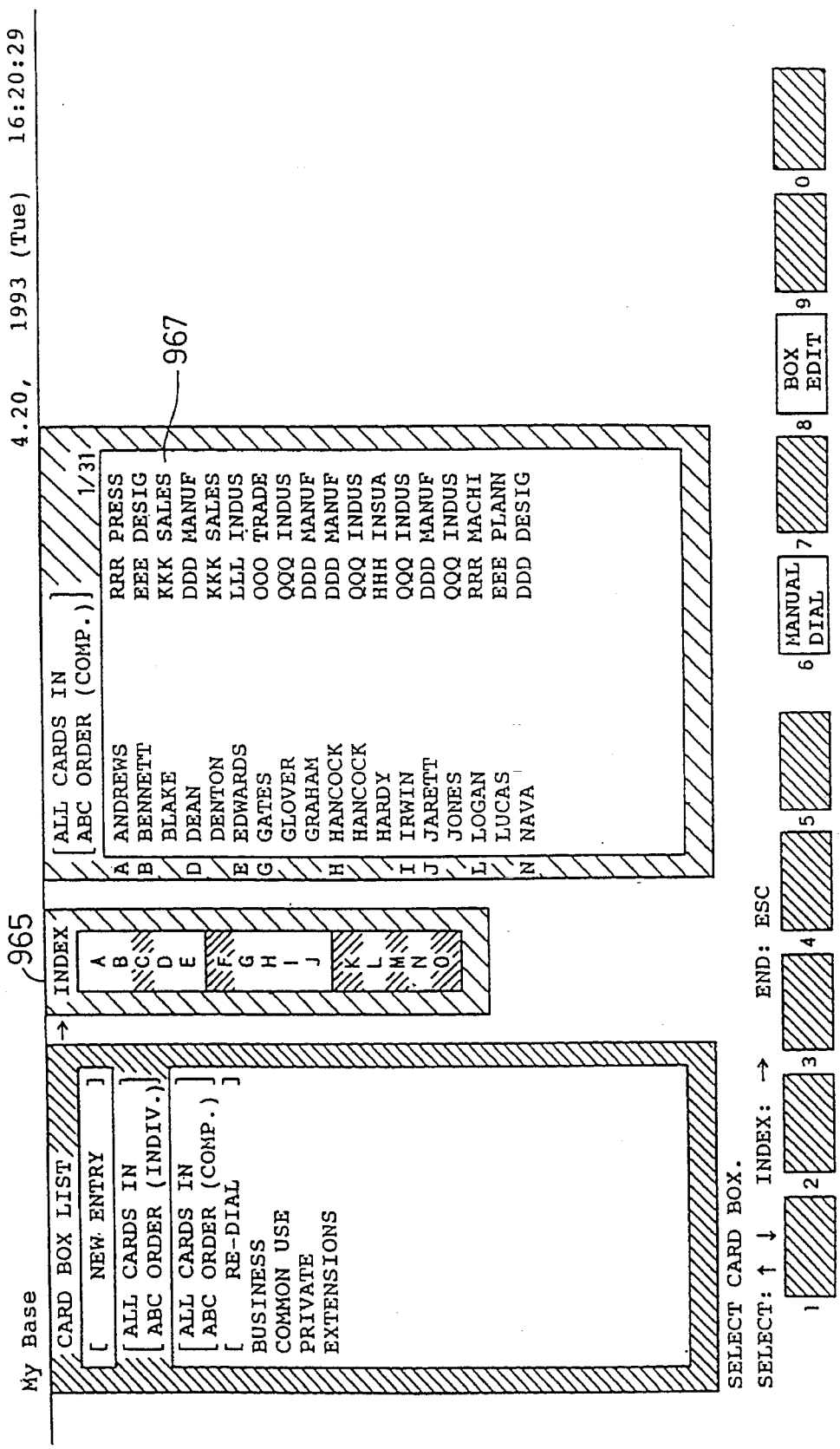
FIG. 23 shows an exemplified screen where indexes without corresponding titles in the target list are made inconspicuous.

In the example of FIG. 23, an index list 965 is shown between a list of card boxes and a target list when a card box of 'ALL CARDS IN ABC ORDER (INDIV.)' is selected. Application of such an index list effectively shortens the access time to a target individual whose name is known to the user. Each title 967 in the target list is shown according to the format of 'individual name, company name'.

The index generating unit 421 or the index list display unit 420 may have the function of the non-existence checking unit 422 to skip indexes without corresponding titles or to prevent display of such indexes without corresponding titles.

The system of the second embodiment further includes a priority display unit 440 shown in FIG. 5B. The priority display unit 440 extracts one or a plurality of card record summaries 350 or titles having a flag of a priority mark as an exception of a predetermined sorting rule (for example, alphabetical order of companies), and displays these titles with the priority mark in the uppermost position of a target list. This function is especially useful when preferential display of one or a plurality of specific individuals in a certain card box is required either temporarily or permanently. This effectively shortens the access time to the specific individuals. The preferential display function changes the order of display by giving a flag, but does not affect the data sorting or indexes. When a plurality of individuals have the priority mark, the person specified more recently should be placed in the upper position in the target list. Specification of the preferential display is active only in the certain card box and does not affect any other card box including the specific individuals. When preferential display for the specific individuals is canceled, the flag of the priority mark is cleared and titles in the target list are shown according to the predetermined sorting rule.

FIG. 24 shows an example of preferential display where a title 968 is preferentially displayed at the uppermost position of the target list. A symbol '+' 969 is given to the left of the title 968 for distinction from other titles.

A frame display unit 450 (FIG. 5B) is a block for displaying frames of the card box list 951, the target list 952 (FIG. 21), and name card data. As described previously, the frame 913 (FIG. 17) currently selected is displayed in a dark color whereas the non-selected frame 914 is displayed in a light color. First letters of titles and the specific symbol 969 (FIG. 24) are shown in a left end of the frame whereas a setting of mark data 928 (FIG. 18) or the counter 915 (FIG. 17) is shown in an upper end of the frame.

A mark specification unit 460 (FIG. 5B) is a block for setting mark data in each name card record. The mark data may be on/off data or numerical data representing a certain condition.

FIG. 25 shows an exemplified display by the mark specification unit 460 where a target list 970 in the middle of the screen corresponds to a card box 'NEW ENTRY'. A card box list 972 including a plurality of card boxes is displayed in the left part of the screen. Each card box in the list 972 has a name arbitrarily specified by the user, such as 'EXTENSIONS'. A title 971 currently selected is placed in at least one of the card boxes existing in the card box list 972. A certain symbol representing the condition of each card box is given on a right end 974 of the card box list 972. In this example, the open circle shows data input.

A mark data list 975 showing a mark setting for the currently selected title 971 is displayed in the right part of the screen. The mark data list 975 includes a plurality of marks 976 which are arbitrarily specified by the user. A mark setting column 977 shows conditions of the marks 976, which are expressed by ON/OFF (the open circle representing ON) in this example. These marks and mark setting are stored as mark data 190 (FIG. 3) in the magnetic disk H4 or the RAM H8 shown in FIG. 1.

Figure 26:
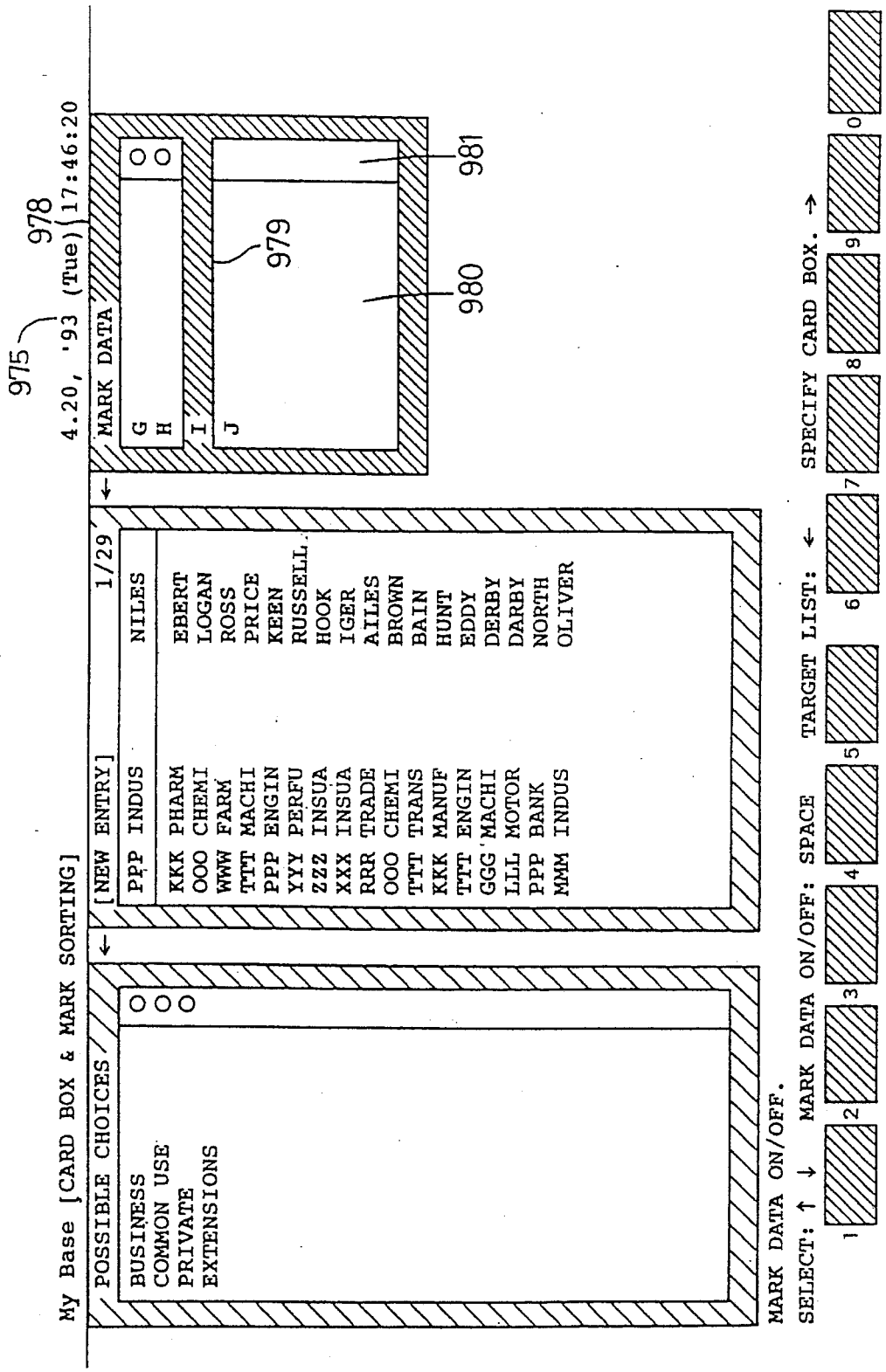
FIG. 26 shows the card box list, the target list, and the mark data list where the mark data list is currently selected.

In the exemplified display of FIG. 25, the target list 970 is currently selected. When the rightward cursor key is pressed under the conditions of FIG. 25, the cursor is moved to select the mark data list 975 as shown in FIG. 26. A reversal display cursor 979 showing a current selection of mark is moved upward or downward in the mark data list 975 through operation of the up and down cursor keys. When the space bar is pressed while the reversal display cursor 979 is placed in a certain mark 980, a mark setting 981 corresponding to the certain mark 980 is toggled from OFF to ON (represented by the open circle) or ON to OFF. When the leftward cursor key is operated under the conditions of FIG. 26, the screen display returns to the state of FIG. 25. When the rightward cursor key is operated under the conditioning of FIG. 26, on the contrary, the display is changed to a state of FIG. 27 where the card box list 972 in the left part of the screen is selected.

The prominent display can be changed directly from the mark data list 975 to the card box list 972 or vice versa without going via the target list 970. Though the mark setting may be displayed as part of name card data, the mark data list 975 as shown in FIG. 25 is preferable.

The system of the second embodiment also includes a mark control unit 461 as shown in FIG. 5B. The mark control unit 461 sets the calender timer H10 included in the system as a hardware element, and gains access to the calender timer H10 to obtain information regarding with elapse of a certain time period or incoming of a predetermined date. The mark control unit 461 receives information regarding with the date or time, and activates the mark specification unit 461 to change specified mark data into predetermined conditions. For example, the mark control unit 461 refers to the timer calender H10, and automatically sets a possible deletion mark ON for certain data which have not been used for two years after the registration. In another example, the mark control unit 461 refers to the timer calender H10, and automatically sets a letter mark ON for data of certain clients after one year has been elapsed since the last use of the data. The mark control unit 461 can also activate the mark specification unit 460 to change a specific mark into a predetermined state based on the relationship between other mark data. For example, when a season's greeting mark, a birthday card mark, and a party mark are all ON, a rank mark is set equal to '3'. The mark control unit 461 determines the state of the specific mark based on results of logic operation such as AND, OR or arithmetic operation.

In the name card management systems of the first and the second embodiments, when a function key F10 with a title box 'DIAL' is pressed under the conditions of FIG. 17, the system automatically dials the telephone number specified in the item 'TEL 1' of name card data currently displayed on the screen. With response to the automatic dialing, the cursor is moved to the item 'TEL 1' of the name card data or the display is changed to waif for new data entry in use data record.

In the name card management systems of the first and the second embodiments described above, name cards are sorted into card boxes originally set in the system and those specified by the user. This realizes both consistent, general sorting and arbitrary, individual sorting. Visually hierarchical display of data in the form of card box lists, target lists, and name card data helps the user clearly understand the whole data display and data retrieval. For example, 200 name cards used frequently are extracted out of the total of 1,000 name cards, and classified into a plurality of card boxes previously specified by the user. This allows the quick access to desired name card data, and reduces the time and labor required for data retrieval. One title (card record summary) regarding with a certain individual may be registered in a plurality of card boxes relevant to the individual, for example, 'COMMON USE', 'PRODUCT A', and 'PRODUCT B'. This also enhances the speed of data access. Since only titles or card record summaries are registered in each card box, the required disk volume is relatively small. A list of titles (target list) is generally used for retrieval of desired name card data. The target list is data having a fixed length and used on the RAM H8, thereby realizing high-speed data retrieval and display. Most functions required are realized by operating ten or so keys positioned in the right half of the keyboard, which gives ergonomic effects. This structure allows single-handed key operation useful for both handicapped people and healthy people, for example, one hand for holding a handset and the other hand for data access or input.

Figure 7:
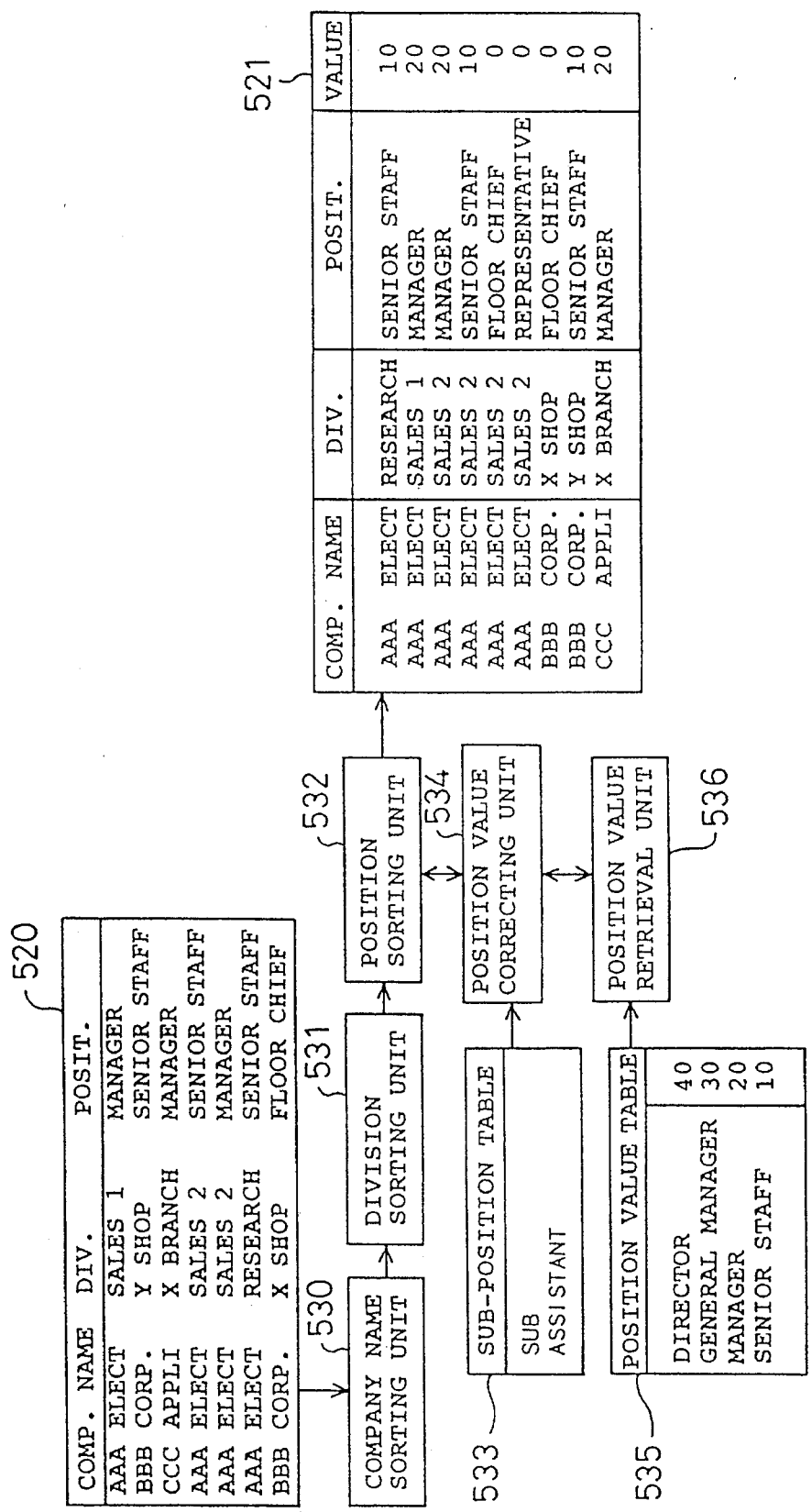
FIG. 7 is a functional block diagram showing a fundamental part of a third embodiment according to the invention.

A third embodiment according to the invention is described hereafter. FIG. 7 is a functional block diagram schematically showing a name card management system of the third embodiment. The name card management system of FIG. 7 automatically sorts name card in three hierarchies: (1) alphabetical order of company names, (2) order of divisions, and (3) order of positions. The system of the third embodiment further includes a sorting function for correcting the order of positions according to the requirements. FIG. 7 shows only elements different from the system of the first embodiment.

A list 520 shown on the upper left of FIG. 7 denotes part of name card data including company names, divisions, and positions. A company name sorting unit 530 sorts name card data in the alphabetical order of company names. A division sorting unit 531 subsequently sorts name card data, which have previously been sorted in the order of company names, in the alphabetical order of divisions. A position sorting unit 532 further sorts name card data, which have previously been sorted in the order of company names and divisions, in the order of position values (from larger values to smaller values). The position values are determined according to positions of individuals at respective companies in a manner described below.

A position value table 535 includes keywords representing positions at companies and position values corresponding to the keywords; for example, director=40, general manager=30, manager=20, senior staff=10. It is preferred to assign discrete values, for example 40 and 30, as the position values to the keywords. Allocation of such discrete values allows the user to add sub-position values like 35 for assistant directors or other arbitrary position values like 31 according to the requirements. A position value retrieval unit 536 checks each position data sent from the position sorting unit 532 to determine whether the position data includes any keyword stored in the position value table 535. When the position value retrieval unit 536 finds a keyword existing in the position value table 535, a position value corresponding to the keyword is sent to the position sorting unit 532. When no keyword in the position value table 535 is found in the position data, on the other hand, zero is allocated as a position value to the position data. A sub-position table 533 includes keywords representing affixes attached to positions, for example, sub-, deputy, and assistant. A position value correcting unit 534 interposed between the position sorting unit 532 and the position value retrieval unit 536 checks each position data sent from the position sorting unit 532 to determine whether the position data includes any keyword stored in the sub-position table 533. When a keyword existing in the sub-position table 533 is found in the position data, a predetermined value corresponding to the sub-position, for example, '5', is subtracted from the position value previously selected by the position value retrieval unit 536. Namely, the position value correcting unit 534 correctively changes a position value corresponding to a certain position without an affix to a smaller position value corresponding to the certain position with the affix. As a result of such correction, for example, the value '15' is allocated to 'a deputy manager' when 'manager=20' and 'senior staff=10'.

Results of the triple sorting are shown as sorted data 521 in FIG. 7. A plurality of name card data of 'AAA Electronics' sorted in the alphabetical order of the company names are further sorted in the alphabetical order of the division names, such as 'Sales 1 Division' and 'Sales 2 Division'. When a plurality of name card data exist in the same division of the same company, for example, 'Sales 2 Division', the name card data are sorted in the order of the position values; from larger position values to smaller position values in this embodiment. The position values allocated to the respective positions and the sorting order of the position values may, however, be determined in different ways.

In this embodiment, neither the positions themselves nor the character data representing the positions, which are not changeable, are used for the third sorting, but name card data are sorted according to the easily changeable position values. This allows simple and flexible sorting. Common or general positions are automatically sorted based on the position value table previously defined whereas specific positions used in the respective companies are sorted properly with virtual sorting data, that is, position values. The position values used as the virtual sorting data are freely changeable at any desirable time. These specific positions used in the respective companies have little generality and can not be sorted according to a preset order. In conventional name care management systems, the user should correct the order of positions individually.

The system of the embodiment also allows the user to shift data of a selected person having a specific position to a desired place in the preset positional order simply by changing the position value of the related data. This does not affect the general order of positions. As described above, the discrete position values such as '40', '30', and '20' in the preset position value table allow the user to insert desirable figures between the preset position values for the sub-positions and other arbitrary positions according to the requirements of the user. The position values in the position value table may be determined to have more discreteness if lowest one digit is not sufficient for insertion between the two discrete values.

Figure 8:
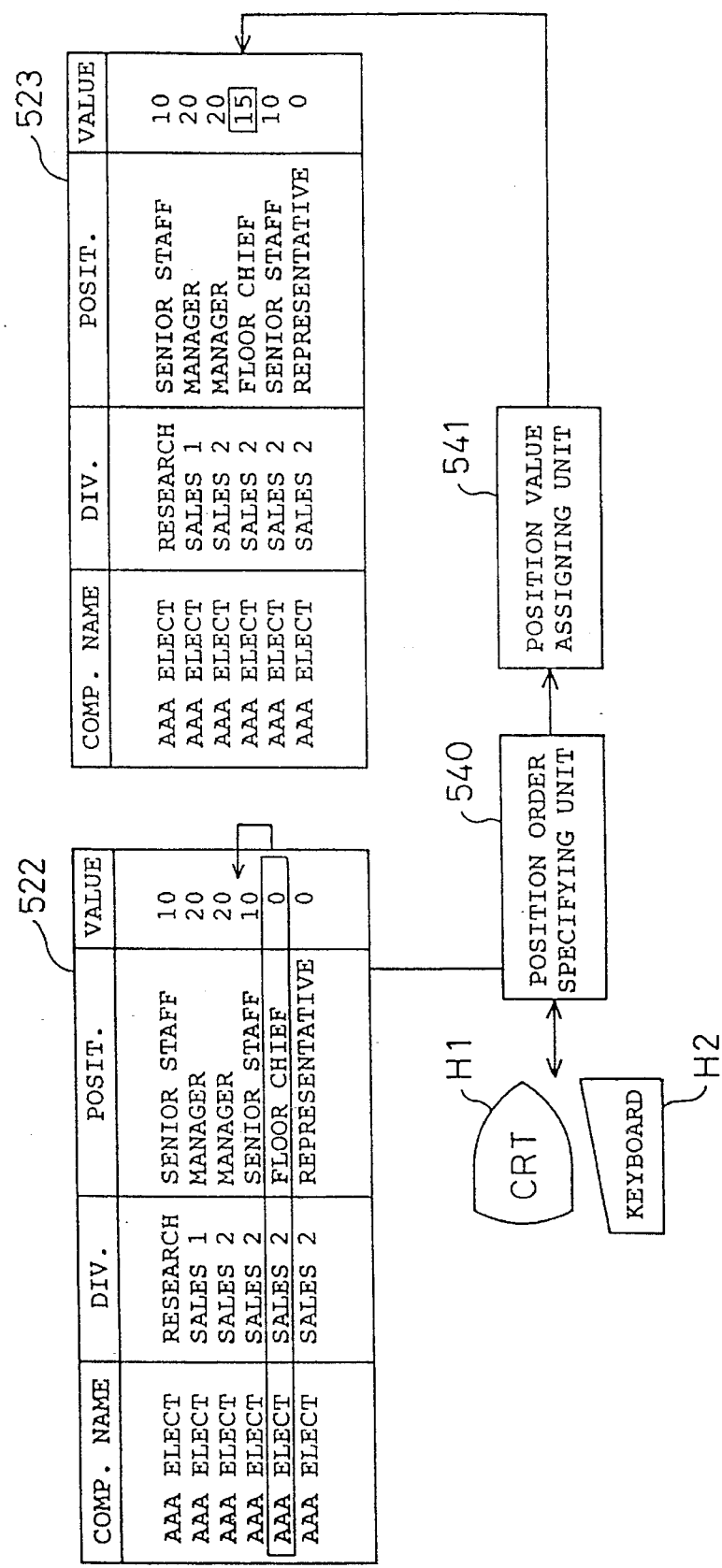
FIG. 8 is a functional block diagram showing a fundamental part of a fourth embodiment according to the invention.

Another name card management system as a fourth embodiment of the invention is described according to the block diagram of FIG. 8. The name card management system of the fourth embodiment also allows the user to correct the order of positions like the third embodiment. A list of data 522 shows part of name card data, which specifically include company names, divisions, and positions and have been sorted three times in the alphabetical order of companies, in the alphabetical order of divisions, and in the order of position values. A position order specifying unit 540 shown in FIG. 8 displays the name card data 522 on the CRT H1, and specifies, according to the user's inputs from the keyboard H2, where data of a selected person having a certain position at a company is to be shifted and inserted in the order of positions. A position value assigning unit 541 allocates a new position value to the certain position by executing a predetermined calculation with the position values immediately upper and lower the inserted data. In the embodiment of FIG. 8, the position value assigning unit 541 determines an intermediate value '15' from the position values '20' and '10' respectively allocated to managers and senior staff, and allocates the value '15' as a position value to the corresponding name card data having the certain position. A new list of data 523 shows the name card data arranged in a new order of positions, where the position value '15' is allocated to the certain position 'Floor Chief' of the shifted name card data.

Position values preset in the system of the embodiment do not have units figures whereas the value '5' is added for sub-positions. This allows the user to set new position values inserted between the preset position values. A new position value allocated to the shifted name car data is determined to be different from the existing values. When two or more data are inserted between name card data having the preset position values, allocation of units figures to these inserted data may be determined according to a re-allocation rule. The position value table 535 and the position value correcting unit 534 shown in FIG. 7 and the position value assigning unit 541 shown in FIG. 8 are designed to realize such allocation and re-allocation rules. In the embodiments of FIGS. 7 and 8, the default position value '0' is allocated to 'representatives' and 'floor chiefs'. Alternatively, the position value '0' may be allocated to name card data without any positions specified whereas another value, for example, '5', may be assigned to the exemplified two positions ('representatives' and 'floor chiefs').

The name card management systems of the third and fourth embodiments described above automatically sort name cards in three hierarchies; first in the alphabetical order of company names, second in the alphabetical order of divisions, and third in the order of positions. This results in displaying sorted data according to an image of a company organization tree. Virtual position values used as indexes of positions allow the user to correct the order of positions even when sorting according to a preset position value table gives wrong sorting results. This is implemented simply by changing the position value of the related person and does not affect the general order of positions.

Figure 9A:
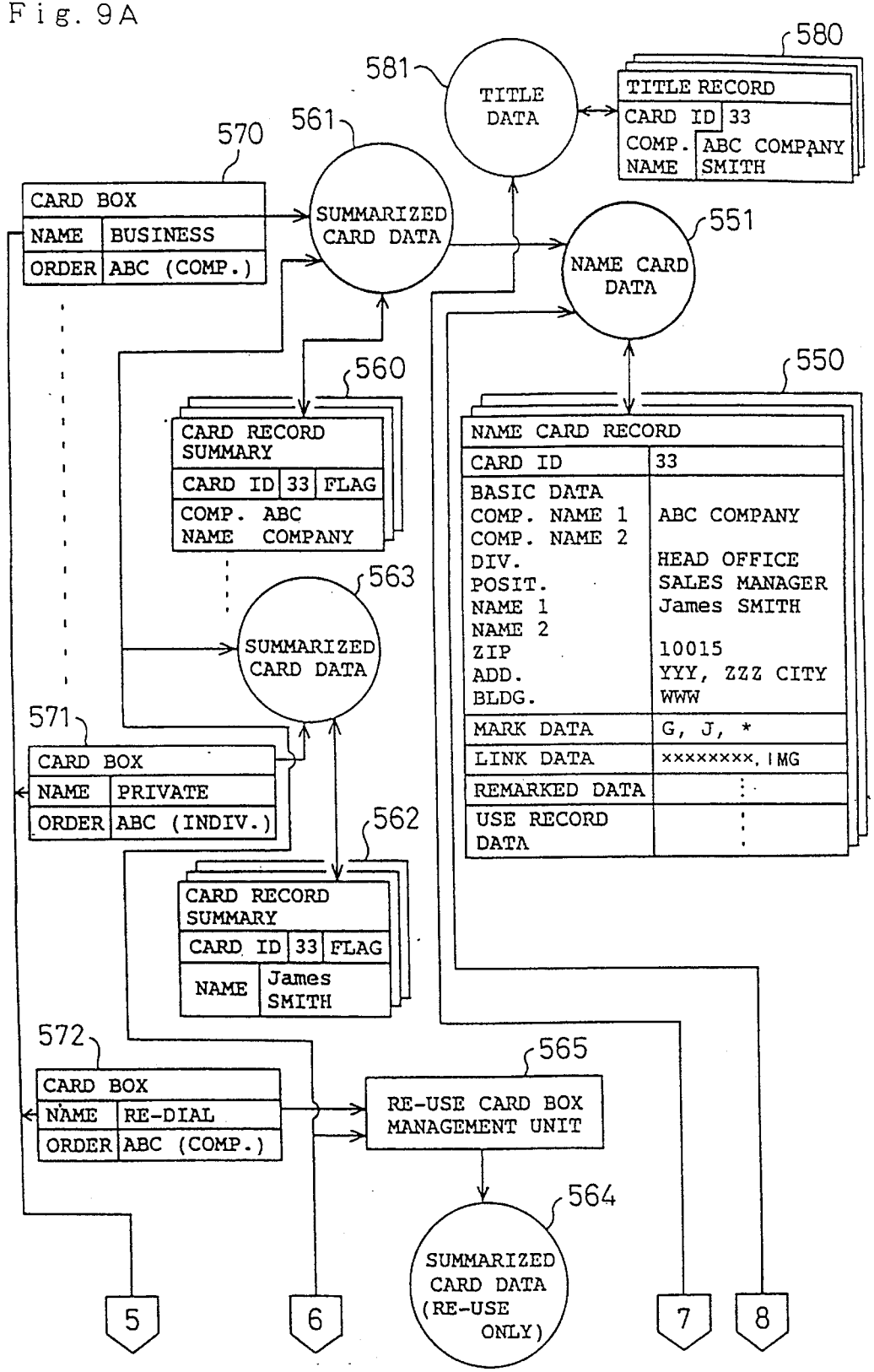
FIG. 9A and FIG. 9B are functional block diagrams showing name card data management systems of a fifth embodiment and a eighth embodiment according to the invention.
Figure 9B:
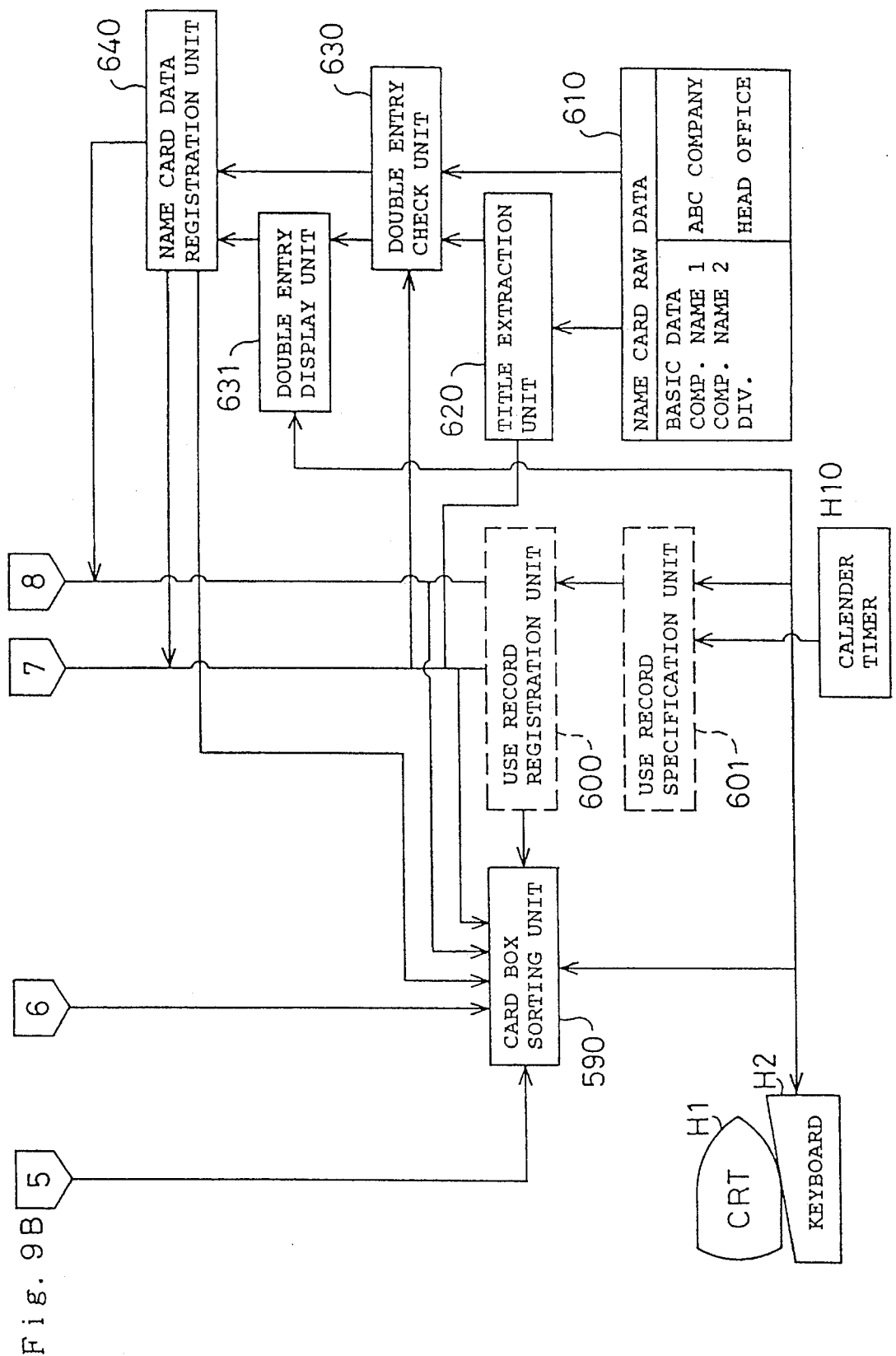

A name card management system as a fifth embodiment of the invention is described according to the block diagrams of FIGS. 9A and 9B. The name card management system shown in FIGS. 9A and 9B has additional functions for registering name card data, sorting the registered name card data into a plurality of name card boxes, and adding use records as well as the functions of the name card management system of the second embodiment shown in FIGS. 5A and 5B. Blocks 600 and 610 shown by the broken lines in FIG. 9B are not included in the fifth embodiment and are described later in an eighth embodiment.

A name card record 550, name card data 551, a title record 580, title data 581, card record summaries 560,562, summarized card data 561,563, and card boxes 570,571 are identical with the corresponding elements shown in FIGS. 5A and 5B and not explained here. With referring to FIGS. 9A and 9B, name card raw data 610 input directly from a name card reader, through manual operations, or from an outside data file include basic data, such as a company name and an individual name. The name card raw data 610 represent information specified on an original name card and are subsequently sorted and registered as a name card record 550.

A title extraction unit 620 extracts part of basic data as a title from the name card raw data 610 according to a predetermined format. The extracted title includes, for example, first sixteen letters in the company name data and first six letters in the individual family name data existing in the name card raw data 610. A double entry check unit 630 then checks whether the title data 581 includes a title record 581 having the same title as the extracted title. When no title record having the same title exists in the title data 581, a name card data registration unit 640 additionally registers the name card raw data 610 in the name card data 551 and determines a card ID representing a name card record 550 corresponding to the newly registered name card raw data 610. The name card data registration unit 640 further creates a new title record 580 including the card ID and the extracted title and registers the new title record 580 in the title data 581.

When the double entry check unit 630 determines that a title record 580 having the same title as the extracted title exists in the title data 581, a double entry display unit 631 informs the user of possibility of double entry. The double entry display unit 631 simultaneously displays the new entry and the existing data to allow the user to execute visual checking and subsequent required operations. In a concrete process, the user selects one of three choices 'ADDITIONAL REGISTRATION', 'OVERWRITING', and 'CANCEL'. When the 'ADDITIONAL REGISTRATION' is selected, the above additional registration process is executed. When the user selects the 'OVERWRITING', the existing name card record corresponding to the card ID is overwritten with the new entry while the title record is intact. When the user selects the 'CANCEL', the new entry is not registered by canceled. The name card data registration unit 640 also executes general editing functions such as data correction and data elimination, which are not described here.

Figure 30:
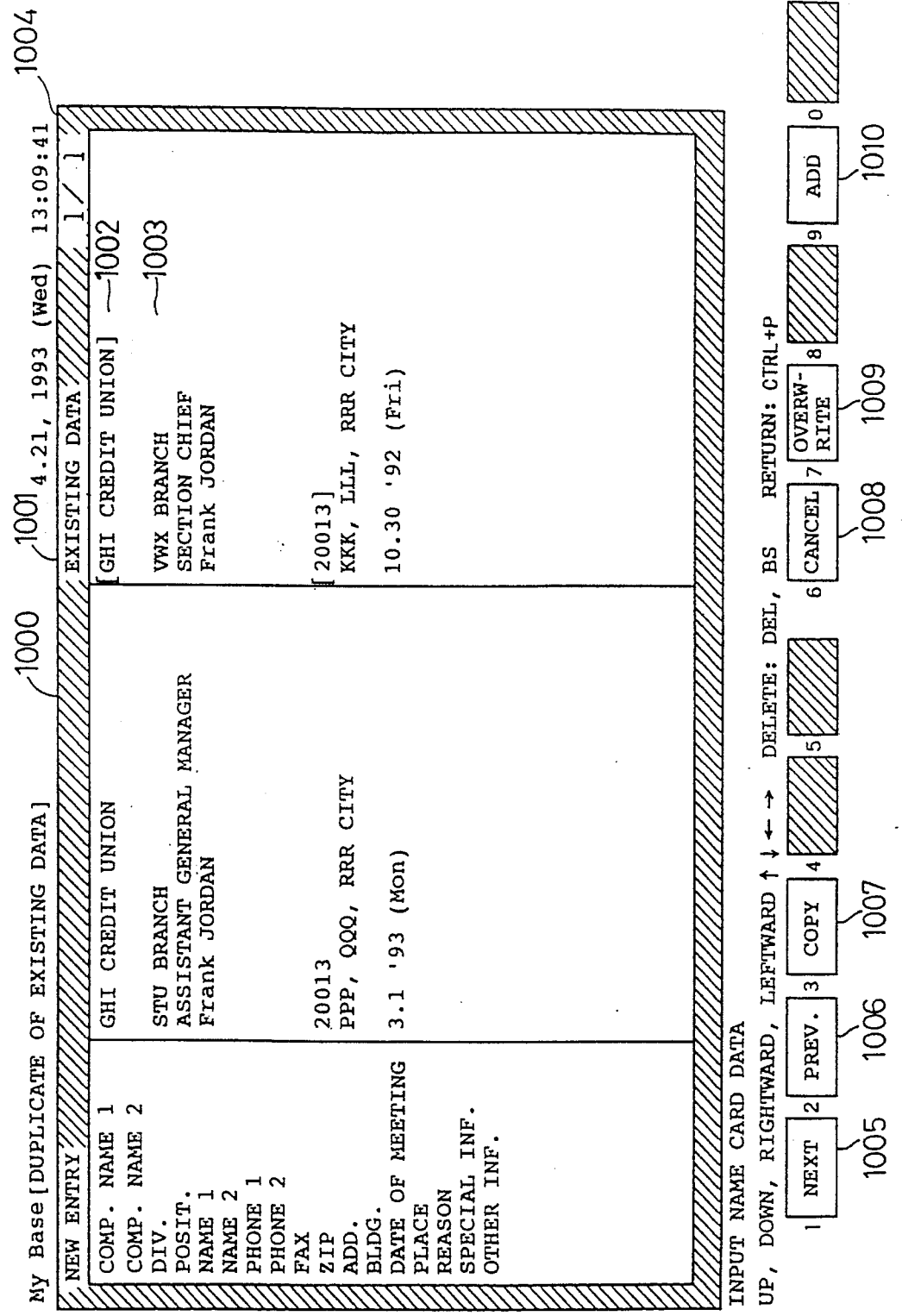
FIG. 30 shows an example of double entry check.
Figure 36:
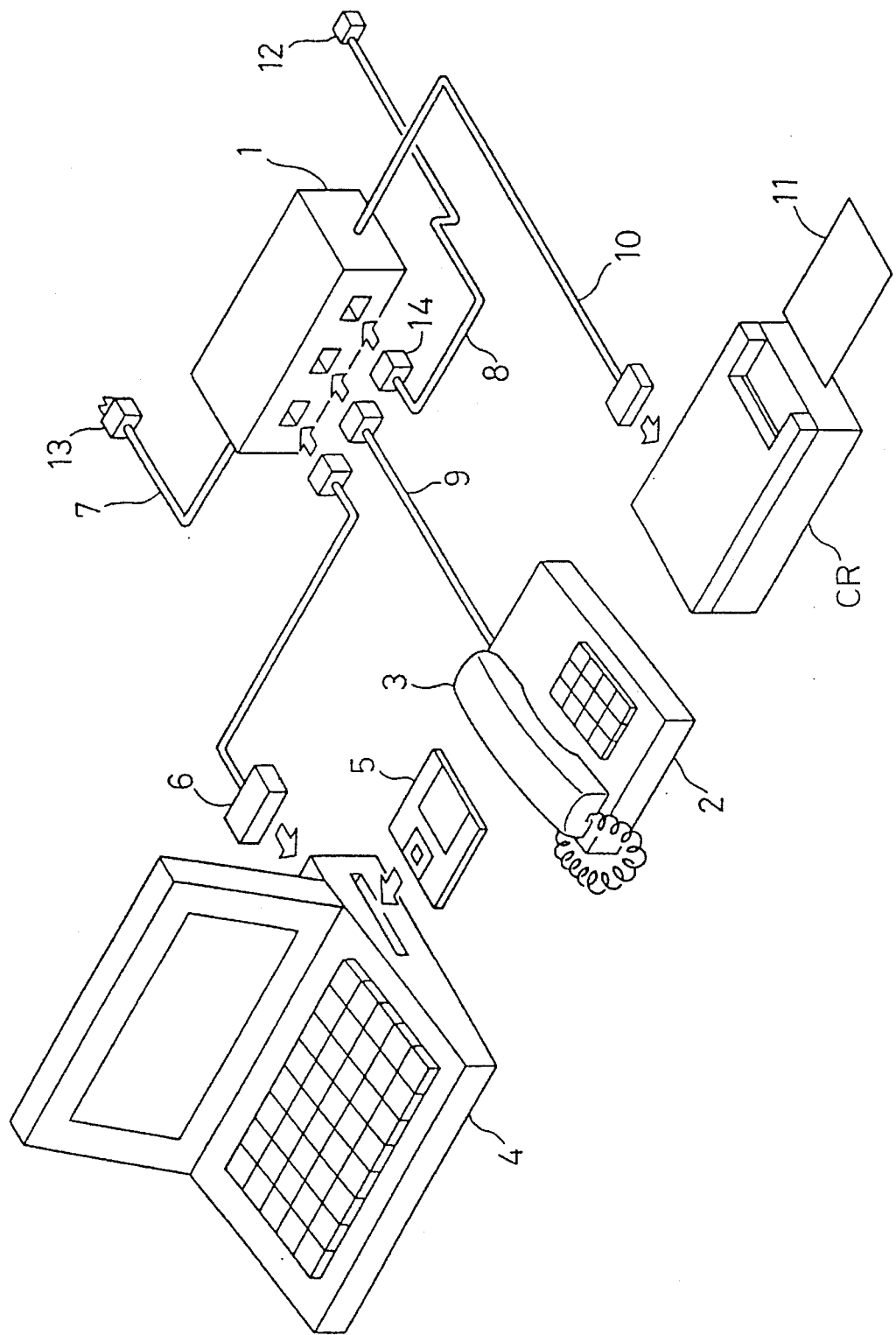
FIG. 36 is a perspective view showing another hardware structure for realizing the name card management system of the invention.
Figure 37:
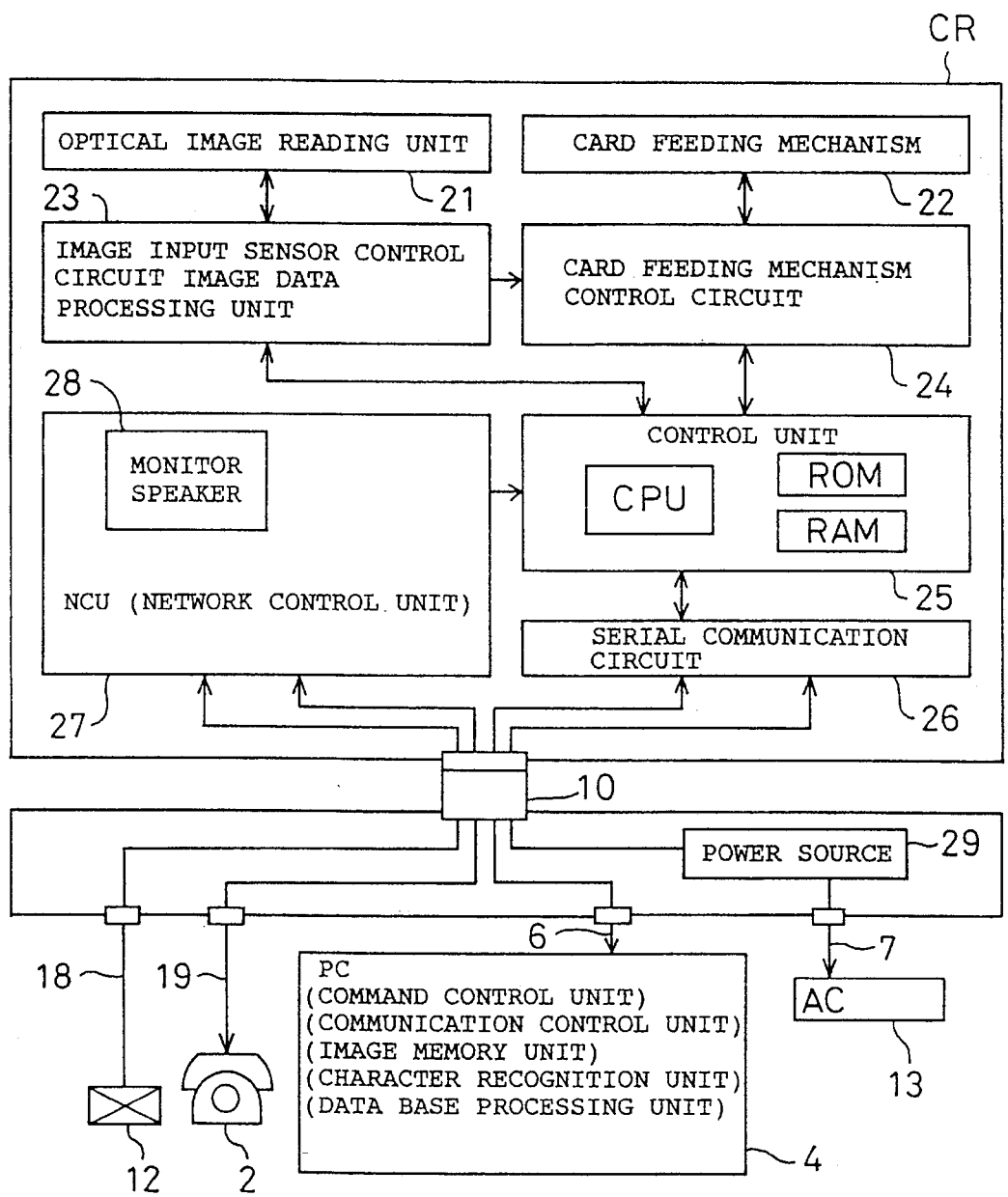
FIG. 37 is a block diagram illustrating functions of various elements in this structure.
Figure 38:
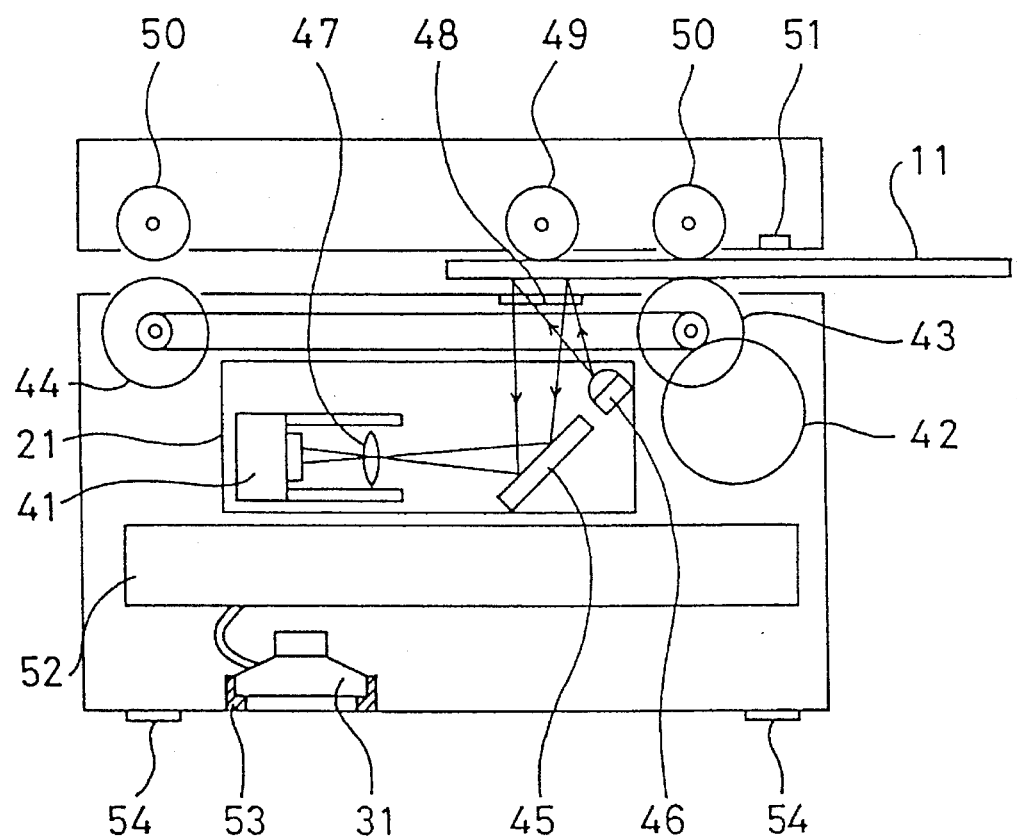
FIG. 38 shows an internal structure of a card reader CR.

FIG. 30 shows an exemplified display by the double entry display unit 631. A new entry 1000 represents name card data which will be registered, whereas existing data 1001 denotes name card data which have been registered previously. Basic data of each item in the new entry 1000 and the existing data 1001 are displayed on the same line for effective comparison. When there is no difference in a basic data element on a certain line between the new entry and the existing data as a line 1002, the basic data element in the existing data is displayed in a notable way, for example, placed in brackets '[' and ']'. This draws attention of the user to real target data, that is, a basic data element 1003 including any difference. When there are two or more existing data similar to the new entry, a counter 1004 shows the current data number among the total number of possible duplicate data as '1/4'. The number on the counter 1004, for example, changes to '2/4' and returns to '1/4' through a press of a function key 1005 'NEXT' or another key 1006 'PREVIOUS'. A press of a function key 1007 'COPY' duplicates data in an arbitrary line of the existing data displayed to a line currently selected. This 'COPY' function is preferably used for copying important remarked data including the date of meeting, the place, the reason, specific information, and other information input in the existing data. In another application, when the person on a name card is transferred to a different division or obtains promotion, his previous division or position can be recorded as other information by means of the 'COPY' function. Press of function keys 1010, 1009, and 1008 leads to the respective processes 'ADDITIONAL REGISTRATION', 'OVERWRITING' and 'CANCEL' described above.

A card box sorting unit 590 shown in FIG. 9B generates card record summaries 560 and 562 corresponding to arbitrary name card records 550 or title records 580, and registers the card record summaries 560 and 562 in one or a plurality of summarized card data 561 and 563. The card record summary 560 or 562 once registered can be deleted from the summarized card data 561 or 563 according to the requirements. The card box sorting unit 590 is a block which executes registration and deletion of such card record summaries 560 and 562 into and from the summarized card data 561 and 563. In the following description, the expressions 'put into the card box' and 'take or taken out of the card box' respectively represent registration and deletion of a card record summary in and from summarized card data.

Figure 27:
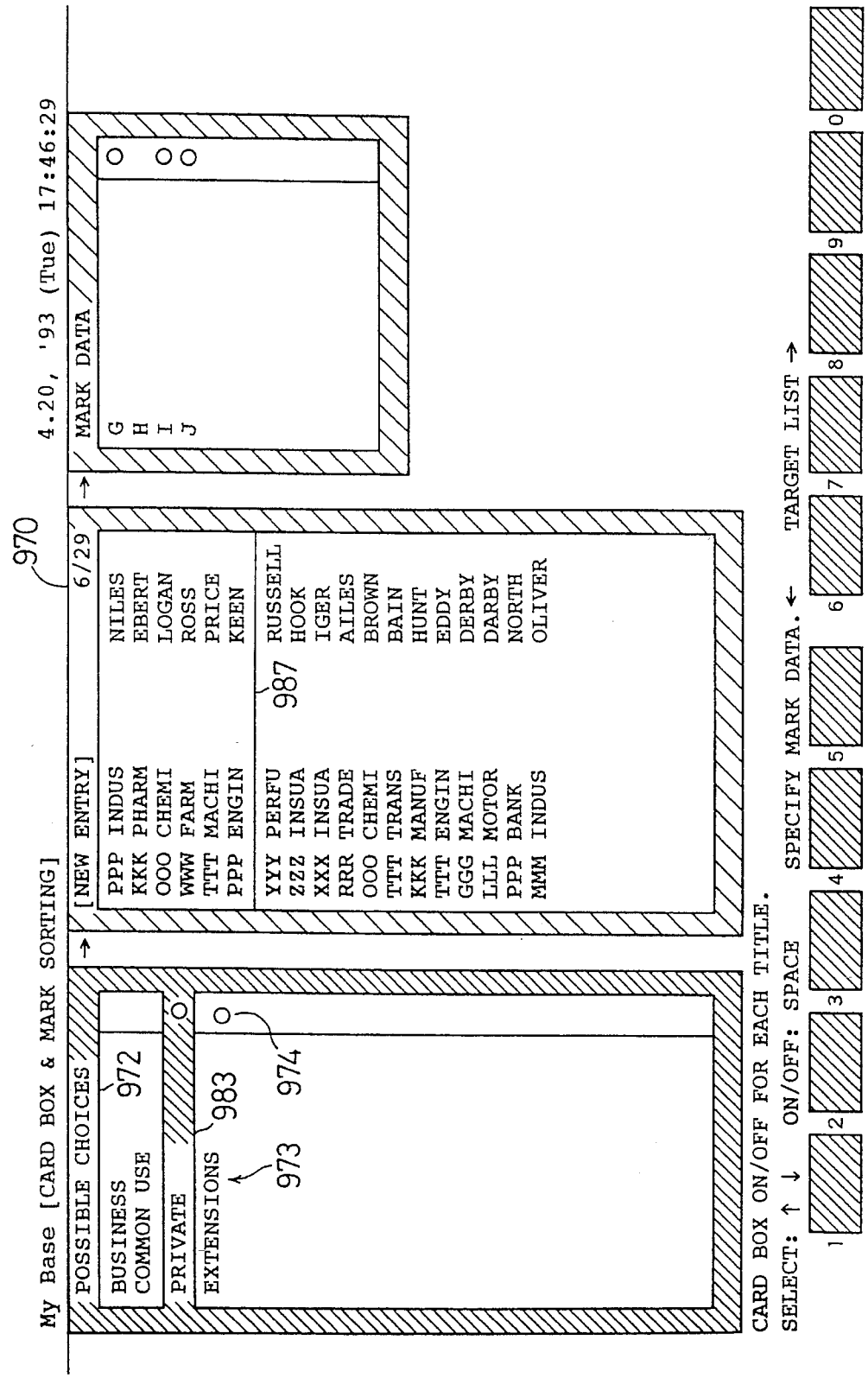
FIG. 27 shows the card box list, the target list, and the mark data list where the card box list is currently selected.

A typical process of registration into summarized card data or a name card box is explained based on the drawing of FIG. 27. In this example, the card box sorting unit 590 allows the user to select a certain person and then specify registration or deletion of the selected person into or from a plurality of name card boxes simultaneously. The user first selects a target person with the up and down cursor keys as shown in FIG. 25, and then operates the leftward and rightward cursor keys to switch to a screen for mark setting as shown in FIG. 26 or to another screen for card box setting as shown in FIG. 27. A list of possible choices 972 includes names 973 of card boxes and conditions 974 of the respective card boxes, which represent registration and deletion of data into and from the respective card boxes. A reversal display cursor 983 shows a card box currently selected and moves upward and downward with the up and down cursor keys. Each press of the space bar changes the card box conditions 974 from the ON setting (O) to OFF setting or vice versa. A target title 987 currently selected in the target list 970 is displayed in a distinctive manner, for example, underlined.

The card box sorting unit 590 (FIG. 9B) puts currently selected data of a new entry into a card box having the ON setting (with o). More concretely, the card box sorting unit 590 registers a card record summary 560 into the summarized card data 561. The card box sorting unit 590 also takes currently selected data out of a card box having the OFF setting (without o). More concretely, the card box sorting unit 590 deletes a card record summary 560 from the summarized card data 561.

Figure 10:
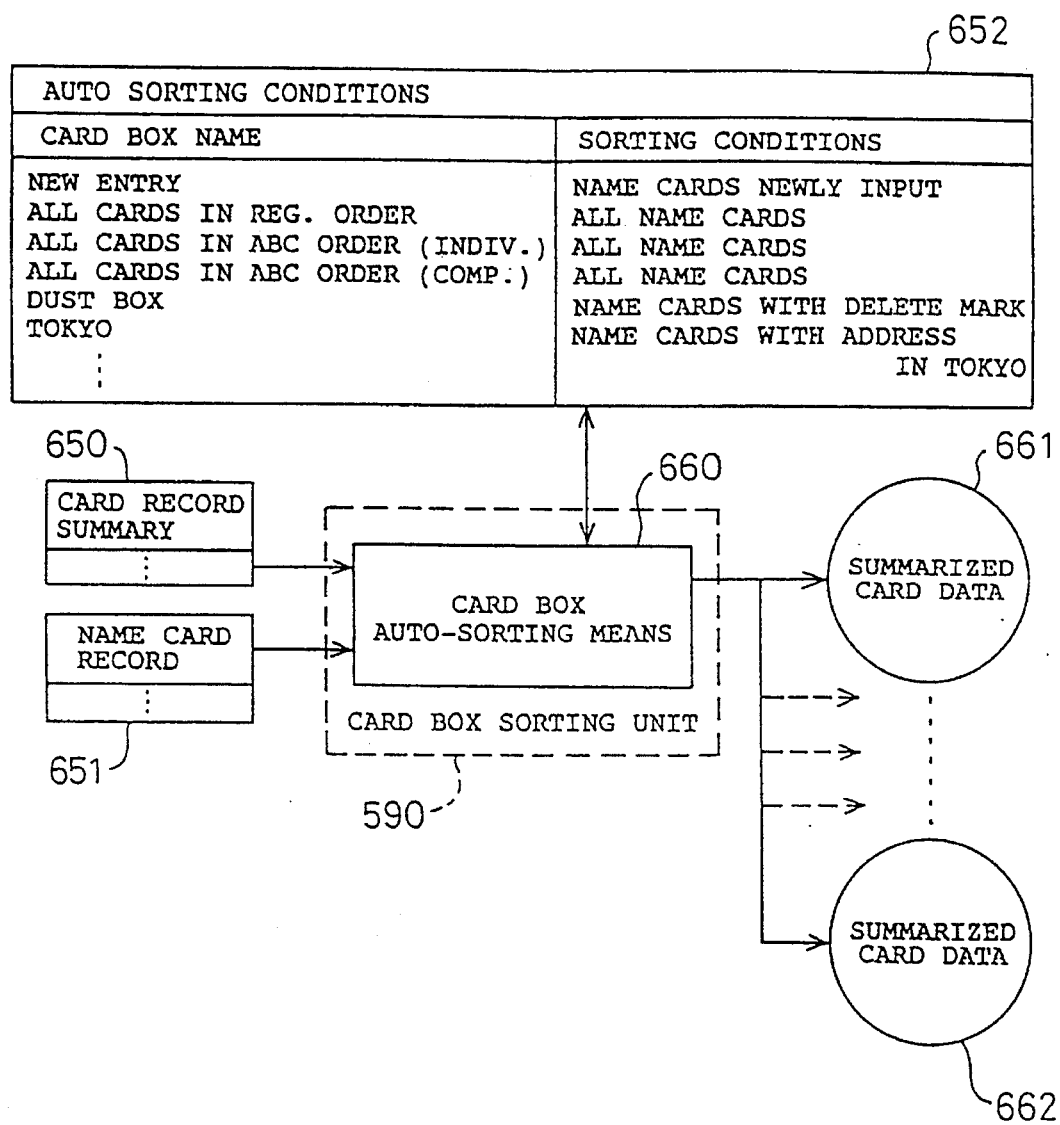
FIG. 10 shows another structure of a card box sorting unit as modification of the fifth embodiment.

FIG. 10 shows a modification of the fifth embodiment in which the card box sorting unit 590 has card box auto-sorting means 660. The card box auto-sorting means 660 realizes automatic sorting of new entry of name card data into corresponding card boxes based on given conditions. As illustrated in FIG. 10, the card box auto-sorting means 660 is part of the card box sorting unit 590. In this modified system, a card record summary 650 and a name card record 651 are identical with those described above and are thereby not explained here. An auto-sorting conditions determination element 652 includes names of card boxes and sorting conditions of the corresponding card boxes. For example, card boxes 'NEW ENTRY', 'ALL CARDS IN ABC ORDER (COMPANY)', and 'TOKYO' respectively include 'name cards newly input', 'all name cards', and 'name cards with an address in Tokyo'. The sorting conditions are automatically registered simultaneously with a new setting of a card box, but may manually be changed according to the requirements. The card box auto-sorting means 660 checks the card record summary 650 or the name card record 651 based on the sorting conditions stored in the auto-sorting conditions determination element 652, and registers or deletes the card record summary 650 which meets the sorting conditions into or out of summarized card data 661 or 662.

FIG. 28 shows another example of the card box sorting unit which realizes quick sorting of card boxes. In the card box quick sorting process, the user selects a plurality of target titles and then collectively specifies registration or deletion of the target titles into or out of a certain card box. The plurality of target titles may be retrieved automatically with a specific keyword or selected manually by the user. In the example of FIG. 28, five target titles 991 are retrieved or selected in a target list. The retrieved target titles 991 are reversely displayed on the screen. A reversal display cursor 990 representing a target title currently selected moves upward and downward with the up and down cursor keys. While a certain target title is selected with the reversal display cursor 990, each press of the space bar toggles the reverse display of a target title from ON to OFF or OFF to ON. The target title currently selected in the target list with the reversal display cursor 990 is distinguished from the retrieved target titles, for example, displayed in a different color.

An 'ALL ON' function 992 allocated to a function key makes all the target titles under selecting conditions whereas an 'ALL OFF' function 993 allocated to another function key makes all the target titles under non-selecting conditions. A 'SEARCH' function key 994 allows retrieval of data based on arbitrary retrieving conditions, for example, with a 'Greeting' mark. A 'REVERSE' function key 995 reverses the current selection to make the non-selected target titles under selecting conditions.

Figure 29:
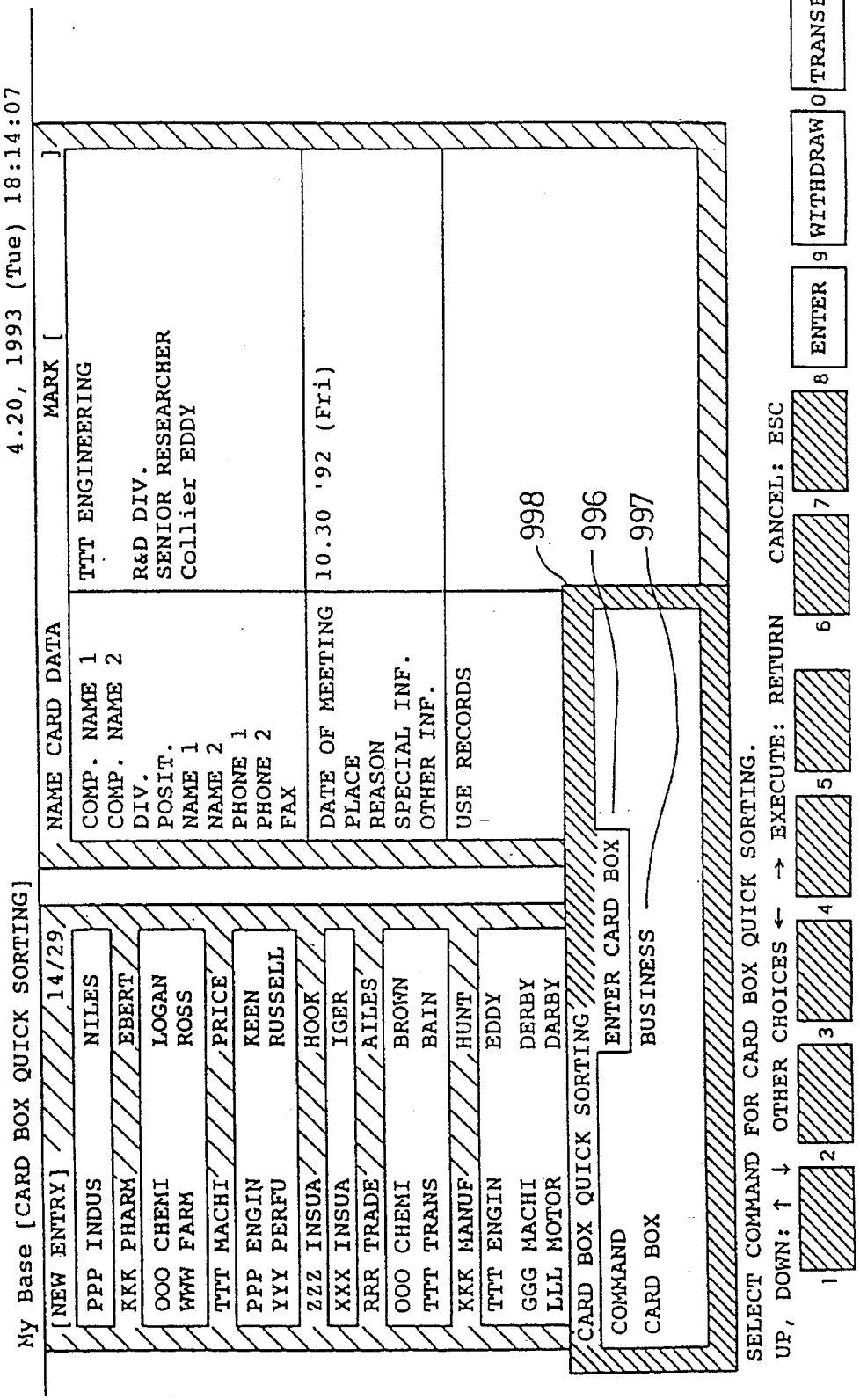
FIG. 29 shows the quick sorting process where an instruction is set.

After a plurality of target titles are selected as illustrated in FIG. 28, a 'SETTLE' key is pressed to start a quick sorting process. When the 'SETTLE' key is depressed for quick sorting, a specific window 998 for card box quick sorting opens as shown in FIG. 29. There are three commands for quick sorting, that is, 'ENTER' 'WITHDRAW' and 'TRANSFER' respectively allocated to function keys F8, F9, and F10. A desired function key may be depressed directly or selected with the rightward and leftward cursor keys. A card box 997 is selected among the list of possible choices for quick sorting.

The name card management system of the fifth embodiment described above automatically sorts name card data into one or a plurality of selected card boxes based on predetermined conditions. Compared with a conventional system for all manual sorting, the system of the embodiment allowing the automatic sorting is far more convenient and efficient. In the manual sorting, the system of the embodiment allows the user to distinctly classify name card data into arbitrary card boxes. The name card management system of the embodiment also allows quick checking for double entry with summarized card data.

Figure 11:
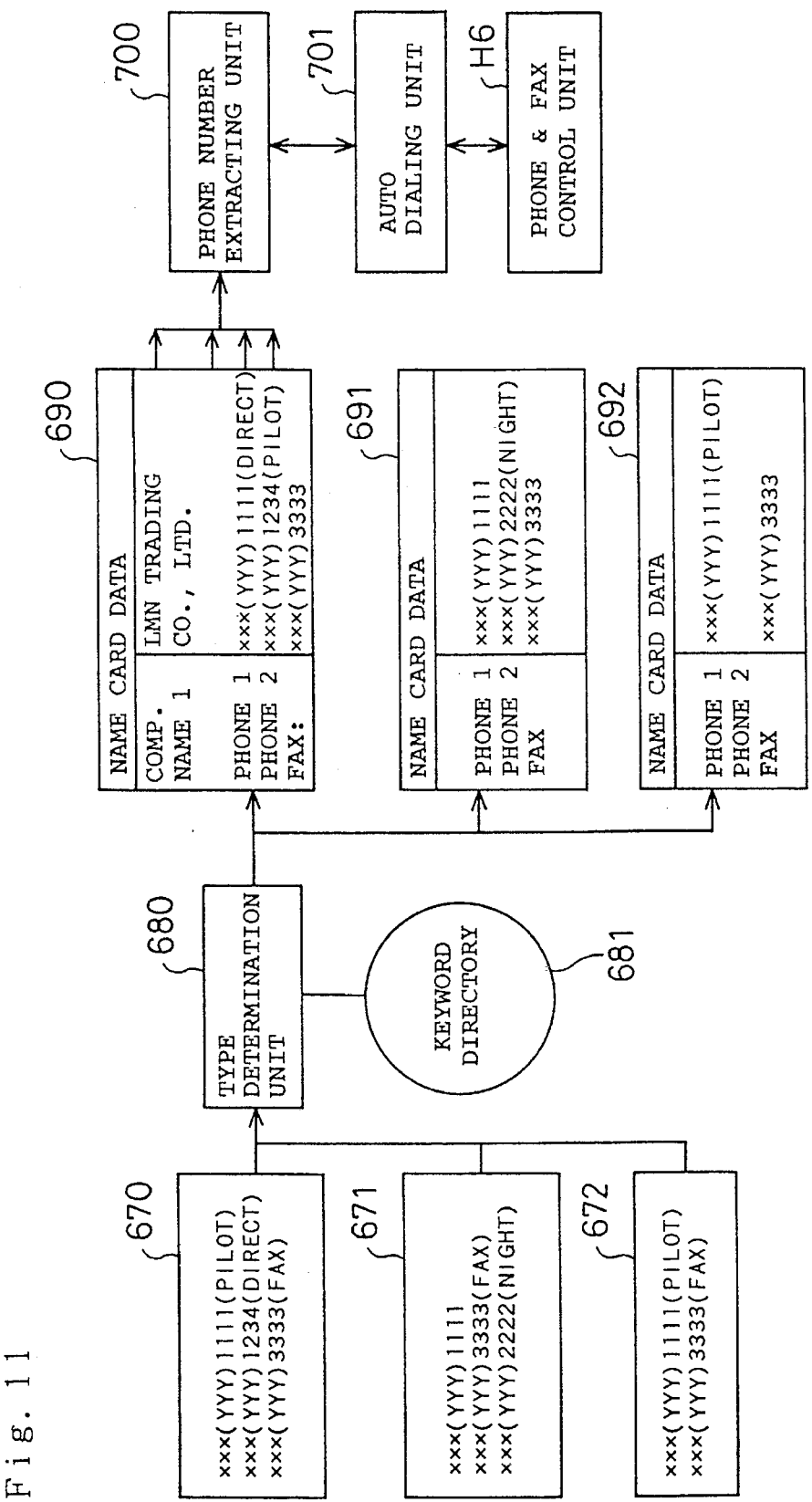
FIG. 11 is a functional block diagram showing a fundamental part of a six embodiment according to the invention.

Another name card management system is described as a sixth embodiment in accordance with the invention. FIG. 11 is a block diagram illustrating a fundamental structure of the name card management system of the sixth embodiment. The name card management system of FIG. 11 handles a plurality of telephone numbers and has an automatic dialing function for automatically dialing specific telephone numbers.

Telephone number data 670, 671, or 672 input through a name card reader or another scanner are intact telephone-related data including keywords and telephone numbers arranged in the same order as specified on each name card. A keyword directory 681 includes keywords generally attached to telephone numbers on name cards and telephone type values allocated to the respective keywords; for example, 'DIRECT=1, DIRECT-IN=1, DIAL-IN=1, PILOT=2, NIGHT=2, FAX=3, FACSIMILE=3'. A type determination unit 680 refers to the keyword directory 681 for a keyword in each line of the telephone number data 670, 671, or 672, and determines a telephone type value for the each line. In this embodiment, telephone numbers are re-arranged according to the telephone type values. Telephone numbers with the smallest type value, the intermediate type value, and the greatest type value are respectively allocated to items PHONE 1, PHONE 2, and FAX. When no telephone number has the type value '1', the telephone number with the type value '2' is allocated to the item PHONE 1. Telephone numbers with the type value '3' should always be allocated to the item FAX. Simultaneously with the re-arrangement of telephone numbers, telephone number data are modified to meet a predetermined style, such as 'XXX-YYY-1111'. All the keywords having the identical meaning, for example, 'DIRECT-IN' AND 'DIAL-IN', are changed to a standard keyword, for example, 'DIRECT'. Name card data 690, 691, and 692 are generated corresponding to the telephone number data 670, 671, and 672 as results of such re-arrangement and modification process. The system of the embodiment changes a variety of keywords found on name cards to a standard keyword while allocating a most important telephone number which allows direct access to the person on a name card to the item PHONE 1 and an additional telephone number to the item PHONE 2. This allows distinct, convenient arrangement of telephone numbers.

A phone number extracting unit 700 shown in FIG. 11 extracts a desired telephone number from a plurality of phone numbers registered in the name card data 690. The phone number extracting unit 700 first determines whether data currently selected is a target list or name card data. When the target list is currently selected, the phone number extracting unit 700 extracts data in the item PHONE 1 as a target telephone number to be dialed. When the name card data is currently selected, on the other hand, the phone number extracting unit 700 determines whether data defined by the cursor is a telephone number or not. The phone number extracting unit 700 then extracts the data in the cursor as a target telephone number in the former case, or otherwise extracts data in the item PHONE 1 as a target telephone number. An auto-dialing unit 701 activates a dial function of the PHONE & FAX control unit H6 to automatically dial the target telephone number.

When a function key F10 to which the 'DIAL' function is allocated is depressed under the conditions of FIG. 17 or FIG. 20, a telephone number specified in the item PHONE 1 in name card data corresponding to a currently selected target title 'QQQ INDUS. IRWIN' is extracted and automatically dialed. When the 'DIAL' function key F10 is depressed under the conditions of FIG. 18, since the cursor is positioned on the item FAX 2 in name card data of 'QQQ INDUS. IRWIN', a telephone number in the item PHONE 2 is extracted and automatically dialed. When the 'DIAL' function key F10 is depressed under the conditions of FIG. 19, since the cursor is positioned on an item other than telephone numbers in the name card data of 'QQQ INDUS. IRWIN', a telephone number in the item PHONE 1 is extracted and automatically dialed. The system of the sixth embodiment handles a plurality of telephone numbers and selects a desired one out of the plural telephone numbers for automatic dialing. In general operation, the user is not required to select a telephone number, but the system automatically dials a telephone number specified in the item PHONE 1. The user can call a certain person without selecting or dialing his phone number in daily use while selecting a specific phone number, for example, one exclusively used at night, under special conditions.

The name card management system of the sixth embodiment recognizes types of plural telephone numbers found on name cards and allocates a most important phone number allowing direct access to the person on a name card to the item PHONE 1 and an additional phone number to the item PHONE 2. The system of the embodiment also modifies various keyword data to a standard keyword, thus realizing distinct, convenient arrangement of plural telephone numbers.

Figure 12:
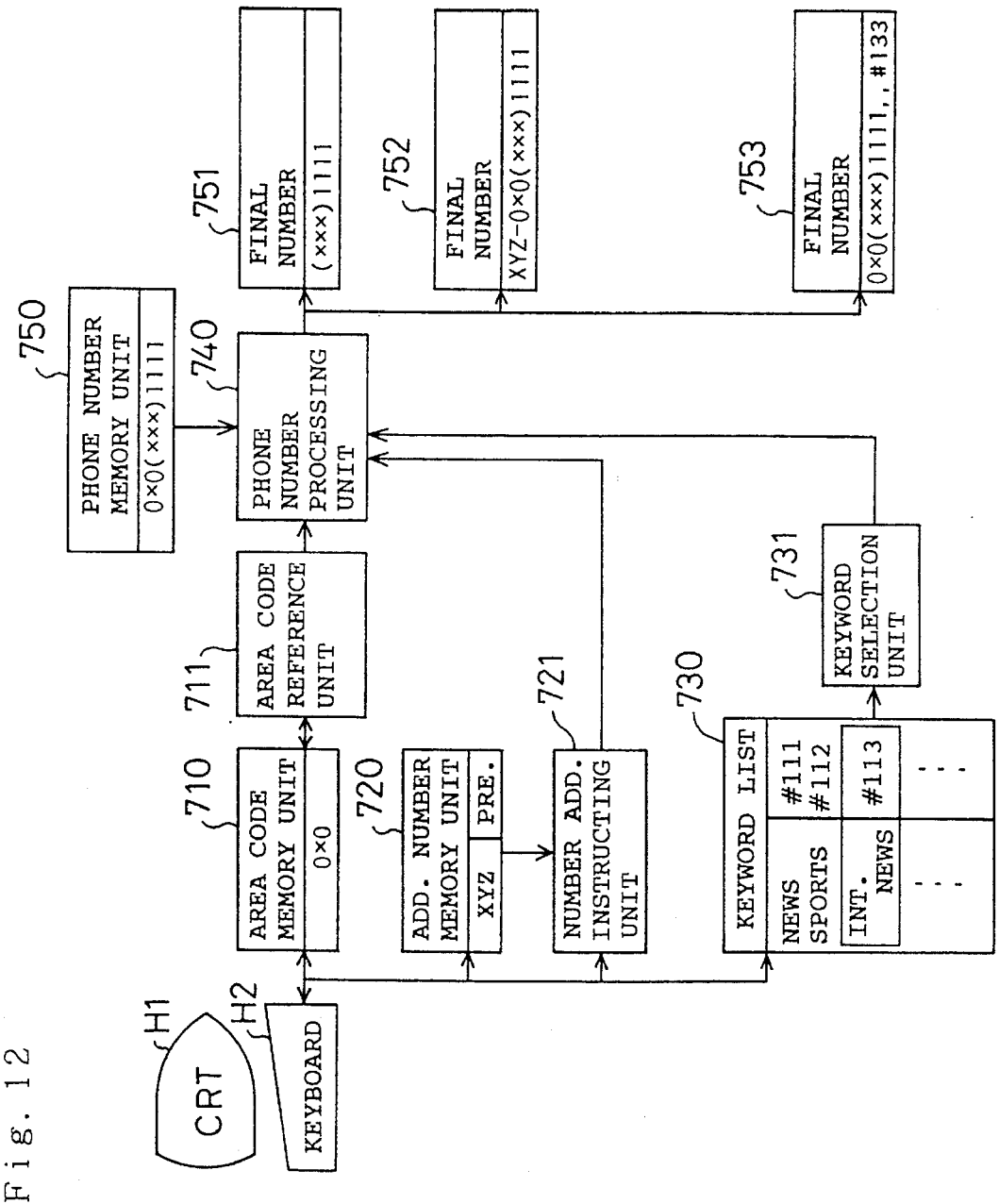
FIG. 12 is a functional block diagram showing a fundamental part of a seventh embodiment according to the invention.

A still another name card management system as a seventh embodiment of the invention is described according to the block diagram of FIG. 12. The name card management system shown in FIG. 12 has a function for processing and automatically dialing a telephone number.

A phone number processing unit 740 reads original phone number data stored in a phone number memory unit 750, executes a predetermined process described below, and outputs processed telephone numbers 751, 752, and 753. Keywords, such as 'Direct' 'Extension 315', and '8 PM to 8 AM', are preferably added to telephone numbers for convenience. The phone number processing unit 740 may read all the original phone number data stored in the phone number memory unit or alternatively read only part of the original phone number data. In the latter case, the phone number processing unit 740 reads data prior to a specific punctuation such as a blank or a bracket, and leaves only dialing characters in the input data while abandoning the other characters. This process allows only required data to be extracted from the original phone number data including a keyword. When a switchboard allows direct access to a certain person by dialing an extension number after a pilot number, the phone number processing unit 740 extracts all figures except the specific punctuation (the term 'Extension' in this example) from data 'XXX-XXX-1234 Extension 365' for direct access to the extension 365.

An area code memory unit 710 shown in FIG. 12 stores a reference area code to be omitted, that is, an area code where the name card management system is used. The reference area code is previously set by the user through operation of the keyboard H2 based on the display on the CRT H1. An area code reference unit 711 compares an area code of original phone number data stored in the phone number memory unit 750 with the reference area code output from the area code memory unit 710, and instructs the phone number processing unit 740 to omit the area code which is identical with the reference area code. The phone number processing unit 740 omits the area code from the original phone number data read out of the phone number memory unit 750 according to the instruction, and outputs a final number 751 without the area code. Local calls do not require the area code, and omission of the area code preferably saves the time for access.

An additional number memory unit 720 stores an additional number attached to a telephone number and a position of the additional number relative to the telephone number (for example, before or after). The additional number and its relative position are previously set by the user through operation of the keyboard H2 based on the display on the CRT H1. When the user instructs attachment of an additional number through operation of the CRT H1 and the keyboard H2, a number addition instructing unit 721 instructs the phone number processing unit 740 to attach the additional number to a telephone number. The phone number processing unit 740 receives the instruction, attaches the additional number to a specified position of the original phone number data read out of the phone number memory unit 750, and outputs a final number 752 with the additional number attached. When the user determines use of a B's network for long-distance calls instead of a common A's network, for example, an additional number 'XYZ' for connecting with the B's network is attached before the original phone number data. This function allows selection of the telephone circuit according to the requirements of the user.

A keyword list 730 includes special numbers attached, for example, after a telephone number and keywords representing the special numbers. The special numbers and the keywords are previously set by the user through operation of the keyboard H2 based on the display on the CRT H1. When the user operates the keyboard H2 with monitoring the display on the CRT H1 to select a certain keyword, a keyword selection unit 731 instructs the phone number processing unit 740 to attach a special number corresponding to the certain keyword to a telephone number. The phone number processing unit 740 receives the instruction, attaches the special number, for example, after the original phone number data read out of the phone number memory unit 740, and outputs a final number 753 with the special number attached. This function is extremely useful when the user selects one of plural choices in an information service system or sends a message to a beeper or a pager. Selection of desired information or input or selection of a message sent to a beeper is attained simply by selecting a keyword among the preset keyword list 730.

The name card management system of the seventh embodiment described above processes an original telephone number at any arbitrary time according to the instruction of the user or preset conditions. This system has such additional functions as well as the common dialing function. The principle of the embodiment is applicable to general-purpose data base systems including filing systems which process any data linked with telephone numbers.

Another name card management system is described as an eighth embodiment in accordance with the invention. The name card management system of the eighth embodiment has a structure similar to the name card management system of the fifth embodiment shown in FIGS. 9A and 9B. This name card management system has a function for automatically or manually specifying and registering new one of the use records. The name card management system of the eighth embodiment includes a use record registration unit 600 and a use record specification unit 601 shown by the broken lines in FIG. 9B. Elements of the eighth embodiment identical with those of the fifth embodiment are not described here. The use record specification unit 601 allows the user to manually specify use record data by operating the keyboard H2 while monitoring the display on the CRT H1.

FIG. 31 shows an exemplified display where the user specifies a use record with the use record specification unit 601. In this embodiment, a window for specifying a use record opens to allow input of data for four lines. An edit mode 1020 is set on the first line to determine whether a use record is newly created and added or an existing use record is modified. The user inputs a desired sequence of characters as contents 1021 on the second line. Alternatively, the user presses 'LIST' of a function key F1 and selects a desired sequence of characters, for example, 'WAIT FOR CONTACT' among a preset list 1024 of use record contents with a cursor 1025 as shown in FIG. 32. In still another method, the user presses 'PAST DATA' of a function key F2 to select a desired sequence of characters among a list of use record contents used in the past as shown in FIG. 31. A check block 1022 on the third line determines whether a business stated in the selected or input contents 1021 is completed. When the business is not completed, the expression 'INCOMPLETE' is input in the check block 1022. An incomplete use record is shown with an incomplete mark (*) given on the left end of the frame as described later. The today's date obtained from the calender timer H10 is input as a default in a date block 1023 on the fourth line. The date 1023 may be changed to a past date or a future date according to the requirements. The date 1023 may be changed by increasing or decreasing the day with the leftward or the rightward cursor keys, the month with the leftward or the rightward cursor keys with simultaneous operation of the SHIFT key, and the year with the leftward or the rightward cursor keys with simultaneous operation of the CTRL key. The day of the week automatically changes with the variation in the year, the month, and the day for quick and easy adjustment of the date. The time may be added after the date if necessary.

Use records may be applied for scheduling. In such a case, the edit mode is set to 'ADDITION' and the check block is set to 'INCOMPLETE'. A future data for the schedule is specified in the date block and the time and place are preferably stated in the contents block. This allows the user to utilize a use record as a memorandum. When the edit mode in a newly specified use record is set to 'ADDITION', the use record registration unit 600 of FIG. 9B adds the newly specified use record to the existing use record data in the name card record 550 of the name card data 551 shown in FIG. 9A. When the edit mode represents modification of an existing use record, the existing use record is overwritten. In the embodiment, each name card record can store four use records at the maximum. When a fifth use record is added to the existing four use records, the oldest use record is deleted from the name card record according to a first-in first out (FIFO) rule. The oldest use record may be deleted simply or re-stored in an exclusive use record data memory element for future reference. Use records with the incomplete mark (*) should be excluded from the deletion, otherwise the use records would not be used as a memorandum.

A newly specified use record is added as a line including the 'DATE' and 'CONTENTS' to the end of an use record data area 1030 of name card data 1030 as illustrated in FIG. 33. The newly specified use record has a check block set to 'INCOMPLETE' and thereby has an incomplete mark (*) 1032 on the left end of the frame. Use records having the check block set to 'COMPLETE' do not have the incomplete mark as the first three lines of the use record data shown in FIG. 33. When the edit mode of the new use record represents modification of an existing use record, the existing use record is overwritten with the new use record.

The use record registration unit 600 shown in FIG. 9B activates the card box sorting unit 590, which instructs a re-use card box management unit 565 to add a card record summary recently used at the top of summarized card data (re-use only) 564. The summarized card data (re-use only) 564 corresponds to a card box 572 having a name of 'RE-DIAL' or 'RE-USE'. The card box sorting unit 590 instructs the re-use card box management unit 565 to add a card record summary recently used at the top of the summarized card data (re-use only) 564. The summarized card data (re-use only) 564 includes a limited number of target titles, for example, 18 target titles, which allow simultaneous display without scrolling whereas a standard card box includes a greater number of target titles, for example, 100 titles. When a card record summary recently used is added to the maximum number of the target titles in the summarized card data (re-use only) 564, the re-use card box management unit 565 deletes the oldest target title from the summarized card data (re-use only) 564 according to an FIFO rule like the operation for the use record data. When a target title corresponding to the recently used card record summary already exists in the summarized card data (re-use only), the existing target title is deleted.

The use record registration unit 600 has a function of registering existence or non-existence of the incomplete mark of a use record into a flag of the card record summary 560 or 562. The re-use card box management unit 565 utilizes this function to determine whether a target title has the incomplete mark or not, and excludes the target title with the incomplete mark from the deletion according to the FIFO rule. This allows the target title with the incomplete mark to be used as a memorandum. In the case of double entry, when the existing target title has the incomplete mark, the incomplete mark should be transferred to the new card record summary added at the top of the summarized card data (re-use only).

FIG. 34 shows an exemplified display of a card box of 're-use only' immediately after registration of a new use record with the incomplete mark in the screen of FIG. 33. A card box 'RE-DIAL' 1042 currently selected in a card box list 1040 represents the summarized card data (re-use only) described above. A new target title 'QQQ INDUS. IRWIN' 1044 is added at the top of a target list 1041 corresponding to the summarized card data (re-use only) or the card box 'RE-DIAL' 1042. The target title 1044 with an incomplete business is shown with an incomplete mark (*) 1043 on the left end of the frame. The incomplete mark distinctly informs the user of existence of a target title with the incomplete business in the card box 'RE-DIAL' 1042 currently selected in the card box list 1040. In an alternative structure, the target title 1044 with the incomplete business may be displayed with a different mark other than the incomplete mark (*) 1043 or in another noticeable manner.

The use record specification unit 601 shown in FIGS. 9A and 9B has a function of automatically generating a use record and activating the use record registration unit 600 for automatic registration of the use record, as well as the manual specification function by the user as shown in FIG. 31. The use record specification unit 601, for example, automatically registers a use record of 'DATE=TODAY, CONTENTS=PHONED' in response to an automatic dialing, a use record of 'DATE=TODAY, CONTENTS=

FAXED' in response to a print of a facsimile cover letter, or a use record of 'DATE=TODAY, CONTENTS=SENT MATERIAL' in response to a print of a cover letter. In this case, the today's date is determined according to the calender timer H10. The use record automatically registered may be added to the card box of 're-use only' as described above. This automatic specification and registration function automatically registers contents of use records most frequently used, thereby saving the labor of the user. Registration of the automatic recording can also be used as a memorandum.

The name card management system of the eighth embodiment allows registration of a use record of each name card record according to both manual and automatic operations. The user can arbitrarily specify the use record as a memorandum or for scheduling. The name card record recently used is automatically registered in a specific card box of 're-use only'. This allows the user to find the name card record quickly for re-use or re-dialing.

Figure 13:
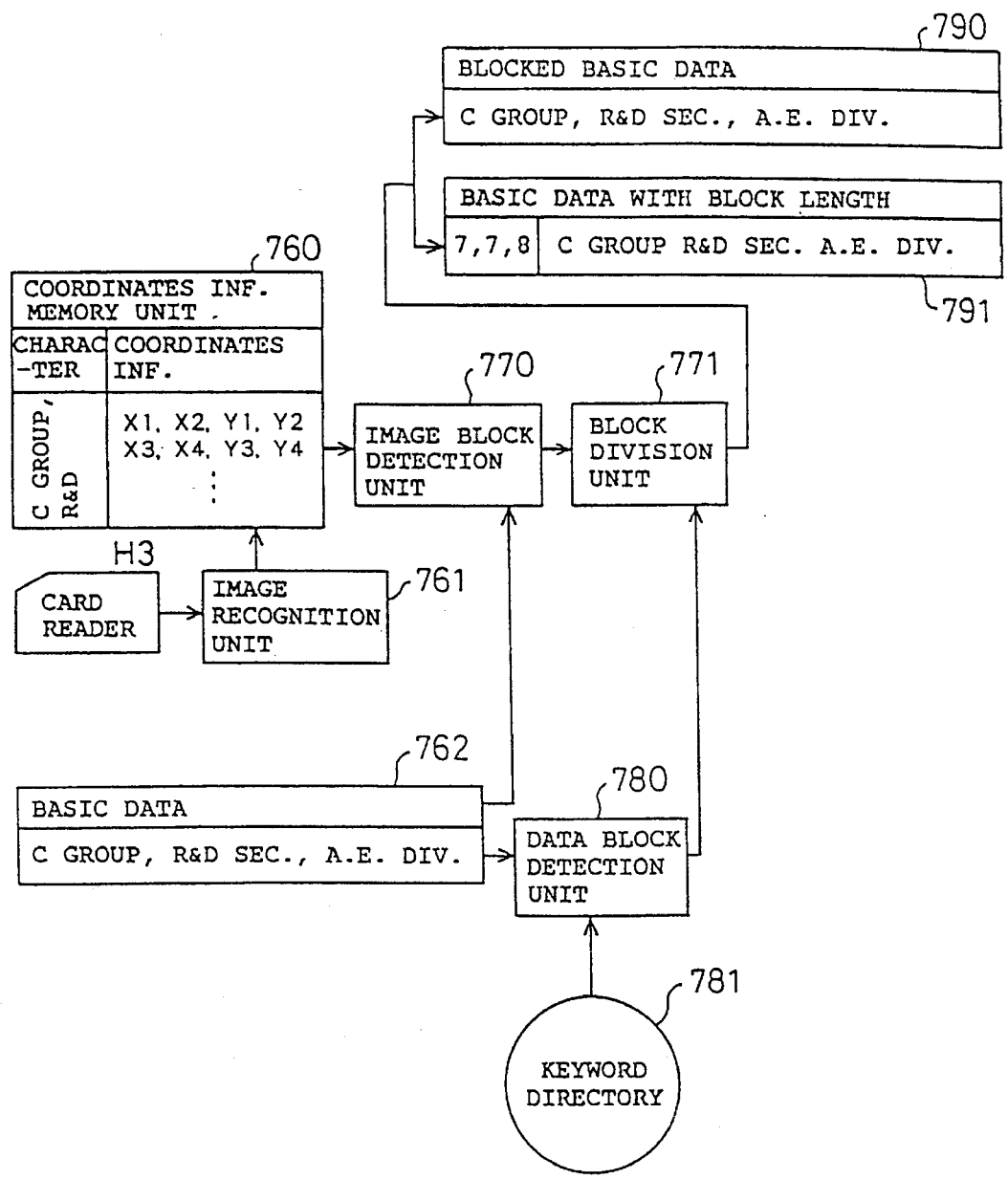
FIGS. 13 and 14 are functional block diagrams showing a fundamental part of a ninth embodiment according to the invention.

Another name card management system is described as a ninth embodiment in accordance with the invention. FIG. 13 is a block diagram illustrating a fundamental structure of the name card management system of the ninth embodiment. The name card management system shown in FIG. 13 has the functions described above as well as a function of dividing excessively long data included in a name card record, for example, basic data regarding a division at a company, into several blocks for smooth output.

A block division unit 771 inputs original basic data 762, receives block division information from both of or either of an image block detection unit 770 and a data block detection unit 780, and divides the original basic data 762 into several blocks to output as blocked basic data 790 or 791. When the input basic data 762 is sufficiently long, the block division unit 771 separates the long basic data 762 at appropriate positions.

The name card management system of the ninth embodiment further includes an image recognition unit 761, which recognizes name card image data input through the card reader H3, and outputs data of each recognized character together with coordinates information of each frame area including the each recognized character. A coordinates information memory unit 760 receives the outputs from the image recognition unit 761, and stores recognized characters in combination with coordinates of frame areas including the recognized characters. For example, coordinates information on a name card image corresponding to a recognized character 'A' is equal to 'X1, X2, Y1, Y2'; that is, coordinates (X1, Y1) for the upper left end of the character and coordinates (X2, Y2) for the lower right end of the character. The image block detection unit 770 receives the coordinates information stored in the coordinates information memory unit 760 and looks for an interval between X coordinates or Y coordinates of adjacent characters which is greater than a predetermined value. When a certain character interval $\Delta X = X3 - X2$ in the lateral direction is greater than one character width $\Delta X^* = X2 - X1$, the image block detection unit 770 determines existence of a sufficient space. When a character interval $\Delta X$ between a certain pair of characters is greater than a mean character interval, the image block detection unit 770 also determines that a block border exists between the certain pair of characters. The image block detection unit 770 executes similar determination for vertical character arrangement. When a certain character interval $\Delta Y = Y3 - Y2$ in the vertical direction is greater than one character height $\Delta Y^* = Y2 - Y1$, the image block detection unit 770 determines existence of a block border in the vertical direction. The image block detection unit 770 then outputs coordinates data representing a starting position of each block or an absolute character position as block division information to the block division unit 771. In this manner, the image block detection unit 770 recognizes a large interval between characters as an image, determines a block border, and outputs block division information. The block division unit 771 receives the block division information, and divides basic data regarding a certain item into several blocks.

The following description relates to a process of recognition of block division when no distinctive space is observed between any adjacent characters or when the user inputs a long sequence of characters through the keyboard H2. The name card management system of the ninth embodiment is further provided with a keyword directory 781, which includes a plurality of words regarded as divisional words of target basic data. For example, the target basic data relates to divisions at companies, the keyword directory 781 includes divisional words such as 'Office', 'Department or Dep.', 'Headquarters or HQ.', 'Division or Div.', 'Section or Sec.', 'Group', 'Sub-section', and 'Team'. The data block detection unit 780 retrieves input or recognized basic data 762 to determine whether the basic data 762 includes a keyword existing in the keyword directory 781, and determines a position of block division based on results of the retrieval. It is preferable that the data block detection unit 780 retrieves the basic data 762 in two different directions, from the head to the end and from the end to the head. This prevents the data block detection unit 780 from mistakenly recognizing a keyword. The double retrieval system allows the data block detection unit 780 to correctly determine a position of block division even when the basic data 762 includes a spelling identical with one of the above divisional words, for example, 'Inspection DIV. ABC DIV Corp.'

The data block detection unit 780 then outputs coordinates data representing a starting position of each block or an absolute character position as block division information to the block division unit 771. The coordinates information memory unit 760, the image block detection unit, and even the block division unit 771 may be integrally formed in the image recognition unit 761.

As described above, the block division unit 771 inputs the basic data 762, receives block division information from both of or either of the image block detection unit 770 and the data block detection unit 780, and divides the basic data 762 into several blocks. With reference to FIG. 13, the block division unit 771 may output basic data having a space, comma, or another divisional mark, for example, blocked basic data 790, or basic data having separate information representing the character number of each block such as '7,7,8', for example, basic data with the block length 791. The latter output may be preferable since it does not give any additional mark to the basic data.

Figure 14:
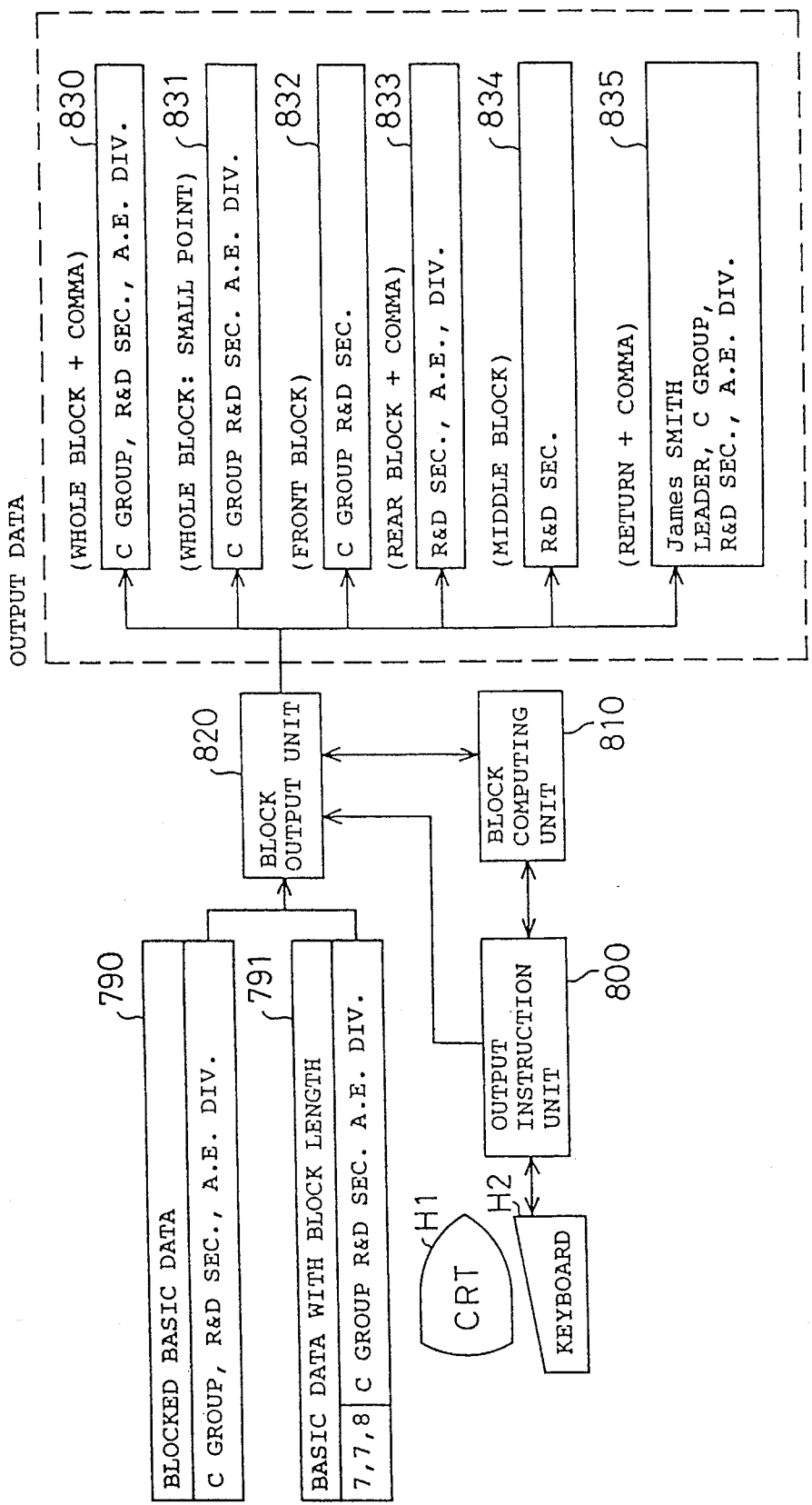

FIG. 14 is a block diagram showing a general structure of the name card management system of the ninth embodiment. The name card management system divides excessively long data included in a name card record, for example, basic data regarding a division at a company, into several blocks with the block division unit 771 shown in FIG. 13, and then outputs data of the several block having preferable lengths.

An output instruction unit 800 receives an output instruction given by the user through operation of the keyboard H2 based on the display on the CRT H1 or information internally given from the system, specifies a size of an output area and a format of block output, and gives the specification to a block output unit 820 and a block computing unit 810. The format of block output includes information, such as 'Preferential Block=Whole/Front/Rear/Middle', 'Divisional Mark (Comma)=Yes/No', 'Return=Yes/No', 'Small Point= Yes/No'. The output instruction unit 800 specifies the format of block output by selecting one of the plural choices divided by the symbol '/'. The block computing unit 810 receives the specification relating to the size of an output area and the format of block output given by the output instruction unit 800, and block division information given by the block output unit 820, and calculates a number of blocks which can be included in the output area. The block computing unit 810 also determines a character size (point) suitable for the output to the CRT H1 or the printer H5, and counts the number of characters in a subsequent line for RETURN operation. The block computing unit 810 gives results of the computation to the block output unit 820 and the output instruction unit 800.

The block output unit 820 receives information from the output instruction unit 800 and the block computing unit 810, and outputs the blocked basic data 790 or the basic data with the block length 791 according to one of output formats 830 through 835 shown in FIG. 14. A first output format 830 is set as 'Preferential Block=Whole' and 'Divisional Mark (Comma)=Yes'. In this example that an output area has a sufficient space for all the blocks, all the blocks are output with the divisional marks or commas. When the block computing unit 810 determines that the output area does not have a sufficient space for all the blocks, the output instruction unit 800 gives the user such a suggestion as 'Divisional Mark=No' or 'Small Point=Yes'. The user then modifies the specification to allow all the blocks to be included in the output area. When the output area is not sufficient for all the blocks even after the modified specification, the output instruction unit 800 gives the user another suggestion like 'Preferential Block=Rear' or 'Return=Yes' to request the user to further modify the specification of the output format.

A second output format 831 is set as 'Preferential Block= Whole ' and 'Small Point=Yes'. In this example that an output area has an enough space for all the blocks, all the blocks are output in a small point without the divisional marks.

A third output format 832 is set as 'Preferential Block= Front' and 'Division Mark (Comma)=No'. In this example that an output area does not have a sufficient space for all the blocks, only the former two blocks are output without the divisional marks. When all the blocks can not be included in the output space, a possible number of complete blocks, for example, from the head of the basic data, are output. This allows output of complete blocks only, and prevents any incomplete block, that is, part of a block from being output.

A fourth output format 833 is set as 'Preferential Block= Rear' and 'Divisional Mark (Comma)=Yes'. In this example that an output area does not have a sufficient space for all the blocks, only the latter two blocks are output with the divisional marks.

A fifth output format 834 is set as 'Preferential Block= Middle' and 'Divisional Mark (Comma)=No'. In this example that an output area does not have a sufficient space for all the blocks, only the intermediate one block is output without the divisional mark. In this case, the system cuts off blocks from both the head and the end of the basic data. The system may not, however, appropriately determine which block is preferentially left. It is thus preferable that the user gives the output instruction unit 800 a concrete specification relating to which block is to be left.

A sixth output format 835 is set as 'Preferential Block= Whole', 'Divisional Mark (Comma)=Yes', and 'Return= Yes'. In this example that an output area does not have a sufficient space for all the blocks, all the blocks with the divisional marks are output in a plurality of lines. The block computing unit 810 adds the number of characters of the first block 'C Group' to that of the word 'Leader' in a previous line, and determines that the total number does not exceed the output area of the previous line. As a result, the first block is output with the data of the previous line, and the second and the third blocks are output in a next line. When the block computing unit 810 determines that the total number exceeds the output area of the previous line, the output instruction unit 800 gives the user such suggestion as 'Divisional Mark (Comma)=NO', 'Return=NO', or 'Preferential Block=Rear' to request the user to modify the output format.

When a name card record includes excessively long data, for example, basic data relating to a division at a company, the latter part of the division data is omitted undesirably from a printed mail label. This may result in a misdelivery of mail or delay in mail delivery. Proposed solutions to such a problem are that target basic data are pre-arranged to occupy only a limited output space and that a large output area is prepared though it is not required in most cases. The name card management system of the embodiment divides the target basic data into several blocks and preferentially outputs blocks including important information for mail delivery, thereby allowing information having the higher priority to be positively output in a limited data area. Information having the lower priority, for example, the name the department or the division, may be omitted according to the requirements. The name card management system of the embodiment stores all character data for a certain item of basic data while omitting some character data with less importance in printing a mail label. This effectively prevents misdelivery of mail or delay in mail delivery. The system does not output any incomplete block to maintain the quality or preferable appearance of the output.

The name card management system of the ninth embodiment described above automatically divides excessively long data included in a name card record, for example, basic data relating to a division at a company, into several blocks by utilizing coordinates information of characters or referring to the keyword directory 781. The system calculates the number of blocks which can be included in an output area, thus preventing an incomplete block from being output undesirably. This ensures the high quality and preferable appearance of the output, for example, mail labels. The system preferentially outputs blocks including important information for mail delivery, for example, the names of the section and the sub-section. This effectively prevents misdelivery of mail or delay in mail delivery.

Figure 15:
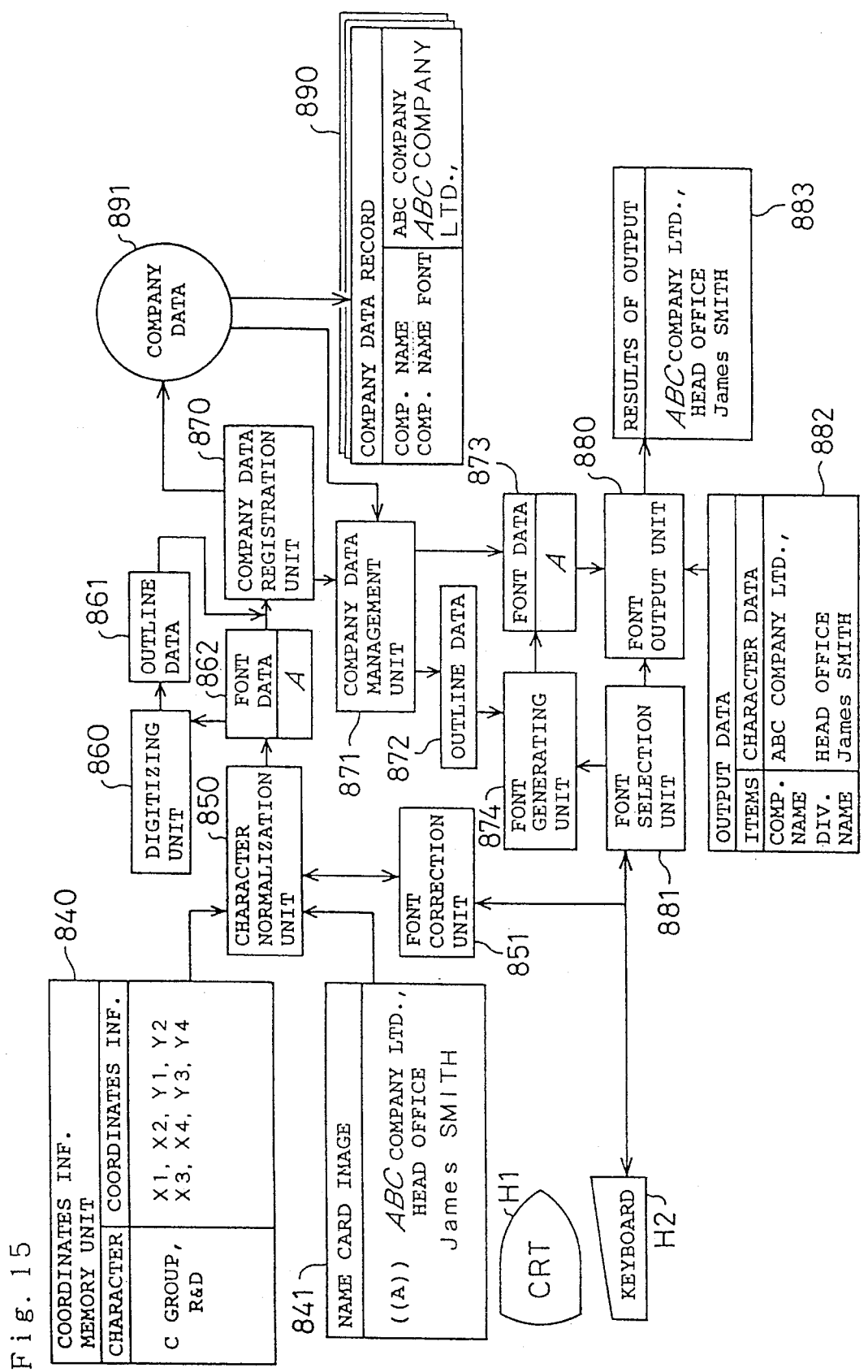
FIG. 15 is a functional block diagram showing another name card management system as a tenth embodiment according to the invention.

A still another name card management system is described as a tenth embodiment in accordance with the invention. FIG. 15 is a block diagram illustrating the name card management system of the tenth embodiment, which has a function of outputting a design font, for example, a company logo on a name card image, instead of a standard character font.

The name card management system stores an intact name card image 841 input from the card reader H3 or another scanner or sent via a facsimile. A coordinates information memory unit 840 is identical with the coordinates information memory unit 760 described in the ninth embodiment and thereby not described here in detail. The coordinates information memory unit 840 recognizes the name card image 841 as a plurality of frame areas each including one character, and stores the recognized characters in combination with coordinates of the frame areas including the characters.

A character normalization unit 850 separates font data 862 representing one character from the name card image 841 based on the information given by the coordinates information memory unit 840, normalizes the font data 862 to a predetermined size, and outputs the normalized font data to a company data registration unit 870. Design characters, such as company logos, are printed in various sizes on name cards. The character normalization unit 850 thus normalizes each design character on a name card to a standard size and eliminates image elements smaller than a predetermined size to reduce noises or stains on the name card.

A font correction unit 851 supporting the character normalization unit 850 displays a design character in a separate frame area on the CRT H1 to allow the user to check conditions of the separate frame area for the design character or noise elimination. The user can alter the separate frame area for the design character via the keyboard H2 according to the requirements. When a separate frame area for a certain design character mistakenly includes part of an adjacent design character, for example, the user changes the size of the separate frame area. In another example, when the character normalization unit 850 can not properly distinguish a design character from a noise, the user checks the display to differentiate between the design character and the noise.

A digitizing unit 860 approximates an outline of the font data 862 to spline or Bezier curves, and generates vector data or outline data 861.

What is claimed is:

1. A data management system for managing a plurality of data sets where each data set includes a plurality of items, said data management system comprising:

data summary generating means for extracting an item data element regarding with at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element; and original data display means for, when said desired item data element is selected, displaying an original data set corresponding to said desired item data element based on said relational information for said desired item data element, wherein said plurality of groups and said respective group names, said representative data list, and said original data set form a hierarchical data structure, and further said group display means, said representative data display means, and said original display means are operable such that said plurality of groups and said respective group names, said representative data list, and said original data set may all be displayed simultaneously.

2. A data management system in accordance with claim 1, wherein said each data set comprises name card data including at least a family name, a first name, an address, or a telephone number; and said data summary comprises data including at least said family name.

3. A data management system in accordance with claim 1, wherein said group display means further comprises means for displaying a specific name representing re-use of data as at least one of said group names, said sorting means further comprising means for temporarily allocating used-data to a group having said specific name.

4. A data management system in accordance with claim 3, wherein said sorting means further comprises means for, when a number of data allocated to said group having said specific name exceeds a predetermined value, expelling data with lowest necessity out of said group having said specific name.

5. A data management system in accordance with claim 1, said system further comprising a semi-conductor memory for storing said summary data in such a manner as to allow at least read-out of said summary data.

6. A data management system in accordance with claim 1, said system further comprising retrieval means for, while said representative data display means displays said representative data list including said plurality of item data elements, retrieving a plurality of data sets corresponding to said plurality of item data elements displayed to find a data set fulfilling a predetermined condition.

7. A data management system in accordance with claim 1, wherein said representative data display means generates a title data element corresponding to said each data set instead of extracting said item data element, and displays said title data element.

8. A data management system in accordance with claim 1, said system further comprising:

index data generating means for generating an index data element based on each data set or data summary, said index data element representing a division in a predetermined sequence where said plurality of data sets or corresponding data summaries are sorted in said predetermined sequence; and index data display means for displaying one or a plurality of said index data elements attached to said representative data list where said plurality of item data elements are arranged in said predetermined sequence.

9. A data management system in accordance with claim 8, wherein said index data element comprises at least a first letter of a specific item data element, an address code representing a specific address area, an area code attached to telephone numbers in a specific area, a date when the specific item data element is registered or updated, or a numeral representing a certain range where the specific item data element is positioned among said plurality of item data elements arranged in said predetermined sequence.

10. A data management system in accordance with claim 8, said system further comprising:

index data selection means for selecting one index data element out of said index data elements displayed by said index data display means; and means for selecting and displaying a data summary or a data set corresponding to said selected index data element.

11. A data management system in accordance with claim 8, wherein said index data display means further comprises means for, when no data set exists corresponding to a specific index data element, displaying said specific index data element in a style different from that for other index data element having at least one corresponding data set.

12. A data management system in accordance with claim 1, said system further comprising:

keyword retrieval means for retrieving said plurality of data sets of data summaries to find at least one data set or data summary including data regarding with a specific item, which is identical with data included in a data set or data summary currently displayed; and list display means for displaying a list of at least one item data element corresponding to said at least one data set or data summary, said at least one item data element comprising data regarding with at least one item different from said specific item.

13. A data management system in accordance with claim 1, said system further comprising:

cursor display means for, while said representative data display means displays said representative data list including said plurality of item data elements, displaying a cursor in said representative data list; and data set display means for, when said cursor is moved to a certain item data element in said representative data list, automatically switching from a currently displayed data set to displaying a data set corresponding to said certain item data element, wherein representative data display means, said cursor display means, and said data set display means operate such that said representative data list and said data set corresponding to said certain item data element are displayed simultaneously.

14. A data management system in accordance with claim 1, said system further comprising:

retrieval means for, while a certain data set comprising specific data fulfilling a predetermined condition is displayed corresponding to a desired item data element selected among said representative data list displayed by said representative data display means, retrieving said plurality of data sets to find at least one specific data set fulfilling said predetermined condition; and retrieved data display means for displaying a retrieved data list including at least one specific item data element corresponding to said at least one specific data set fulfilling said predetermined condition, together with a data set corresponding to one item data element selected among said retrieved data list.

15. A data management system in accordance with claim 14 wherein when said retrieval means is processing, said data management system displays only said retrieved data list as said retrieved data list is being created, said system further comprising:

return means for, when a retrieval process by said retrieval means and said retrieved data display means is canceled, returning to display said certain data set selected prior to said retrieval process, irrespective of a data set currently selected.

16. A data management system in accordance with claim 1, said system further comprising:

marking means for giving a specific mark to a predetermined item included in a data set; and means for, when a list of item data elements regarding with at least one item different from said predetermined item is displayed, clearly distinguishing one or a plurality of certain item data elements corresponding to one or a plurality of data sets having said specific mark from the other item data elements in the list without said specific mark.

17. A data management system in accordance with claim 16, wherein said marking means gives said specific mark to each data summary.

18. A data management system in accordance with claim 16, wherein said marking means further comprises:

means for, when said specific mark is given to a predetermined item data element included in a certain data set, determining whether said specific mark has a predetermined relation with respect to other data included in said certain data set; and data modification means for modifying specified data included in said certain data set when said specific mark has said predetermined relation with respect to said other data.

19. A data management system for managing a plurality of data sets where each data set includes a plurality of items, said data management system comprising:

data summary generating means for extracting an item data element having at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

original data display means for, when said desired item data element is selected, displaying an original data set corresponding to said desired item data element based on said relational information for said desired item data element;

marking means for giving a specific mark to a predetermined item included in a data set;

means for, when a list of item data elements regarding with at least one item different from said predetermined item is displayed, clearly distinguishing one or a plurality of certain item data elements corresponding to one or a plurality of data sets having said specific mark from the other item data elements in the list without said specific mark; and priority display means for, when said specific mark given by said marking means fulfills a predetermined condition, displaying item data elements with said specific mark in a higher priority.

20. A data management system for managing a plurality of data sets where each data set includes a plurality of items, said data management system comprising:

data summary generating means for extracting an item data element having at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

original data display means for, when said desired item data element is selected, displaying an original data set corresponding to said desired item data element based on said relational information for said desired item data element;

marking means for giving a specific mark to a predetermined item included in a data set, said marking means having:
a timer counting time; and
means for giving a predetermined mark when the time counted by said timer reaches a preset time; and means for, when a list of item data elements regarding with at least one item different from said predetermined item is displayed, clearly distinguishing one or a plurality of certain item data elements corresponding to one or a plurality of data sets having said specific mark from the other item data elements in the list without said specific mark.

21. A data management system for managing a plurality of data sets where each data set includes a plurality of items, said data management system comprising:

data summary generating means for extracting an item data element regarding with at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

original data display means for, when said desired item data element is selected, displaying an original data set corresponding to said desired item data element based on said relational information for said desired item data element;

mark specification means for giving a specific mark, which is selected out of plural marks previously defined, to a predetermined item included in a certain data set; and tentative writing means for tentatively writing specific data into said predetermined item based on a relation between said specific mark and other data included in said certain data set.

22. A data management system for managing a plurality of data sets where each data set includes a plurality of items, said data management system comprising:

data summary generating means for extracting an item data element including at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element; and registration instructing means for referring to said representative data list in order to select at least one of said plurality of groups for registering said each data set, wherein said plurality of groups and said respective group names, said representative data list, and said item data elements form a hierarchical data structure, and further said group display means and said representative data display means are operable such that said plurality of groups and said respective group names, said representative data list, and said plurality of said item data elements may all be displayed simultaneously.

23. A data management system in accordance with claim 22, said system further comprising condition storing means for previously storing said group names given to said plurality of groups for sorting said each data set and conditions on which said each data set is allocated to at least one of said plurality of groups, wherein said sorting means allocates said each data set to at least one of said plurality of groups as said previously registered conditions specify when said previously registered conditions are satisfied.

24. A data management system as recited in claim 22, said system further comprising rearranging means for rearranging said data set allocated to one of said plurality of groups in predetermined arrangement order.

25. A data management system as recited in claim 23 wherein said condition storing means further comprises display means for listing and displaying indexes given to said previously registered group names.

26. A data management system for managing a plurality of data sets where each data set includes a plurality of items, said data management system comprising:

data summary generating means for extracting an item data element regarding with at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

registration instructing means for referring to said representative data list in order to select at least one of said plurality of groups for registering said each data set selection means for selecting a plurality of desired data sets according to a predetermined process; and quick sorting means for registering or deleting all the plurality of desired data sets into or from a specific group.

27. A data management system for managing a plurality of data sets where each data set includes a plurality of items, said data management system comprising:

data summary generating means for extracting an item data element regarding with at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

registration instructing means for referring to said representative data list in order to select at least one of said plurality of groups for registering said each data set;

data registration means for registering a new data set; and duplicate data display means, when at least one item data element included in said new data set coincides with at least one corresponding item data element included in an existing data set previously registered, for displaying said new data set and said existing data set to allow mutual reference.

28. A data management system in accordance with claim 27, said system further comprising:

contrast display means for displaying said new data set and said existing data set in such a manner as to allow comparison in each item data element; and identical data display means for displaying identical item data elements and non-identical item data elements of said new data set and said existing data set in different ways.

29. A data management system for managing a plurality of data sets where each data set includes a plurality of items including a name and a telephone number, said data management system comprising:

data summary generating means for extracting an item data element including at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element;

automatic dialing means for, when an automatic dialing is instructed while said desired item data element is selected, automatically dialing a telephone number included in a certain data set corresponding to said desired item data element; and original data display means for, when said automatic dialing is implemented, displaying said certain data set corresponding to said desired item data element based on said relational information for said desired item data element.

30. A data management system in accordance with claim 29, wherein said plurality of groups include a re-dial group where one or plural data sets having possibility of re-dialing are classified into, said representative data display means comprising:
first means for displaying item data elements included in said re-dial group in a higher priority, and
second means for displaying other item data elements included in groups other than said re-dial group in a lower priority; and said original data display means further comprising means for displaying a data set corresponding to said desired item data element selected among said representative data list displayed by said representative data display means.

31. A data management system for managing a plurality of data sets where each data set includes a plurality of items, said data management system comprising:

data summary generating means for extracting an item data element regarding with at least part of said plurality of items out of said each data set in order to generate and store a data summary, said data summary comprising said item data element as well as relational information representing a relation of said item data element to said each data set;

group display means for displaying a plurality of groups and respective group names given to said plurality of groups in such a manner as to allow selection of a desired group, said plurality of data sets being sorted according to said plurality of groups;

sorting means for allocating said each data set to at least one of said plurality of groups;

representative data display means for, when said desired group is selected out of said plurality of groups, displaying a representative data list, which includes a plurality of said item data elements corresponding to specific data sets belonging to said desired group, in such a manner as to allow selection of a desired item data element; and use record data recording means for, when a certain data set corresponding to said desired item data element is used, recording data representing a use record as part of said certain data set.

32. A data management system in accordance with claim 31, wherein said plurality of groups include a re-use group where one or plural data sets having possibility of re-use are classified into, said use record data recording means further comprising use data registration means for registering said data representing a use record into said re-use group.

33. A data management system in accordance with claim 32, wherein said use data registration means further comprises delete means for canceling registration of a data set which is previously registered in said re-use group and fulfills a predetermined condition.

34. A data management system in accordance with claim 33, wherein said use record data recording means comprises:

incomplete mark allocation means for allocating an incomplete mark representing that a required matter is not completed, to a certain data set; and said delete means further comprises exception means for excepting said certain data set with said incomplete mark from cancellation of registration in said re-use group.

35. A data management system in accordance with claim 34, wherein said delete means further comprises inquiry means for, when said certain data set with said incomplete mark fulfills said predetermined condition for cancellation, inquiring a user whether said certain data set is to be deleted from said re-use group.

* * * * *